(12) United States Patent
Nakamura et al.

(10) Patent No.: US 9,884,989 B2
(45) Date of Patent: Feb. 6, 2018

(54) ZNS FLUORESCENT MATERIAL AND MANUFACTURING METHOD THEREOF

(71) Applicant: Japan Atomic Energy Agency, Naka-gun, Ibaraki (JP)

(72) Inventors: Tatsuya Nakamura, Naka (JP); Masaki Katagiri, Mito (JP); Yasunobu Noguchi, Anan (JP); Hirofumi Ooguri, Anan (JP)

(73) Assignee: Japan Atomic Energy Agency, Ibaraki (JP)

( * ) Notice: Subject to any disclaimer, the term of this patent is extended or adjusted under 35 U.S.C. 154(b) by 134 days.

(21) Appl. No.: 14/659,674

(22) Filed: Mar. 17, 2015

(65) Prior Publication Data
US 2015/0267109 A1    Sep. 24, 2015

(30) Foreign Application Priority Data

Mar. 18, 2014 (JP) .................................. 2014-054251

(51) Int. Cl.
*G01T 1/20* (2006.01)
*C09K 11/58* (2006.01)

(52) U.S. Cl.
CPC .................. *C09K 11/584* (2013.01)

(58) Field of Classification Search
CPC .................................................. C09K 11/584
See application file for complete search history.

(56) References Cited

U.S. PATENT DOCUMENTS 8,337,722 B2 * 12/2012 Tsuji .................... C09K 11/625
                                                              252/301.6 S
2006/0011854 A1   1/2006  Katagiri

FOREIGN PATENT DOCUMENTS

JP           2005-300479 A    10/2005

* cited by examiner

*Primary Examiner* — C Melissa Koslow
*Assistant Examiner* — Carol M Koslow
(74) *Attorney, Agent, or Firm* — Crowell & Moring LLP

(57) ABSTRACT

To provide Zinc Sulfide activated with Silver (ZnS:Ag) based fluorescent material for detecting particle beams, having lower gamma-ray sensitivity and providing lower afterglow, and being specialized for the purpose of detecting particle beams, and its manufacturing method. Zinc Sulfide activated with Silver (ZnS:Ag) based fluorescent material for detecting particle beams emits fluorescence with wavelengths from 320 nm to 580 nm in response to alpha-ray irradiation, and has a fluorescence spectrum with a peak wavelength from 395 nm to 410 nm.

10 Claims, 61 Drawing Sheets

ZNS FLUORESCENT MATERIAL AND MANUFACTURING METHOD THEREOF

BACKGROUND OF THE INVENTION

The present invention relates to a Zinc Sulfide activated with Silver (ZnS:Ag) based fluorescent material for detecting particle beams which enables to detect particle beams such as alpha rays efficiently, and also relates to manufacturing method thereof. More specifically, the present invention relates to Zinc Sulfide activated with Silver (ZnS:Ag) based fluorescent material for detecting particle beams which attains to have a low sensitivity to gamma rays (electron beams) exiting as background in detecting particle beams such as alpha rays in order to reduce the decay time for measurement with a high detection efficiency and to reduce the quantity of afterglow which may disturb the measurement with a high detection efficiency, and also relates to manufacturing method thereof.

The Zinc Sulfide activated with Silver (ZnS:Ag) based fluorescent material represented by P11 fluorescent material conventionally and commercially available has such characteristics as having a lower sensitivity to gamma rays existing as background in comparison with other types of scintillators, and also yielding a larger quantity of fluorescence in response to particle beams such as alpha ray.

ZnS:Ag based fluorescent material has been used as the fluorescent material for neutron scintillators for detecting alpha rays conventionally or since 1950's in order to detect neutrons by way of detecting $^3$He and alpha rays emitted by nuclear reactions between neutron and $^6$Li used as the neutron converter as in

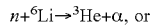

$n+{}^6Li \rightarrow {}^3He+\alpha$, or in order to detect neutrons by way of detecting $^7$Li and alpha rays emitted by nuclear reaction between neutron and $^{10}$B used as the neutron converter as in

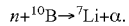

$n+{}^{10}B \rightarrow {}^7Li+\alpha$.

As ZnS:Ag based fluorescent material represented by P11 fluorescent material has such a disadvantage as providing a larger quantity of afterglow, it is difficult with this type of fluorescent material to realize measurements with a high detection efficiency. In addition, ZnS:Ag based fluorescent material has generically a gamma-ray sensitivity, which yields a background in detecting particle beams such as alpha ray and detecting neutrons through neutron converters.

In Patent Literature 1 "Particle Ray Detector and Neutron Detector using ZnS based Fluorescent Material", irradiation experiments for confirming that the fluorescence spectrum in alpha-ray irradiation is different from the fluorescence spectrum in gamma-ray irradiation to ZnS:Ag, Cl based fluorescent materials conventionally manufactured were performed by using $^{241}$Am as a radiation source for alpha rays, and using another radiation source for 60 keV gamma rays by covering the surface of the radiation source for alpha rays with a thin plate in order to remove the effect of alpha rays Note that Patent Literature 1 uses the term of "ZnS:Ag, Cl based fluorescent material" in order to refer to the fluorescent material, and that P11 fluorescent material, etc. used generally in commercial products, is labelled simply as ZnS:Ag. This difference in labelling with or without "Cl" comes from the fact that Sodium Chloride (NaCl) is used generally as a flux in fabricating ZnS:Ag based fluorescent materials, and thus "Cl" is added in case of labelling more precisely. Patent Literature 1 discloses a fluorescence spectrum diagram showing that the fluorescence spectrum obtained by alpha-ray irradiation is different from the fluorescence spectrum obtained by gamma-ray irradiation, which is incorporated in FIG. 1 in the present invention as reference. It is proved in FIG. 1 that the spectral intensity of the fluorescence spectrum increases globally at the short wavelength range at 420 nm or below 420 nm.

FIG. 2 shows alpha-ray irradiation fluorescence spectra for 1109-041 ZnS:Ag—Cl fluorescent material manufactured by Nichia Corporation and P11 ZnS:Ag fluorescent material commercially available in market. As understood from FIG. 2, it can be confirmed that both spectra show an identical fluorescence spectrum and those fluorescent materials have identical characteristics.

In Patent Literature 1, the sensitivity to gamma rays may be reduced by detecting only the wavelength range at 420 nm or shorter in the fluorescence spectrum shown in FIG. 1 by using the optical filter in order to reduce the detected intensity of gamma ray, and the decay time may be reduced by reducing the effect of afterglow.

[Patent Literature 1] JP 2005-300479 A

BRIEF SUMMARY OF THE INVENTION

Even in the invention according to Patent Literature 1, the detectable quantity of fluorescence may be reduced by half, and the sensitivity to gamma-rays may still remain and the fluorescence spectrum region containing afterglow may still extend to more than half of the overall fluorescence spectrum region. Thus, the invention according to Patent Literature 1 cannot attain fully the object, that is, reducing the sensitivity to gamma rays and reducing the influence of afterglow.

As for the neutron image detectors using neutron scintillators which are used for the neutron-scattering experimental equipment at pulsed-neutron research facilities using particle accelerators such as J-PARC in Japan, ISIS in United Kingdom and SNS in United States of America, any neutron image detector that enables a neutron imaging measurement while further reducing the sensitivity to gamma rays and attaining a measurement with a higher detection efficiency is required in order to increase the measurement accuracy in experimental studies for neutron scattering and to fit for the enhanced power output of particle accelerators.

A $^3$He gas-filled neutron detector which has been conventionally used as a main detector for the neutron-scattering experimental equipment has advantageously a lower sensitivity to gamma rays, but cannot fit for the measurement with a high detection efficiency to be considered as one of major challenges in detecting pulsed neutrons, and thus it is expected for neutron image detectors using neutron scintillators to solve this problem, and related R&D works are pursued in European and American countries.

In order to detect alpha rays emitted in association with fused nuclear fuels under the background environment with extremely high-intensity gamma rays or beta rays, for example, inside a nuclear reactor vessel or inside a nuclear reactor building at post-accident, it is required to reduce the gamma-ray sensitivity in ZnS:Ag based fluorescent materials down to such a level as being substantially insensitive to gamma rays.

It is required to detect neutrons under the background environment with extremely high-intensity gamma rays or beta rays in order to monitor that fused nuclear fuels melted down inside the reactor pressure vessel may reach a state of criticality for some reason. There is one possible method for detecting and measuring neutrons by using conventional ZnS/$^6$LiF neutron scintillators mounted on the top of radiation-resistant optical fiber, in which it is required to reduce the gamma-ray sensitivity in ZnS:Ag based fluorescent materials down to such a level as being substantially insensitive to gamma rays.

An object of the present invention is to provide a Zinc Sulfide activated with Silver (ZnS:Ag) based fluorescent material for detecting particle beams, having a lower gamma-ray sensitivity and providing lower afterglow, and being specialized for the purpose of detecting particle beams, and also relates to its manufacturing method.

A reproduction experiment, identical to the experiment disclosed in Patent Literature 1 "Particle Ray Detector and Neutron Detector Using ZnS-based Fluorescent Material" and intended for confirming that the fluorescence spectrum in alpha-ray irradiation is different from the fluorescence spectrum in gamma-ray irradiation with respect to ZnS:Ag, Cl based fluorescent materials, was performed; a fluorescence spectrum by alpha-ray irradiation (hereinafter referred to as "alpha-ray irradiation fluorescence spectrum") and a fluorescence spectrum by gamma-ray irradiation (hereinafter referred to as "gamma-ray irradiation fluorescence spectrum") was obtained, and then, after normalization by scaling zero (0) to one (1) for the minimum and maximum values of the individual spectral intensities, a fluorescence spectrum indicating a sensitivity only to alpha rays (herein referred to "alpha-ray sensitive fluorescence spectrum") was obtained finally by subtracting the normalized gamma-ray sensitive fluorescence spectrum from the normalized alpha-ray irradiation fluorescence spectrum.

FIG. 3 shows a composite line diagram including an alpha-ray irradiation fluorescence spectrum, a gamma-ray sensitive fluorescence spectrum and an alpha-ray sensitive fluorescence spectrum. According to the experimental result, it was able to be confirmed that there existed any alpha-ray sensitive fluorescence spectrum and its peak wavelength was around 410 nm. According to further analysis of this experimental result, it was confirmed that the quantity of fluorescence (that is, an integral value of spectral intensities) of alpha-ray sensitive fluorescence spectrum is approximately 29% of the quantity of fluorescence for the alpha-ray irradiation fluorescence spectrum. This means that, in case of irradiating alpha-rays to the conventional ZnS:Ag based fluorescent material, it was able to be confirmed that the resultant fluorescence spectrum was obtained so that gamma-ray sensitive fluorescence spectrum by 71% and alpha-ray sensitive fluorescence spectrum by 29% may be synthesized.

The fact that, in the above described alpha-ray sensitive fluorescence spectrum, the sensitivity to gamma ray is significantly low and the decay time is short, and the quantity of afterglow is also significantly small is disclosed also in the Patent Literature 1 "Particle Ray Detector and Neutron Detector Using ZnS-based Fluorescent Material."

Thus, in order to solve the problems by the present invention, it is required to develop ZnS:Ag based fluorescent materials in which the quantity of fluorescence in alpha-ray sensitive fluorescence spectrum is increased to be equal to or larger than 29% of the quantity of fluorescence in alpha-ray irradiation fluorescence spectrum. It is desired ultimately that the quantity of fluorescence in gamma-ray irradiation fluorescence spectrum is made almost to zero and the resultant fluorescence spectrum is composed only by alpha-sensitive fluorescence spectrum.

More specifically, Zinc Sulfide activated with Silver (ZnS:Ag) based fluorescent material for detecting particle beams in one aspect of the present invention (hereinafter referred to as "first fluorescent material") has such a characteristic feature that fluorescence having the wavelengths from 320 nm to 580 nm is emitted in response to alpha-ray irradiation, and its fluorescence spectrum has a peak wavelength from 395 nm to 410 nm.

Zinc Sulfide activated with Silver (ZnS:Ag) based fluorescent material for detecting particle beams in another aspect of the present invention (hereinafter referred to as "second fluorescent material") is Zinc Sulfide activated with Silver (ZnS:Ag) based fluorescent material having such a characteristic feature as indicating a fluorescence spectrum composed of fluorescence spectrum component corresponding to the fluorescence light emitted from the first fluorescence material in response to alpha-ray irradiation, and a fluorescence spectrum component corresponding to the fluorescence spectrum having a wavelength from 380 nm to 560 nm is emitted in response to gamma-ray or electron beam irradiation, and its fluorescence spectrum has a peak wavelength from 435 nm to 450 nm, in which the quantity of the former fluorescence spectrum is 0.35 times larger than and 1 time less than the quantity of the synthesized overall fluorescence spectrum.

A manufacturing method of the first fluorescent material has such a characteristic feature that, in manufacturing the first fluorescent material, Zinc Sulfide (ZnS) as a main raw material, Silver (Ag) as an activating material, and a flux used for reducing a calcination temperature are calcined with sulfur, strontium sulfide, calcium sulfide, lithium sulfide or a mixture of sulfur and at least one of strontium sulfide and calcium sulfide, as an add-in material.

A manufacturing method of the second fluorescent material has such a characteristic feature that, in manufacturing the second fluorescent material, Zinc Sulfide (ZnS) as a main raw material, Silver (Ag) as an activating material, and a flux used for reducing a calcination temperature are calcined with sulfur, strontium sulfide, calcium sulfide, lithium sulfide or a mixture of sulfur and at least one of strontium sulfide and calcium sulfide, as an add-in material. The manufacturing method of the second fluorescent material uses different amounts of add-in materials than the manufacturing method of the first fluorescent material.

Effect of the Invention

By using Zinc Sulfide activated with Silver (ZnS:Ag) based fluorescent material for detecting particle beams according to the present invention, as it may be allowed to provide a low sensitivity to gamma-ray (electron beam) exiting as background in detecting particle beams such as alpha-rays to reduce the decay time for a measurement with a high detection efficiency and to reduce the intensity of afterglow which may disturb a measurement with a high detection efficiency, it will be appreciated that particle beams such as alpha rays may be detected effectively even under such a severe environment as the inside of a nuclear reactor vessel or the inside of a nuclear reactor building at post-accident phases.

A line graph representing three types of fluorescence spectra of the conventional ZnS:Ag fluorescent material; alpha-ray irradiation fluorescence spectrum, gamma-ray irradiation fluorescence spectrum and alpha-ray sensitive irradiation florescence spectrum.

FIG. 4

A line graph representing fluorescence spectra of the conventional ZnS:Ag fluorescent material in response to gamma-ray irradiation, electron beam irradiation and ultraviolet-ray irradiation.

FIG. 5

A line graph representing alpha-ray irradiation fluorescence spectra of ZnS:Ag fluorescent materials, each having different quantities of zinc chloride.

FIG. 6

A line graph representing alpha-ray irradiation fluorescence spectra of ZnS:Ag fluorescent materials, each having different quantities of Sulfur.

FIG. 7

Figure 6:
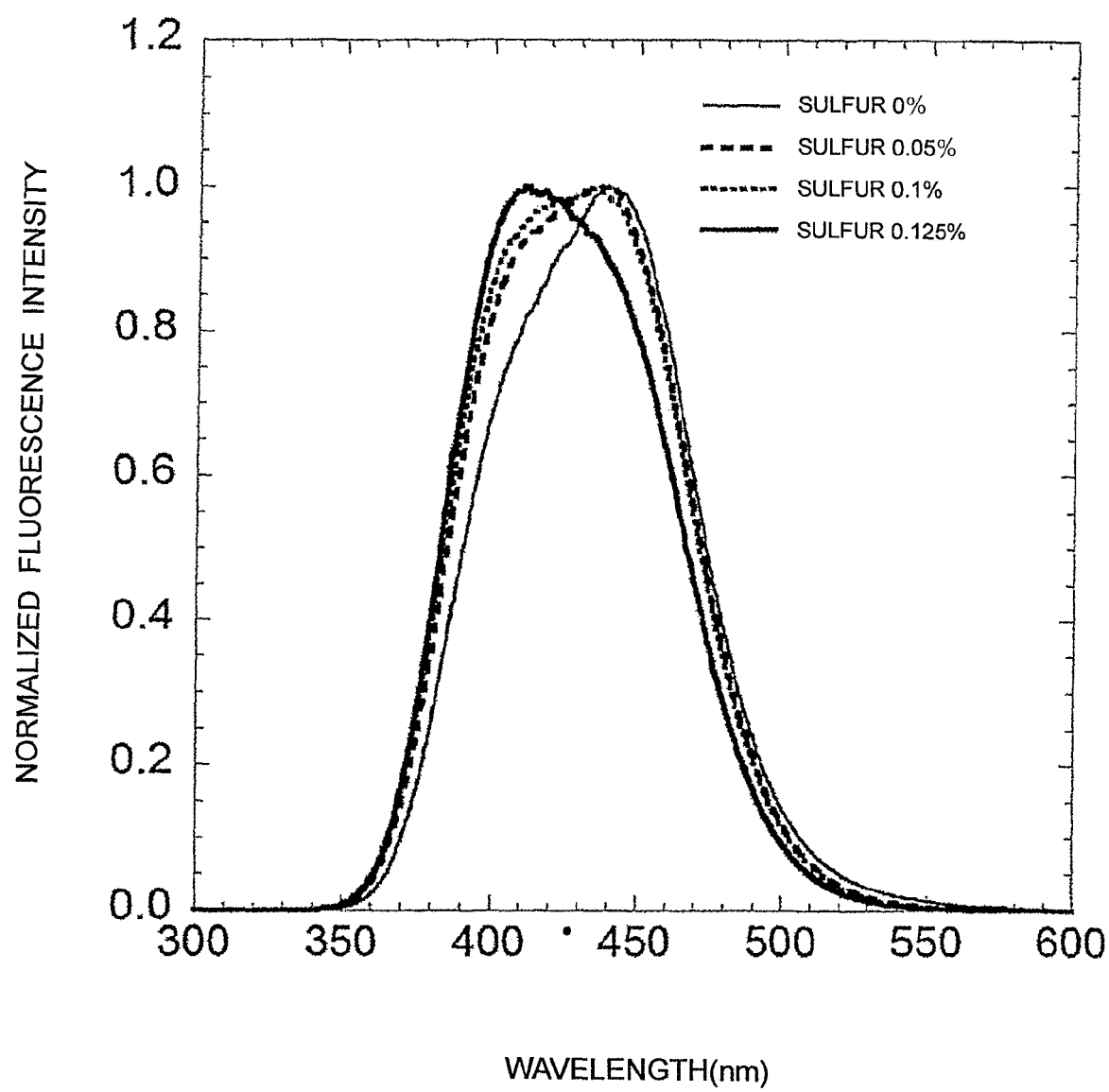
Figure 7:
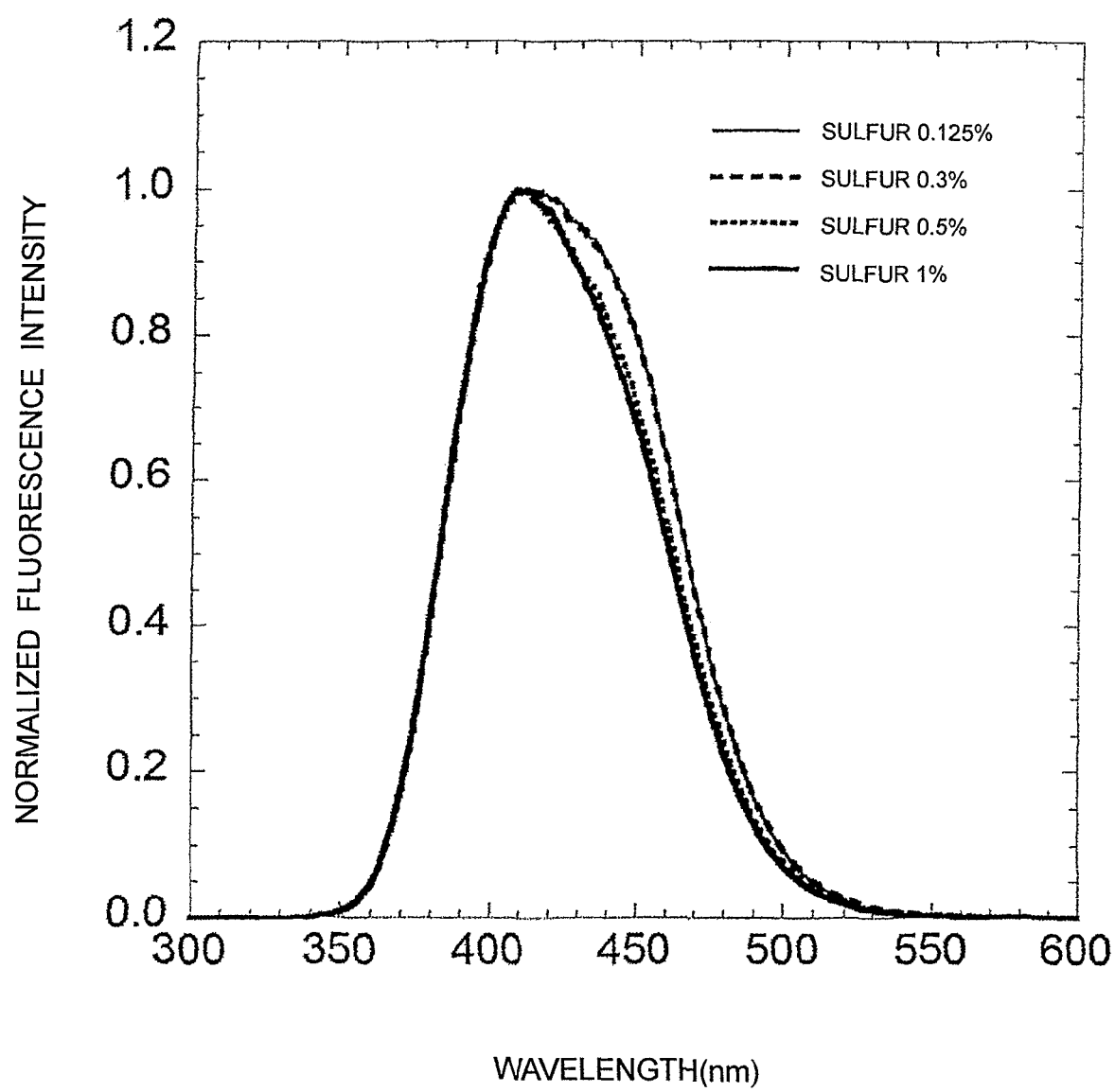

Another line graph similar to FIG. 6.

FIG. 8

A line graph representing alpha-ray irradiation fluorescence spectra of ZnS:Ag fluorescent materials without Sulfur added, and with Sulfur added by 0.5% and 1%, respectively.

FIG. 9

A line graph representing alpha-ray irradiation fluorescence spectra of the first fluorescent material with Sulfur added by 5% according to the present invention and the fluorescent material in the prior art.

FIG. 10

A line graph representing gamma-ray irradiation fluorescence spectra of the first fluorescent material with Sulfur added by 5% according to the present invention and the fluorescent material in the prior art.

FIG. 11

A line graph representing alpha-ray irradiation fluorescence spectra of the first fluorescent material with Sulfur added by 5% according to the present invention and the fluorescent material in the prior art.

FIG. 12

A line graph representing alpha-ray irradiation fluorescence spectra of the first fluorescent material with Strontium Sulfide added by 0.6% and the fluorescent material with Sulfur added by 5% according to the present invention.

FIG. 13

A line graph representing alpha-ray irradiation fluorescence spectrum and gamma-ray irradiation fluorescence spectrum of the first fluorescent material with Strontium Sulfide added by 0.6% according to the present invention.

FIG. 14

A diagram representing alpha-ray signal waveforms of the first fluorescent material with Strontium Sulfide added by 0.6% and the first fluorescent material with Sulfur added by 5% according to the present invention.

FIG. 15

A line graph representing three types of fluorescence spectra of the second fluorescent material with Strontium Sulfide added by 0.175% according to the present invention.

FIG. 16

A line graph representing gamma-ray irradiation fluorescence spectrum of the second fluorescent material with Strontium Sulfide added by 0.175% according to the present invention.

FIG. 17

A diagram representing alpha-ray signal waveforms of the second fluorescent material with Strontium Sulfide added by 0.175% and the first fluorescent material with Sulfur added by 5% according to the present invention.

FIG. 18

A line graph representing alpha-ray irradiation fluorescence spectra showing one experimental result for manufacturing the second fluorescent material.

FIG. 19

A line graph representing alpha-ray irradiation fluorescence spectra showing another experimental result for manufacturing the second fluorescent material.

FIG. 20

A line graph representing alpha-ray irradiation fluorescence spectra showing yet another experimental result for manufacturing the second fluorescent material.

FIG. 21

A line graph representing alpha-ray irradiation fluorescence spectra of the first fluorescent material with Strontium Sulfide added by 0.25% and the first fluorescent material with Strontium Sulfide added by 0.6% according to the present invention.

FIG. 22

A line graph representing alpha-ray irradiation fluorescence spectra of the first fluorescent material with Sulfur added by 2% and Strontium Sulfide added by 1% and the first fluorescent material with Sulfur added by 5% according to the present invention.

FIG. 23

A line graph representing alpha-ray irradiation fluorescence spectra of the first fluorescent material with Sulfur added by 2% and Strontium Sulfide added by 0.5% and the first fluorescent material with Sulfur added by 5% according to the present invention.

FIG. 24

A line graph representing three types of fluorescence spectra of the second fluorescent materials with Calcium Sulfide added by 5% according to the present invention.

FIG. 25

A line graph representing three types of fluorescence spectra of the second fluorescent material using Sodium Chloride as a flux.

FIG. 26

A line graph representing three types of fluorescence spectra of the second fluorescent material using Sodium Chloride as a flux.

FIG. 27

A line graph representing three types of fluorescence spectra of the second fluorescent material using Lithium Bromide as a flux.

FIG. 28

A line graph representing three types of fluorescence spectra of the second fluorescent material using Potassium Bromide as a flux.

FIG. 29

A line graph representing three types of fluorescence spectra of the second fluorescent material using Rubidium Bromide as a flux.

FIG. 30

A line graph representing three types of fluorescence spectra of the second fluorescent material using Cesium Bromide as a flux.

FIG. 31

A line graph representing three types of fluorescence spectra of the second fluorescent material using Lithium Fluoride as a flux.

FIG. 32

A line graph representing three types of fluorescence spectra of the second fluorescent material using Calcium Chloride as a flux.

FIG. 33

A line graph representing three types of fluorescence spectra of the second fluorescent material using Cerium Chloride as a flux.

FIG. 34

A line graph representing three types of fluorescence spectra of the second fluorescent material using Strontium Chloride as a flux.

FIG. 35

A line graph representing three types of fluorescence spectra of the second fluorescent material using Magnesium Bromide as a flux.

FIG. 36

A line graph representing three types of fluorescence spectra of the second fluorescent material using Barium Bromide as a flux.

FIG. 37

A line graph representing alpha-ray irradiation fluorescence spectra of three types of fluorescent materials manufactured in the calcination process using three types of graphite crucibles, each provided with a hole having diameters of 0.7 mm, 1 mm and 1.4 mm, respectively at the center of the lid.

FIG. 38

A line graph representing alpha-ray irradiation fluorescence spectra of three types of fluorescent materials manufactured in the calcination process by changing the quantity of Lithium Chloride used as a flux.

FIG. 39

A line graph representing alpha-ray irradiation fluorescence spectra of five types of fluorescent materials manufactured in the calcination process by changing the quantity of Silver Nitrate as an activating material.

FIG. 40

A line graph representing alpha-ray irradiation fluorescence spectra of fluorescent materials fabricated with different types of cover gasses.

FIG. 41

A line graph representing alpha-ray irradiation fluorescence spectra of fluorescent materials manufactured in the calcination process by using Strontium Bromide as a flux and changing the calcination time.

FIG. 42

A line graph representing alpha-ray irradiation fluorescence spectra of fluorescent materials manufactured in the calcination process by using Magnesium Bromide as a flux and changing the calcination time.

FIG. 43

A line graph representing alpha-ray irradiation fluorescence spectra of five types of fluorescent materials manufactured in the calcination process by changing the quantity of Sulfur as an add-in material.

FIG. 44

A line graph representing alpha-ray irradiation fluorescence spectrum of fluorescent material with Strontium Sulfide added by 0.6%, and for comparison, irradiation fluorescence spectra of five types of fluorescent materials manufactured in the calcination process by changing the quantity of Sulfur as an add-in material.

FIG. 45

A line graph representing an analytical result for identifying the first fluorescent material and the second fluorescent material.

FIG. 46

A line graph representing alpha-ray irradiation fluorescence spectra of fluorescent materials with Sulfur added by 0.6% and with Sulfur added by 5%.

FIG. 47

A line graph representing alpha-ray irradiation fluorescence spectra of six types of fluorescent materials manufactured in the calcination process by changing the quantity of Strontium Sulfide as an add-in material.

FIG. 48

A line graph representing alpha-ray irradiation fluorescence spectra of six types of fluorescent materials manufactured in the calcination process by changing the quantity of Strontium Sulfide as an add-in material.

FIG. 49

A line graph representing an analytical result of gamma-ray irradiation experiment for identifying the first fluorescent material.

FIG. 50

Figure 49:
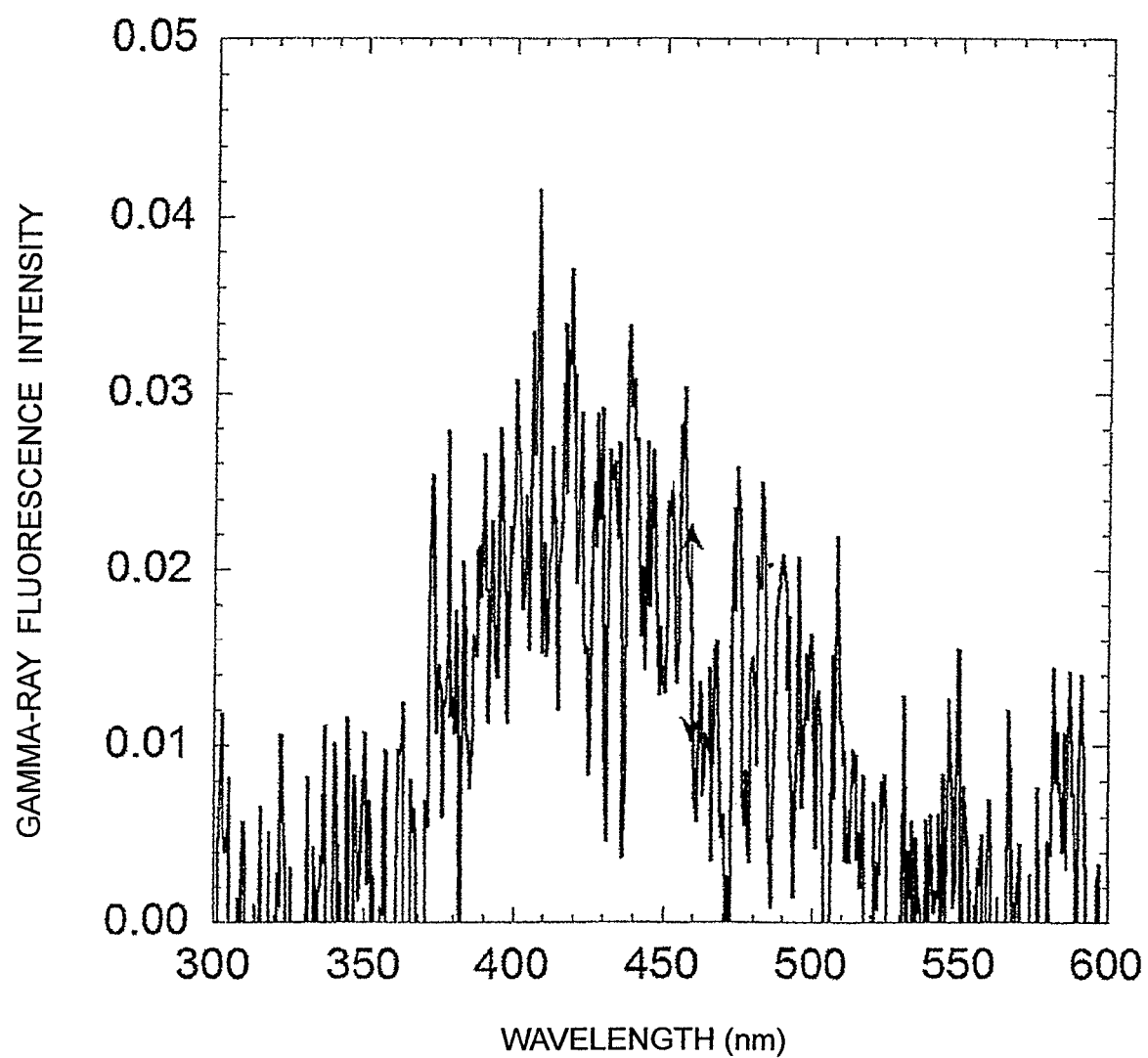

A diagram illustrating a comparison result for the fluorescent material shown in FIG. 49 and the fluorescent material similar to one shown in FIG. 49.

FIG. 51

A line graph representing changes in the short decay time and the photon number in response to alpha rays in case of changing the quantity of Strontium Sulfide as an add-in material.

FIG. 52

A correlation diagram representing a relation between the photon number and the short decay time estimated by analyzing signal waveforms so obtained by irradiating alpha rays to the fluorescent material according to the present invention.

FIG. 53

A line graph representing normalized alpha-ray irradiation fluorescence spectra of fluorescent materials manufactured in the calcination process by changing the quantity of Sulfur as an add-in material.

FIG. 54

A correlation diagram representing a relation between the quantity of add-in material in the fluorescent material manufactured in the calcination process by changing the quantity of Sulfur as an add-in material, and the alpha-ray detection factor.

FIG. 55

A line graph representing normalized alpha-ray irradiation fluorescence spectra of fluorescent materials manufactured in the calcination process by changing the quantity of Strontium Sulfide as an add-in material.

FIG. 56

A correlation diagram representing a relation between the quantity of add-in material in the fluorescent material manufactured in the calcination process by changing the quantity of Strontium Sulfide as an add-in material, and the alpha-ray detection factor.

FIG. 57

A correlation diagram representing a relation between the quantity of add-in material in the fluorescent material manufactured in the calcination process by changing the quantity of Strontium Sulfide as an add-in material, and the short decay time.

FIG. 58

A line graph representing alpha-ray irradiation fluorescence spectra of fluorescent materials fabricated by changing the calcination time.

FIG. 59

A correlation diagram representing a relation between the photon numbers and the short decay time for each add-in material, Sulfur and Sulfide, separately.

FIG. 60

A correlation diagram representing a relation between the photon numbers and the short decay time for each flux, Alkaline metal and Alkaline earth metal, separately.

FIG. 61

A correlation diagram representing a relation between the photon numbers and the short decay time for each flux, Chloride and Bromide, separately.

DETAILED DESCRIPTION OF THE PREFERRED EMBODIMENTS

Figure 4:
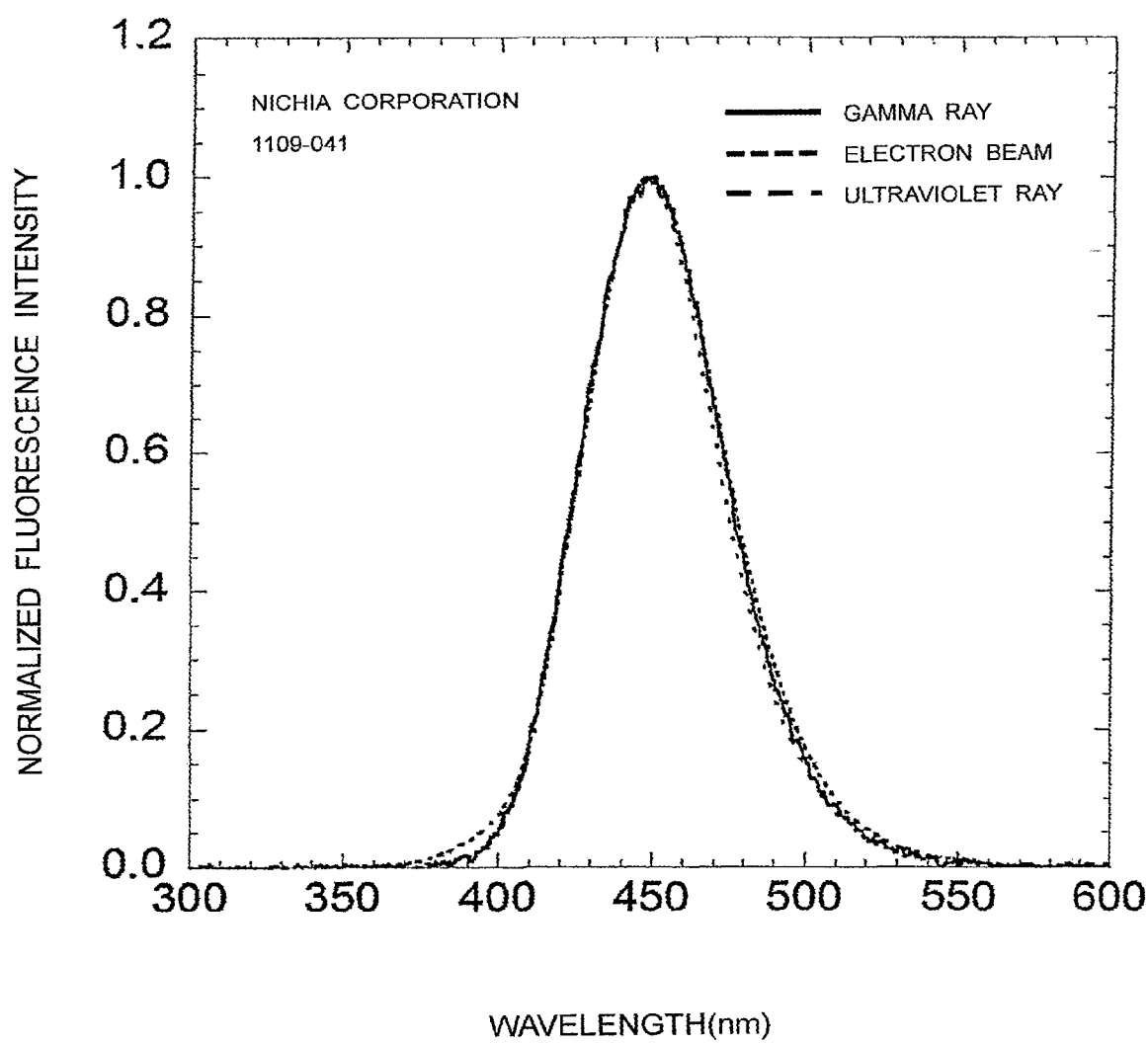

A basic idea of the present invention now will be described in order to support a better understanding of the present invention before describing specifically the individual preferred embodiments of the present invention. As for ZnS:Ag based fluorescent material represented by P11 fluorescent material, it was found that there was few research result for fluorescence spectrum in case of irradiating alpha rays in existing patents, and scientific and technical papers. This might be due to the fact that ZnS:Ag based fluorescent material represented by P11 fluorescent material has been normally used for emitting blue lights in TV displays, and its fluorescent emission characteristic has been evaluated by using electron beams or ultraviolet rays. For reference, FIG. 4 shows fluorescence spectra obtained by irradiating gamma rays, electron beams and ultraviolet rays to 1109-041 ZnS:Ag—Cl fluorescent material manufactured by Nichia Corporation. It is found in those irradiation results that any global increase in the spectral intensity of the fluorescence spectrum cannot be observed at the shorter wavelength range at 420 nm or below 420 nm in the fluorescence spectrum obtained in response to alpha-ray irradiation.

At the first step of study, assuming that sodium (Na) used as a flux may have any influence, the change in the alpha ray irradiation fluorescence spectrum was observed by increasing the quantity of several add-in materials for several types of sodium compound represented by NaCl, and it was proved, however, that its result is not different from the result in the alpha-ray irradiation to the conventional P11 fluorescent materials.

Figure 5:
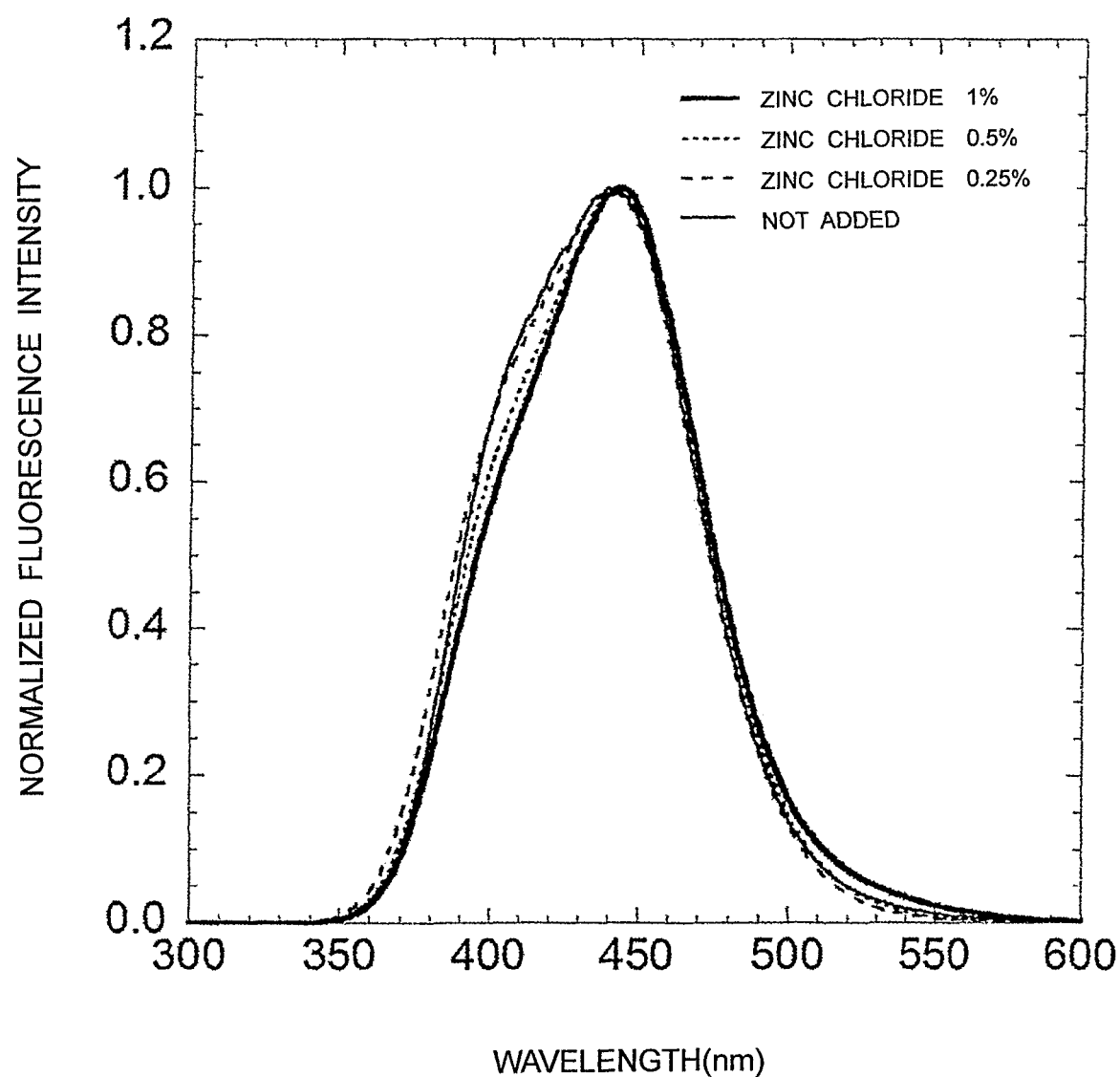

At the second step of study, we assumed the possibility that Zinc Sulfide as base material may have any influence. An irradiation experiment was performed by selecting zinc sulfide (ZnS) as a main raw material, silver (Ag) as an activating material, and Lithium Chloride as a flux enabling a calcination process at the relatively low temperature, and by adding Sulfur (S) as an add-in material, and by adding Zinc Chloride ($ZnCl_2$) as another add-in material considered not to become any problem even in adding Chloride (Cl) chemically bonded with Zinc (Zn) for the purpose of reducing the mass fraction of Sulfur. Calcination process was performed under the same condition by changing the weight fraction of Sulfur to Zinc Sulfide from 2% to 0% and by changing the weight fraction of Zinc Chloride from 0% to 1%. By segmenting the alpha-ray irradiation fluorescence spectrum of the obtained ZnS:Ag fluorescent material into three regions, a region including a larger quantity of Sulfur, a region including a smaller quantity of Sulfur, and a region including Zinc mainly, fluorescence spectra for the individual regions are shown in FIG. 5, FIG. 6 and FIG. 6 by normalizing the observed maximum values in the spectra to 1 (one) in order to compare the shape of fluorescent spectra for those regions. Details of this experiment will be explained in Embodiment 7.

It was confirmed from the result of those calcination experiments that the intensity of alpha-ray sensitive fluorescence spectrum can be increased by increasing the quantity of added Sulfur s, in which the ratio of the quantity of Sulfur to the quantity of Zinc in Zinc Sulfide as the base material is made increase from 1:1 to 1:1+s. In addition, it was also confirmed that the intensity of alpha-ray sensitive fluorescence spectrum can be decreased by adding more zinc.

It became clear, however, from the trial and experimental manufacturing with various parameters being changed that it is significantly difficult to control the ratio of the quantity of Sulfur to the quantity of Zinc so that an intended alpha-ray irradiation fluorescence spectrum after the calcination process may be obtained practically with the prepared calcination material, because the ratio may significantly change dependent of the type of flux material being used and its quantity, the type of add-in material being used such as Sulfur and its quantity, the condition of the crucible, and the calcination temperature and the calcination period of time.

Figure 8:
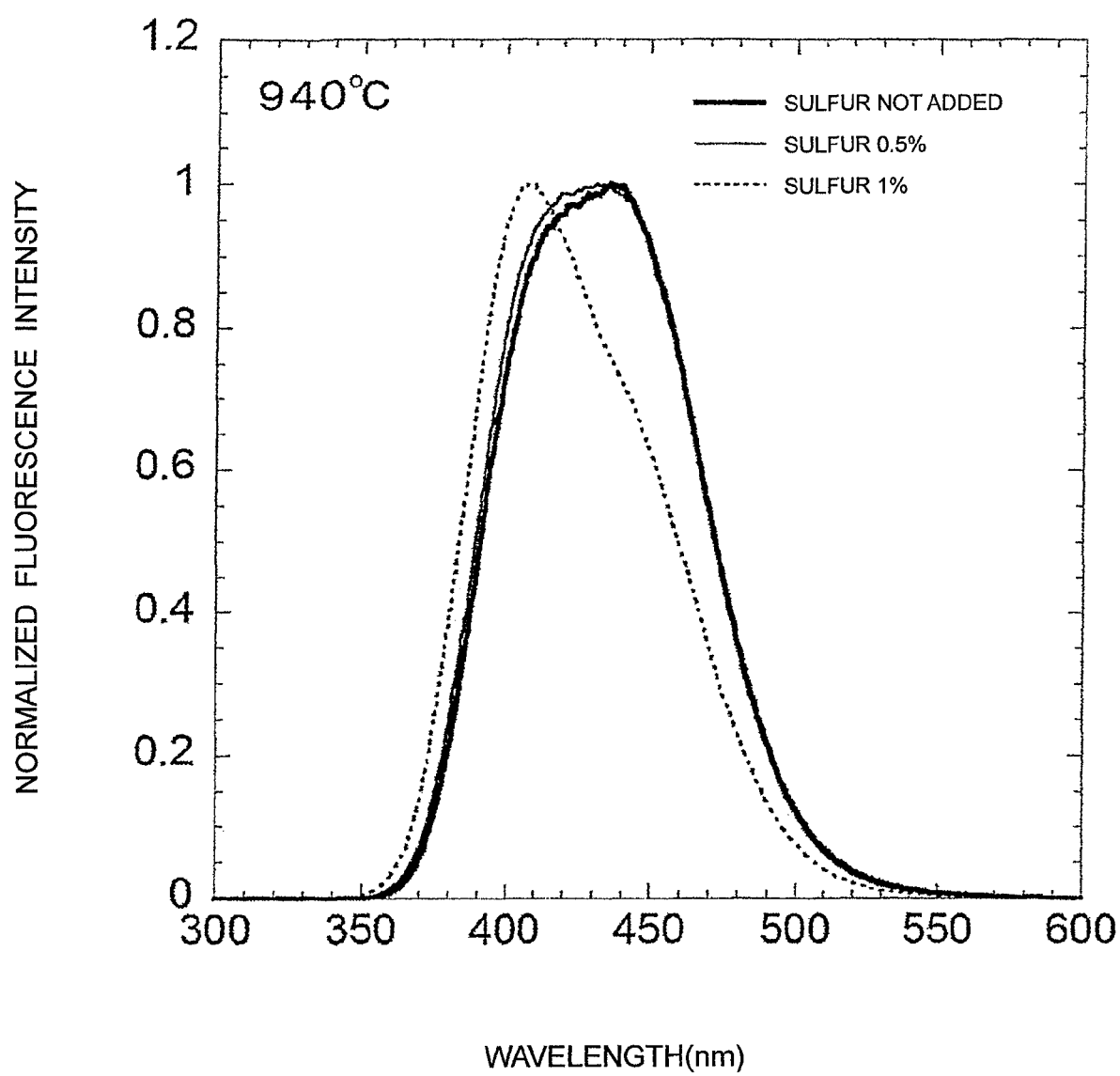

Under an extreme condition, for example, without adding Sulfur at the calcination process, it is certainly possible to manufacture ZnS:Ag based fluorescent materials for detecting particle beams by applying a calcination process to ZnS:Ag fluorescent material sensitive to alpha rays like the second fluorescent material and ZnS:Ag fluorescent material emitting fluorescent lights indicating a fluorescence spectrum including gamma-ray sensitive fluorescence spectrum by increasing the calcination temperature nearly up to 1000° C. For example, in case of applying a calcination process for 2 hours with a calcination temperature at 940° C. by using lithium bromide (LiBr) as a flux having a melting point as low as 552° C., alpha-ray irradiation fluorescence spectra for three types of ZnS:Ag fluorescent materials manufactured without Sulfur added, with Sulfur added by 0.5% and with Sulfur added by 1% are shown in FIG. 8, in which their maximum values are normalized to be 1 (one). Even in case not adding Sulfur, it is proved that ZnS:Ag based fluorescent materials for detecting particle beams in which the fraction of alpha-ray sensitive fluorescence spectrum to alpha-ray irradiation fluorescence spectrum is increased to be 0.44 large enough in comparison with the value 0.29 for the conventional ZnS:Ag fluorescent materials can be manufactured, if flux having a significantly low melting point is used. However, in such a manufacturing process, it is required to control the quantity of Sulfur after completing the calcination process by means of controlling the sublimation conditions for Sulfur and Zinc included in Zinc Sulfide, and thus it is very difficult to control precisely the ratio, 1+s:1, between the quantity of Sulfur and the quantity of Zinc after completing the calcination process.

Measurements of fluorescence spectra obtained by irradiating alpha rays and gamma rays according to the present invention were performed by using the following equipment and by applying the following conditions.

Measuring Apparatus: Fluorescence Spectrophotometer F-2500 manufactured by Hitachi, Ltd.

Fluorescence Slit: having slit spacing fixed at 20 nm. Owing to this configuration, the unit for the intensity of fluorescent light at alpha-ray irradiation is identical to the unit for the intensity of fluorescent light at gamma-ray irradiation.

Wavelengths of Excited Lights at Ultraviolet-Ray Irradiation: 340 nm

Alpha Ray Source for Alpha-Ray Irradiation: $^{241}$Am alpha source manufactured by Amersham, United Kingdom (having a diameter of 5 mmφ and a source intensity of 1 MBq approximately)

Gamma Ray Source for Gamma-Ray Irradiation: irradiating 60 keV gamma rays by arranging an alpha-ray shield composed of four aluminum foils (each having a thickness of 12 μm) on $^{241}$Am alpha source manufactured by Amersham, United Kingdom (having a diameter of 5 mmφ and a source intensity of 1 MBq approximately)

Embodiment 1

In Embodiment 1, what will be described is ZnS:Ag based fluorescent material for detecting particle beams, as a basis for the present invention, which fluorescence lights having the wavelengths from 320 nm to 600 nm are emitted in response to alpha-ray irradiation, and its fluorescence spectrum has a peak at the wavelengths from 395 nm to 410 nm.

One example of steps in manufacturing ZnS:Ag based fluorescent material for detecting particle beams in this embodiment will be described below. Detailed steps will be described by referring to a manufacturing method described in Embodiment 3 and following Embodiments.

50 g of Zinc Sulfide (ZnS) is used as a main raw material. Silver (Ag) as an activating material is used in the form of Silver Nitrate (AgNO$_3$) and added by the weight fraction of 0.015% to the quantity of Zinc Sulfide. Lithium Chloride (LiCl) having a melting point at 613° C. is used as a flux and added by the weight fraction of 6% to the quantity of Zinc Sulfide. Sulfur (S) having a melting point at 388° C. and a boiling point at 445° C. is used, and added by the weight fraction of 5% to the quantity of Zinc Sulfide. 20 cc of distilled water is added to and mixed with the above materials, and then is dried.

As for the crucible composed of graphite with its whole periphery being closed, a graphite crucible having an outer diameter of 60 mmφ and a length of 50 mm, an inner diameter of 30 mmφ, a bottom thickness of 10 mm and a lid thickness of 10 mm is used. The net volume for accommodating the materials is designed to have a diameter of 30 mmφ and a length of 30 mm. A hole having a diameter of 1 mmφ is provided at the center of the lid in order to release a part of sublimate substances generated from the calcination materials inside the crucible. Dried calcination materials are introduced inside the graphite crucible, and the lid is closed.

Next, the graphite crucible is held into the electric furnace and the calcination process is applied. As for the electric furnace, Electric Furnace KDF-S70 type manufactured by DENKEN Co., Ltd which has a maximum operating temperature at 1100° C., was used. The calcination process was performed in the following conditions.

Calcination Temperature: 820° C.

Cover Gas: CO$_2$ flowing at a flow rate of 2 liters per minute

Calcination Period of Time: 2 hours

After sintered materials obtained after the calcination process were ground to powder, and further after rinsing the powder by water, ZnS:Ag based fluorescent material for detecting particle beams is finally obtained. The color of the obtained ZnS:Ag based fluorescent materials for detecting particle beams exhibits light yellowish-brown rather than white.

Fluorescent emission characteristics of ZnS:Ag based fluorescent materials for detecting particle beams were studied with respect to alpha-ray irradiation and gamma-ray irradiation. The samples to be used to measure the fluorescent emission characteristics were prepared by applying a double-sided tape manufactured by Nitoms, Inc. onto the cover glass for microscope specimens (plane size: 18 mm×18 mm, thickness: 0.15 mm), then and coating ZnS:Ag based fluorescent material powder on one side of the double-sided tape. Owing to this operation, it will be appreciated that ZnS:Ag based fluorescent material particles may be coated almost uniformly onto one side of the double-sided tape. In applying this preparatory method, the measurement error to the quantity of fluorescence in response to alpha-ray irradiation (that is, an integral value of the intensity of fluorescence in a fluorescence spectrum) is ±10%.

In case of alpha-ray irradiation, the alpha-ray source is located 0.3 mm apart from the specimen. In case of gamma-ray irradiation, gamma-rays were irradiated in the configuration in which an alpha-ray shielding plate manufactured by joining four Aluminum foils, each having a thickness of 12 μm, is inserted. The fluorescent light emitted by alpha-ray irradiation is emitted though the opposite surface of the cover glass. Measurements of fluorescence spectra obtained by alpha-ray irradiation and gamma-ray irradiation were performed in the configuration in which those measurement samples are located at the position where the individual sample is to be set up in the excitation light irradiation system of the fluorescence photometer.

Figure 9:
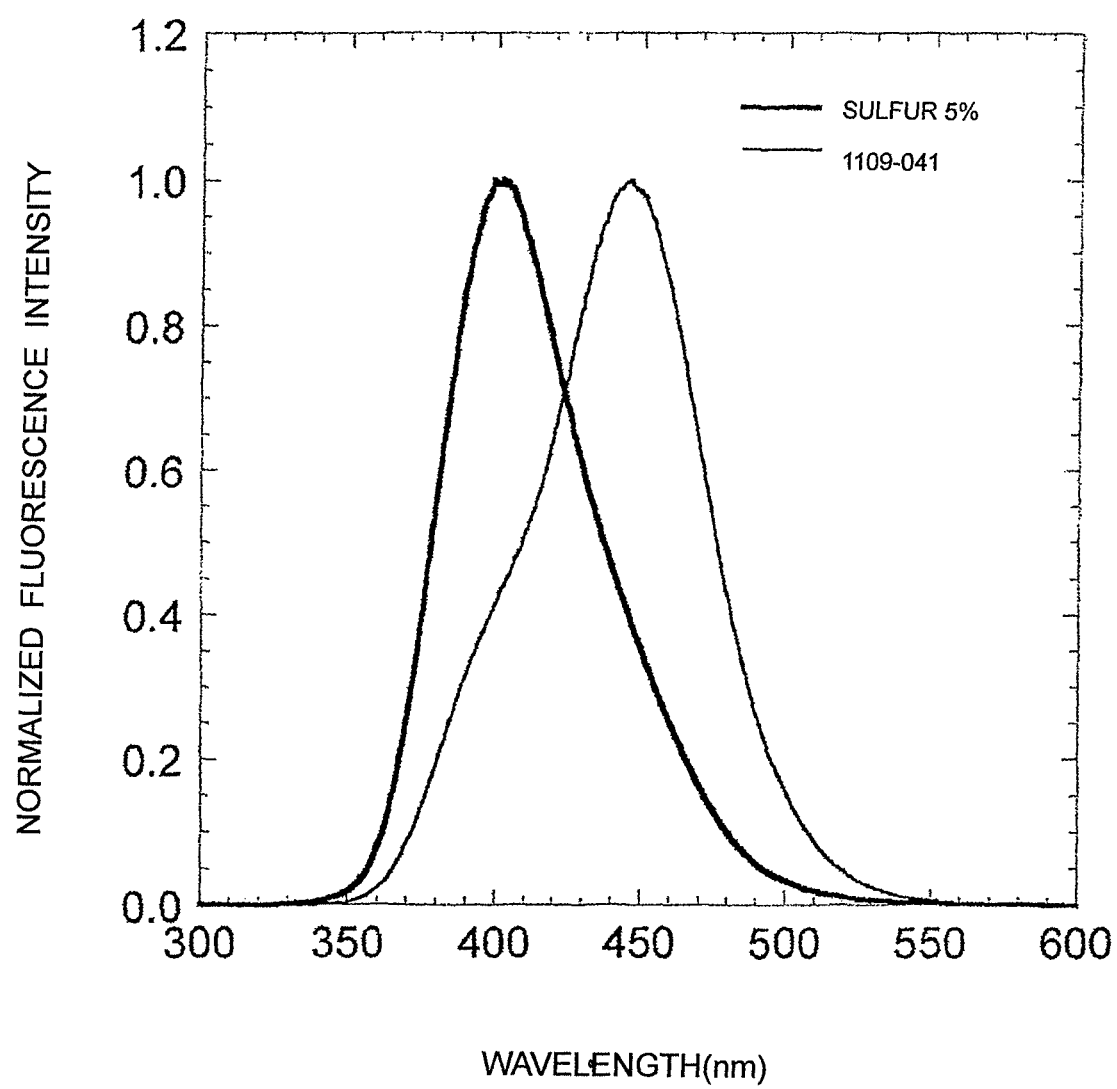

FIG. 9 shows the alpha-ray irradiation spectrum of ZnS:Ag based fluorescent material for detecting particle beams with Sulfur added by 5% and the alpha-ray irradiation spectrum of ZnS:Ag based fluorescent material (Type 1109-041, manufactured by Nichia Corporation) prepared for reference. It is found that ZnS:Ag based fluorescent material for detecting particle beams with Sulfur added by 5% in this embodiment emits fluorescent lights having the wavelengths from 320 nm to 600 nm and that its peak wavelength is 401 nm. In comparison for the shape of alpha-ray irradiation fluorescence spectrum for the fluorescent material, Type 1109-041, manufactured by Nichia Corporation, it is found that a global increase in the spectral intensity of the alpha-ray fluorescence spectrum observed at the wavelength around 400 nm for the fluorescent material, Type 1109-041, manufactured by Nichia Corporation corresponds to the alpha-ray irradiation spectrum of ZnS:Ag based fluorescent material for detecting particle beams in this embodiment. In addition, the quantity of fluorescence (an integral value of the intensity of fluorescence in a fluorescence spectrum) emitted from ZnS:Ag based fluorescent material for detecting particle beams in this embodiment was obtained so as to become 72% of the quantity of fluorescence emitted from the fluorescent material, Type 1109-041, manufactured by Nichia Corporation.

Figure 10:
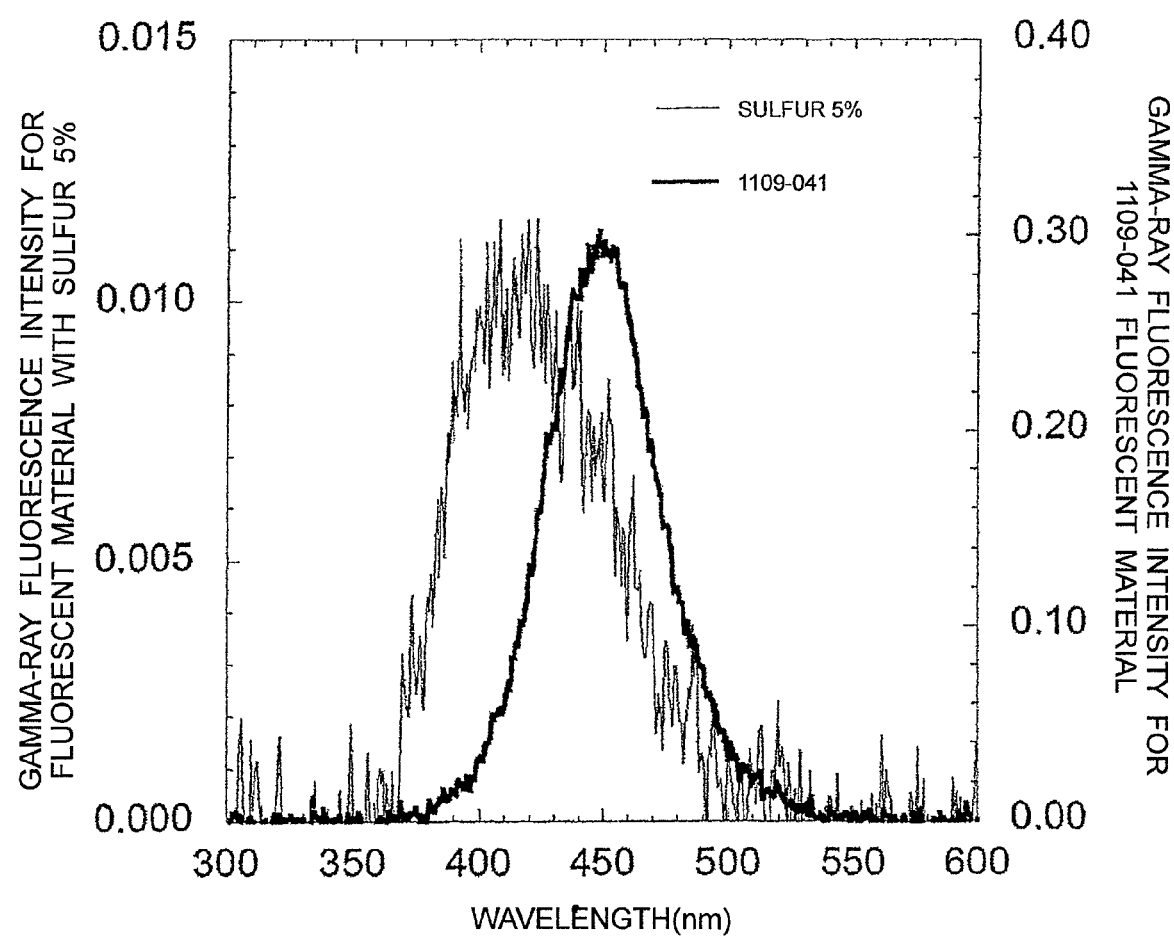

Next, a result of irradiating gamma-rays to ZnS:Ag based fluorescent material with Sulfur added by 5% will described below. As the sensitivity to gamma rays was very low in this fluorescent material, for the intensity of fluorescence at individual wavelengths were obtained by repeating gamma-ray irradiation measurements 100 times and averaging the measured values. FIG. 10 shows a line diagram for comparing the gamma-ray irradiation spectra measured for this fluorescent material and the conventional ZnS:Ag based fluorescent material (Type 1109-041, manufactured by Nichia Corporation.) It is proved that the quantity of fluorescence emitted from ZnS:Ag based fluorescent material for detecting particle beams with Sulfur added by 5% in this embodiment is significantly small and its peak wavelength is about 410 nm, and that its shape of fluorescence spectra is very similar to the shape of alpha-ray irradiation fluorescence spectrum shown in FIG. 9. Thus, in case of ZnS:Ag based fluorescent material, Type 1109-041, manufactured by Nichia Corporation, as its alpha-ray irradiation fluorescence spectrum plotted for reference extends in wavelengths from 350 nm to 550 nm and its peak wavelength is 450 nm, it is proved that the fluorescence spectrum from ZnS:Ag based fluorescent material for detecting particle beams in this embodiment is apparently different from the gamma-ray irradiation fluorescence spectrum from the conventional fluorescent material. As a result, it was able to be confirmed that ZnS:Ag based fluorescent material in this embodiment was such a fluorescent material that its fluorescence is emitted in the excitation mechanism different from the fluorescence observed in the gamma-ray irradiation spectrum of the conventional ZnS:Ag based fluorescent material.

It was also confirmed that the quantity of fluorescence (an integral value of the intensity of gamma-ray fluorescence light) emitted from ZnS:Ag based fluorescent material in this embodiment is significantly as low as 4.4% of the quantity of fluorescence emitted from ZnS:Ag based fluorescent material, Type 1109-041, manufactured by Nichia Corporation, and that ZnS:Ag based fluorescent material in this embodiment has a significantly low sensitivity to gamma rays. According to the fact that ZnS:Ag based fluorescent material in this embodiment has a significantly low sensitivity to gamma rays, it can be confirmed that ZnS:Ag based fluorescent material for detecting particle beams in this embodiment has an excitation mechanism in response to alpha rays and gamma rays different from the conventional ZnS:Ag based fluorescent materials.

Then, fluorescence lifetime characteristic with respect to alpha rays was measured by measuring pulse signals obtained by irradiating alpha rays to ZnS:Ag based fluorescent material for detecting particle beams in this embodiment by using an oscilloscope. As the specimen for measurement, the samples prepared in the above described method were used. As for the alpha-ray radiation source, an alpha-ray radiation source having a diameter of 10 mmφ which was prepared by electrodeposition of $^{241}$Am having a source intensity of 3.7 MBq on the effective region as radiation source was used, and then, the measurement was performed by irradiating alpha rays to the specimen in the configuration that a shielding plate with a hole having a diameter of 0.4 mmφ was placed in front of the alpha-ray radiation source in order to reduce the substantial source intensity to 1 kBq or lower. Alpha ray irradiation signals were detected by the photomultiplier arranged at one side of the measurement sample. As for the photomultiplier, Type R1924 photomultiplier manufactured by Hamamatsu Photonics K.K. was used and operated at an applied voltage of 1000V. Alpha-ray fluorescence signals so obtained were collected as waveform data by using Type LT344 oscilloscope manufactured by LeCroy Corporation. Measurements were performed with data collection conditions including a voltage resolution of 100 mV/div, a time-mesh resolution of 1 μs/div, a trigger level of 32 mV and a sampling frequency of 500 MHz.

Figure 11:
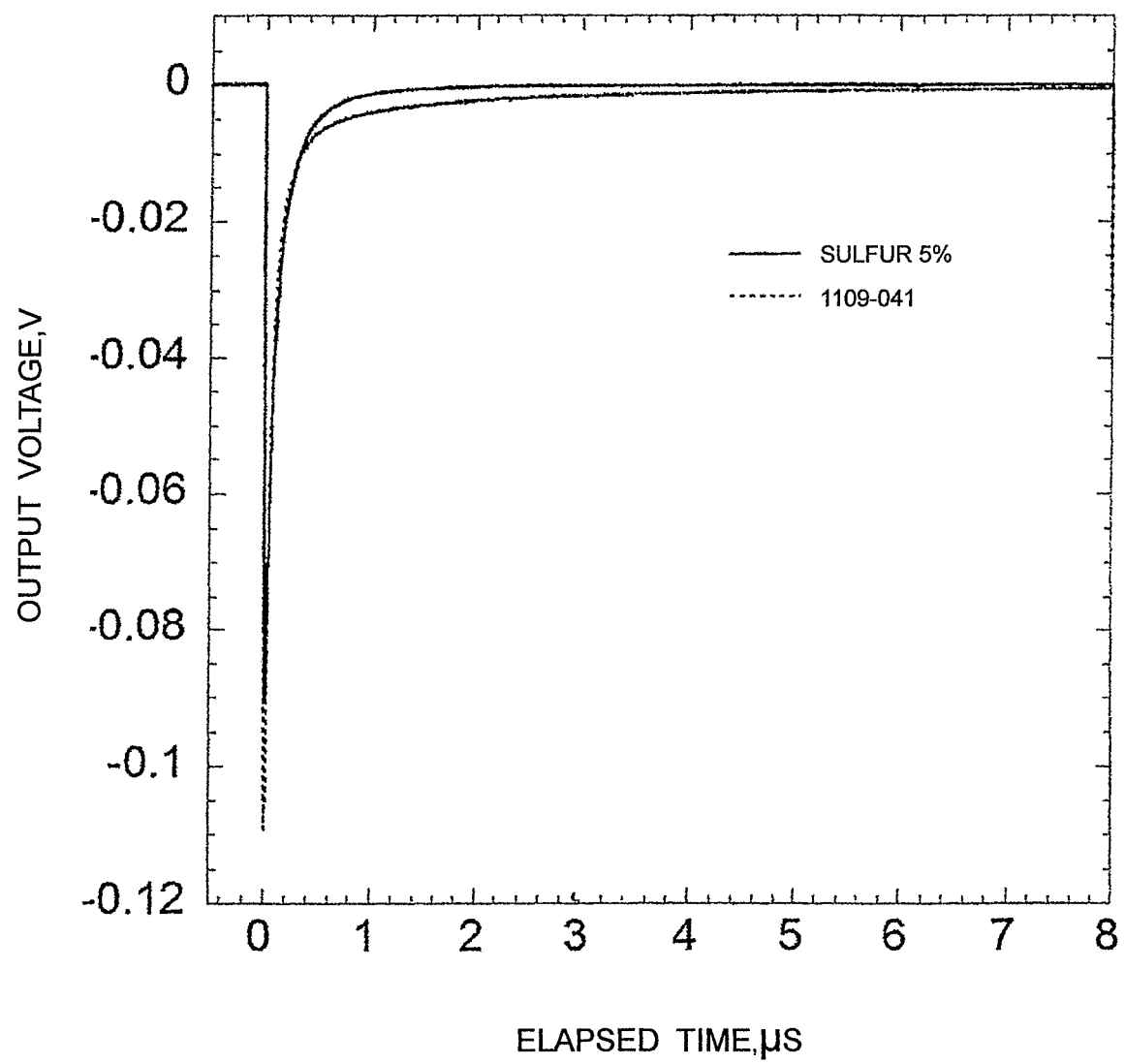

FIG. 11 shows the alpha-ray signal waveform obtained by averaging a set of 2000 measured signals for ZnS:Ag based fluorescent material with Sulfur added by 0.5% and the alpha-ray signal waveform measured for the conventional ZnS:Ag based fluorescent material (Type 1109-041, manufactured by Nichia Corporation) for comparison. In contrast to the conventional ZnS:Ag based fluorescent material which provides a signal waveform extending after 1 μs due to afterglow, it was able to be confirmed that to ZnS:Ag based fluorescent material for detecting particle beams according to the present invention provides a signal waveform indicating that almost all the fluorescence (herein referred to Photon) are emitted within 1 μs and the quantity of fluorescence emitted after 1 μs is significantly small.

Fluorescence lifetime characteristic was analyzed on the basis of obtained signals in order to study the effect of afterglow. As it is said conventionally that the decay time corresponding to the short-period spectrum component of fluorescence light emitted from ZnS:Ag fluorescent material is 1 μs or shorter, "Short-decay time" is defined to be elapsed time until the integral signal voltage reaches the value corresponding to the 0.632 (equivalent to $1-e^{-1}$) times larger than the total signal value obtained by integrating from 0 s to 1 μs. "Long-decay time" is defined to be an elapsed time until the integral signal voltage reaches the value corresponding to 0.632 (equivalent to $1-e^{-1}$) times larger than the total signal value obtained by integrating from 0 s to 8 μs corresponding to the decay time for the long-period spectrum component corresponding to afterglow. Note that a simple expression "decay time" in this embodiment refers to "short-decay time."

As a result of analysis, as for the decay time of from ZnS:Ag fluorescent material according to the present invention, the short-decay time was estimated to be 0.181 μs and the long-decay time was estimated to be 0.295 μs. In comparison with the conventional ZnS:Ag fluorescent material, the fluorescence lifetime characteristic according to the present invention is significantly improved in terms of short-decay time being reduced to be 66% and long-decay time being reduced to be 17%.

In order to estimate quantitatively the influence of afterglow remaining in the time domain, "afterglow ratio" was defined to be the value obtained by dividing the value of the total signal voltage obtained by integrating from 0 s to 8 μs by the value of the total signal voltage obtained by integrating from 0 s to 1 μs, and then afterglow ratio was calculated. As a result, it was proved in this embodiment that the signal voltage decays almost after 1 μs and the afterglow ratio is estimated to be 1.14 which means that the afterglow component almost disappears so as to be as low as 10%, and in contrast, it is proved in the conventional ZnS:Ag fluorescent material that the afterglow ratio is estimated to be 1.66 which means that the afterglow component remains to be more than 60% even after 8 μs.

As described above, it was able to be confirmed that ZnS:Ag based fluorescent material with Sulfur added by 5% for detecting particle beams has a significantly low sensitivity to gamma rays and also its decay time is short, and provides significantly small amounts of afterglow.

As another embodiment, one example of steps in manufacturing ZnS:Ag based fluorescent material for detecting particle beams as the first fluorescent material by adding Strontium Sulfide (SrS) as sulfide to be add-in material is shown. Detailed steps will be described by referring to a manufacturing method described in Embodiment 3 and following Embodiments.

50 g of Zinc Sulfide are used as a main raw material. Silver as an activating material is used in the form of Silver Nitrate and added by the weight fraction of 0.015% to the quantity of Zinc Sulfide. Lithium Chloride (LiCl) is used as a flux and added by the weight fraction of 6% to the quantity of Zinc Sulfide. Strontium Sulfide having a melting point at 2002° C. is used as an add-in material, and added by the weight fraction of 0.6% to the quantity of Zinc Sulfide. 20 cc of distilled water is added to and mixed with the above materials, and then is dried.

As for the crucible composed of graphite with its whole periphery being closed, a graphite crucible having an outer diameter of 60 mmφ and a length of 50 mm, an inner diameter of 10 mmφ, a bottom thickness of 10 mm and a lid thickness of 10 mm is used. The net volume for accommodating the materials is designed to be a diameter of 10 mmφ and a length of 30 mm. A hole having a diameter of 1 mmφ is provided at the center of the lid in order to release a part of sublimate substances generated from the calcination materials inside the crucible. Dried calcination materials are introduced inside the graphite crucible, and the lid is closed.

Next, the graphite crucible is held into the electric furnace and the calcination process is applied. As for the electric furnace, Electric Furnace KDF-S70 type manufactured by DENKEN Co., Ltd was used. The calcination process was performed in the following conditions.

Calcination Temperature: 820° C.
Cover Gas: $CO_2$ flowing at a flow rate of 2 liters per minute
Calcination Period of Time: 2 hours After sintered materials obtained after the calcination process were ground to powder, and further after rinsing the powder by water, ZnS:Ag based fluorescent material for detecting particle beams is finally obtained. The color of the obtained ZnS:Ag based fluorescent materials for detecting particle beams exhibits light yellowish-brown rather than white.

Fluorescent emission characteristics of ZnS:Ag based fluorescent material for detecting particle beams were studied with respect to alpha-ray irradiation and gamma-ray irradiation. The samples to be used to measure the fluorescent emission characteristics were prepared by applying the above described method. Measurements of fluorescence spectra obtained by alpha-ray irradiation and gamma-ray irradiation were performed in the configuration in which those measurement samples were located at the position where the individual sample was to be set up in the excitation light irradiation system of the fluorescence photometer. Measurements of fluorescence spectra were performed by using the above described method.

Figure 12:
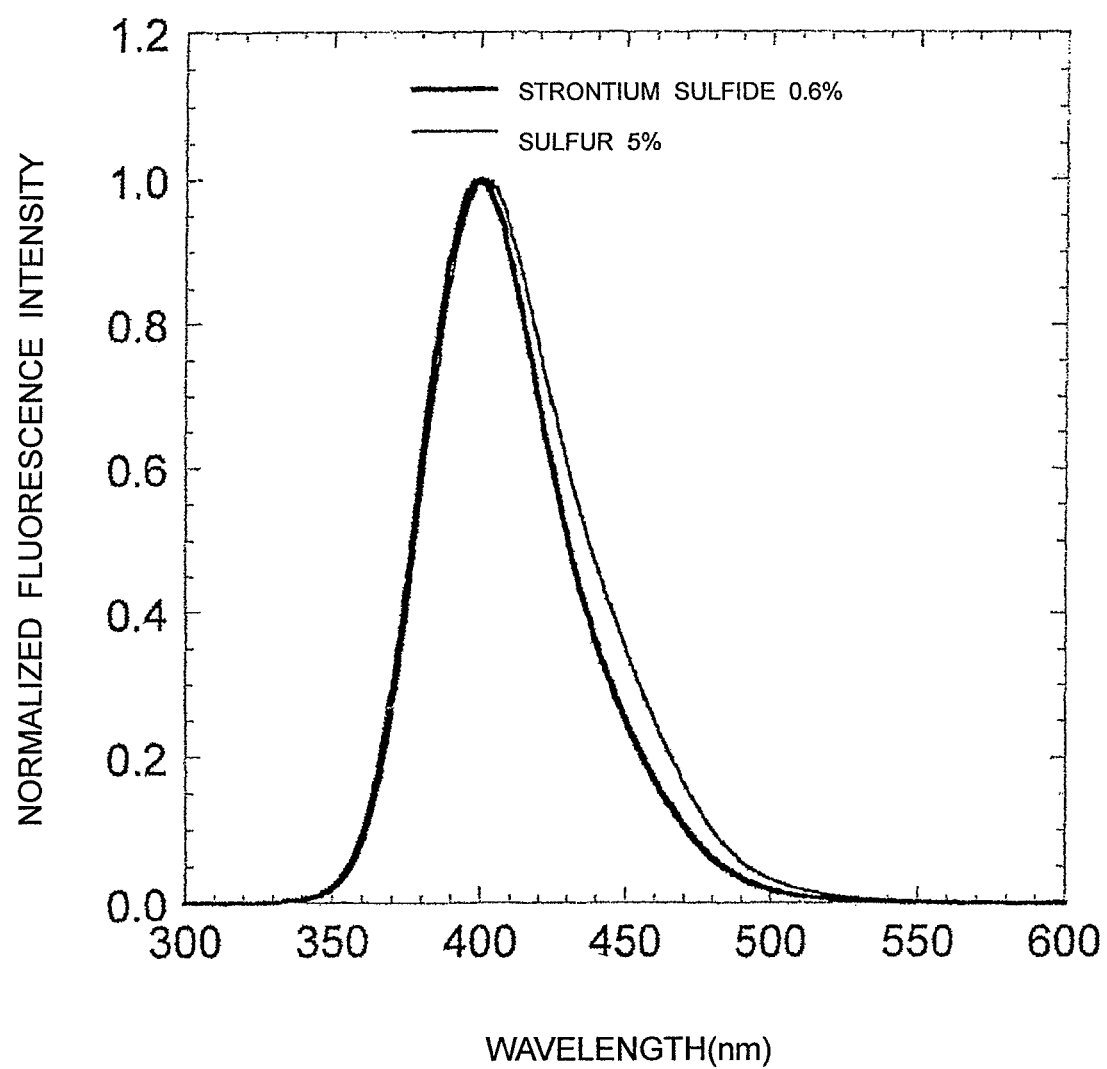

FIG. 12 shows the alpha-ray irradiation fluorescence spectrum of ZnS:Ag based fluorescent material for detecting particle beams with Strontium Sulfide added by 0.6% and the alpha-ray irradiation fluorescence spectrum of ZnS:Ag based fluorescent material for detecting particle beams with Sulfur added by 5% as described in Embodiment 1 for reference.

It was proved that ZnS:Ag based fluorescent material for detecting particle beams with Strontium Sulfide added by 0.6% in this embodiment emits fluorescent lights having the wavelengths from 320 nm to 580 nm and that its peak wavelength is 398 nm. In contrast, as shown in the first embodiment, ZnS:Ag based fluorescent material for detecting particle beams with Sulfur added by 5% in this embodiment emits fluorescent lights having the wavelengths from 320 nm to 580 nm and that its peak wavelength is 401 nm. In comparing those spectra, it is proved that both effective wavelength ranges of fluorescence emitted from those fluorescent materials are almost identical to each another and their peak wavelengths are almost identical to each another, but it is proved that the shapes of fluorescence spectra are different from each another, and the spectral intensity of the fluorescence spectrum of ZnS:Ag based fluorescent material with Sulfur added by 5% increases more globally at the longer wavelength range in comparison with ZnS:Ag based fluorescent material with Strontium Sulfide added by 0.6%.

Through studies of alpha-ray sensitive fluorescence spectra of eight (8) types of first fluorescent materials (zinc sulfide activated with silver based fluorescent material for detecting particle beams, which emits fluorescence with wavelengths from 320 nm to 580 nm in response to alpha-ray irradiation, and with a peak wavelength from 395 nm to 410 nm), manufactured by using various types of fluxes and add-in materials according to the manufacturing methods in Embodiments 3 and following embodiments, it is proved that alpha-rayسensitive fluorescence spectra may be generally categorized into two types of fluorescence spectra as described above. As for another parameters for categorization of shapes of alpha-ray irradiation fluorescence spectrum in addition to the peak wavelength, Sulfur-type and Sulfide-type are defined on a hypothetical basis as listed in Table 1, in which Sulfur-type, represented by Sulfur add-in materials, refers to alpha-ray irradiation fluorescence spectrum having a shape with its fluorescent intensity increasing slightly and globally in the longer wavelength range, and Sulfide-type, represented by Strontium Sulfide add-in materials, refers to alpha-ray irradiation fluorescence spectrum having a shape approximately similar to a symmetrical Gaussian distribution. $Li_2S$ added materials formed as Sulfide of Alkaline metal exhibited Sulfur-type.

TABLE 1

| | Add-in Material | | Flux | | Calcination Conditions | | Peak | |
|---|---|---|---|---|---|---|---|---|
| Sample Number | Material | Weight Fraction to ZnS (%) | Material | Weight Fraction to ZnS (%) | Temperature (° C.) | Time (Hour) | Wavelength (nm) | Fluorescence Spectrum Type |
| 1 | S | 5 | LiCl | 6 | 820 | 2 | 401.0 | Sulfur Type |
| 2 | SrS | 0.5 | LiCl | 6 | 820 | 2 | 398.0 | Sulfide Type |
| 3 | SrS | 1 | $SrBr_2$ | 2 | 920 | 3 | 403.0 | Sulfide Type |
| 4 | SrS | 0.8 | $BaBr_2$ | 3 | 920 | 3 | 405.0 | Sulfide Type |
| 5 | SrS + S | 1(SrS), 2(S) | LiCl | 6 | 820 | 2 | 402.0 | Sulfur Type |
| 6 | SrS + S | 1(SrS), 1(S) | $SrBr_2$ | 6 | 920 | 3 | 402.5 | Sulfur Type |
| 7 | SrS + S | 0.5(SrS), 2(S) | LiCl | 2 | 820 | 3 | 400.0 | Sulfur Type |
| 8 | S | 0.25 | LiCl | 6 | 820 | 3 | 401.0 | Sulfur Type |

Figure 13:
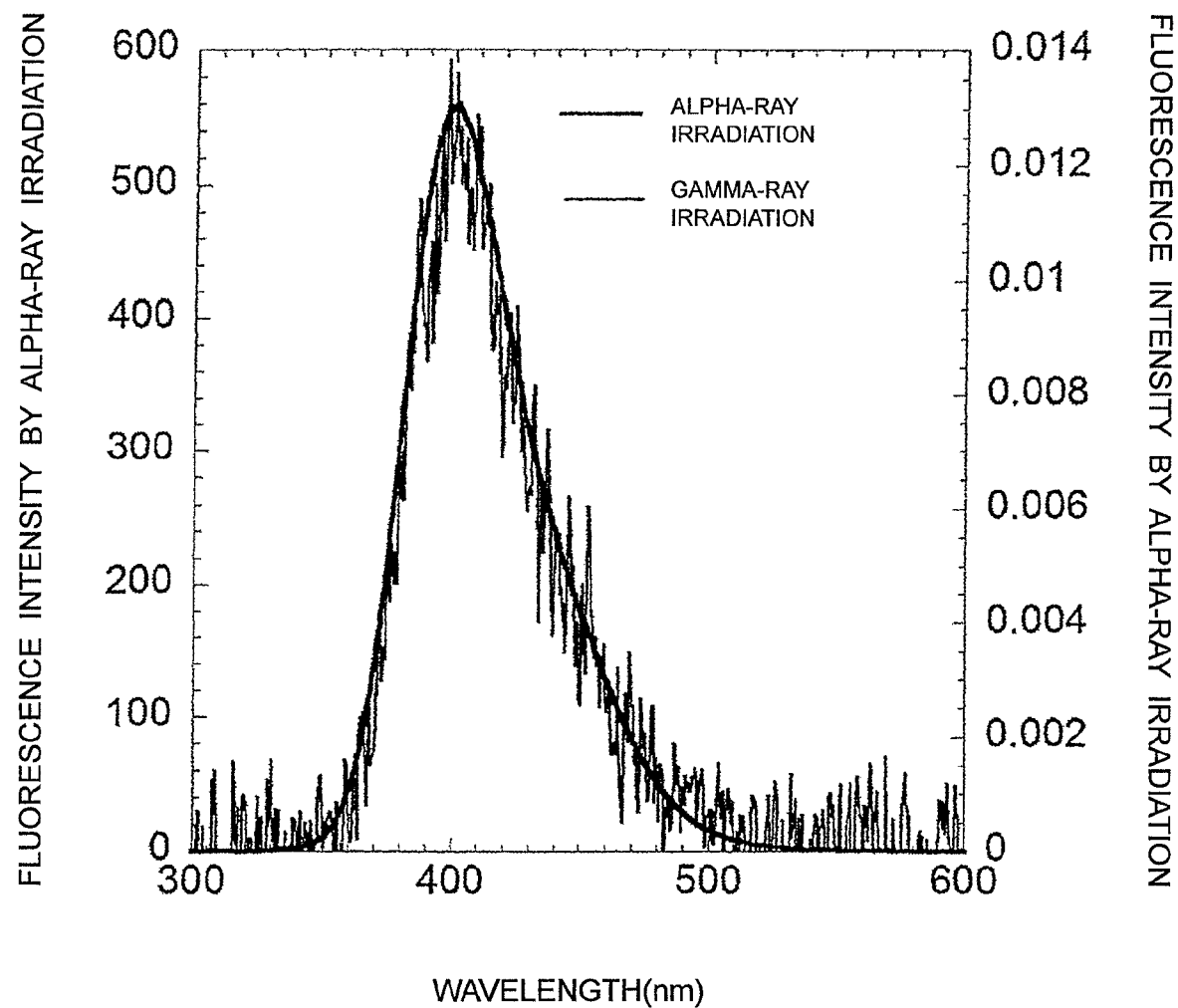

Next, a result of irradiating gamma-rays to ZnS:Ag based fluorescent material with Strontium Sulfide added by 0.6% will described below. As the sensitivity to gamma rays was very low in this fluorescent material, for the intensity of fluorescence at individual wavelengths were obtained by repeating gamma-ray irradiation measurements 100 times and averaging the measured values. FIG. 13 shows a line diagram for comparing the gamma-ray irradiation spectra measured for this fluorescent material and the above described alpha-ray irradiation fluorescence spectrum. By comparing the alpha-ray irradiation fluorescence spectrum with the gamma-ray irradiation spectrum, it is proved that their shapes of fluorescence spectra, their wavelength ranges of fluorescence, and their peak wavelengths are identical to each other, and thus two spectra are the same with respect to those fluorescence characteristics.

In comparison with gamma-ray irradiation fluorescence spectrum of ZnS:Ag based fluorescent material, Type 1109-041, manufactured by Nichia Corporation, it is proved that the wavelength range of fluorescence and its peak wavelength in this embodiment are completely different, and the quantity of fluorescence is significantly small. It was able to be confirmed that the quantity of fluorescence (an integral value of the intensity of fluorescence in the fluorescence spectrum) emitted from the fluorescent material in this embodiment is significantly as low as 4.5% of the quantity of fluorescence emitted from the fluorescent material, Type 1109-041, manufactured by Nichia Corporation, and that the fluorescent material in this embodiment has a significantly low sensitivity to gamma rays.

As a result, it was able to be confirmed that ZnS:Ag based fluorescent material for detecting particle beams in this embodiment is such a fluorescent material that its fluorescence is emitted in the excitation mechanism different from the conventional ZnS:Ag based fluorescent material.

Then, decay time with respect to alpha rays was measured by measuring pulse signals obtained by irradiating alpha rays to ZnS:Ag based fluorescent material for detecting particle beams in this embodiment by using an oscilloscope. Measurements of fluorescence spectra were performed by using the above described method.

Figure 14:
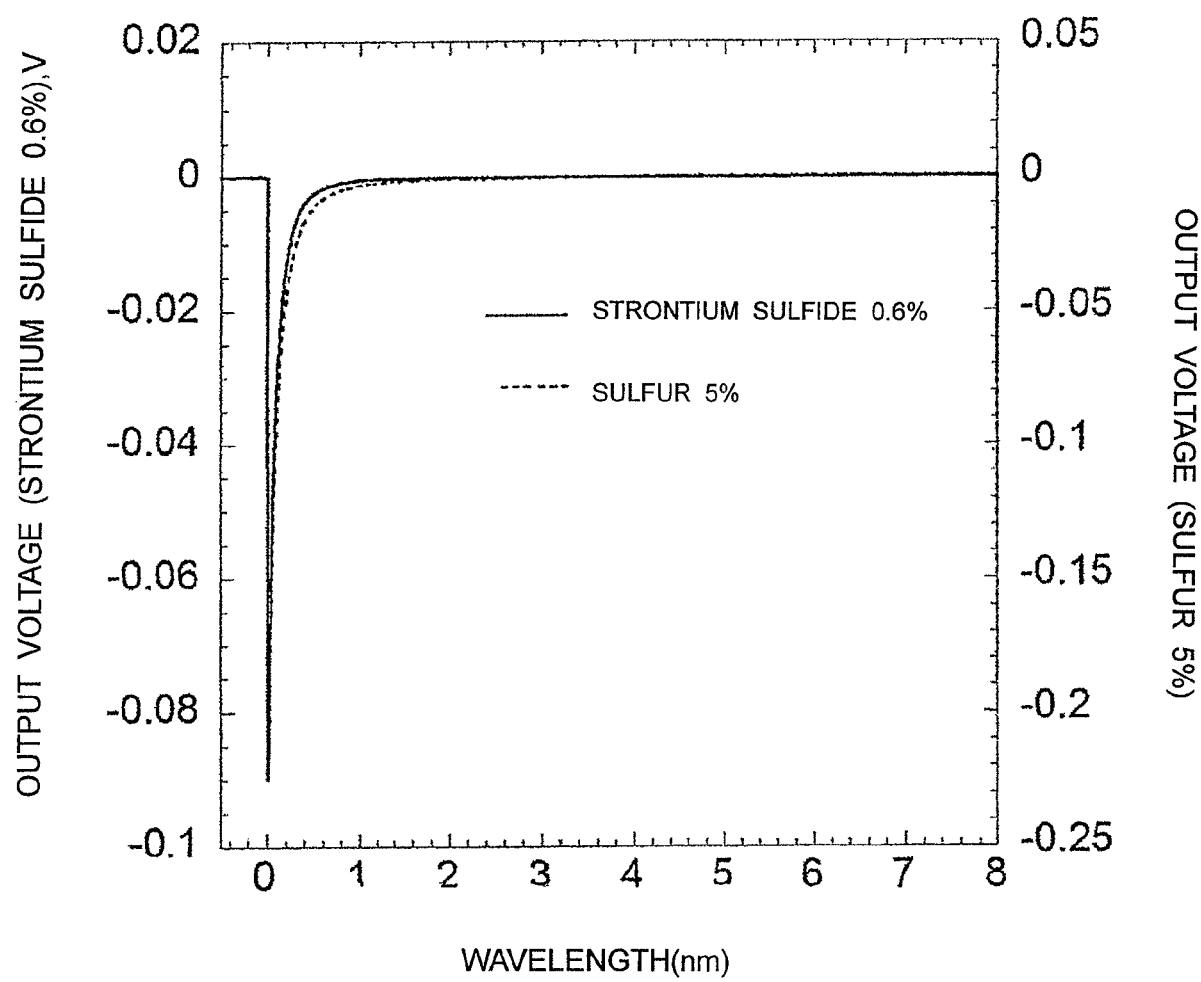

FIG. 14 shows the alpha-ray signal waveform obtained by averaging a set of 2000 measured signals for ZnS:Ag based fluorescent material for detecting particle beams with Strontium Sulfide added by 0.6% and the alpha-ray signal waveform measured for ZnS:Ag based fluorescent material for detecting particle beams with Sulfur added by 5% described in the first embodiment for comparison. The signal waveform from ZnS:Ag based fluorescent material for detecting particle beams with Strontium Sulfide added by 0.6% and the signal waveform from ZnS:Ag based fluorescent material for detecting particle beams with Sulfur added by 5% were identical to each other, and thus it was able to be confirmed again that most of the photons were emitted within 1 μs and the number of photons emitted after 1 μs was significantly small.

Fluorescence lifetime characteristic is analyzed ono the basis of obtained signals in order to study the effect of afterglow. The above described method for analysis was used. As a result of analysis, as for the decay time of from ZnS:Ag fluorescent material according to the present invention, the short-decay time is estimated to be 0.124 μs and the long-decay time is estimated to be 0.254 μs. In comparison with the conventional ZnS:Ag fluorescent material, the fluorescence lifetime characteristic according to the present invention was significantly improved in terms of short-decay time being reduced to be 45% and long-decay time being reduced to be 14%.

It is proved in this embodiment that the signal voltage decays almost after 1 μs and the afterglow ratio is estimated to be 1.08 which means that the afterglow component almost disappears so as to be less than 10%, and in contrast, it is proved in the conventional ZnS:Ag fluorescent material that the afterglow ratio is estimated to be 1.66 which means that the afterglow component remains to be more than 60% even after 8 μs. It is found that those characteristics are the same as ZnS:Ag fluorescent material for detecting particle beams with Sulfur added by 5%.

As described above, it was able to be confirmed that, similarly to ZnS:Ag based fluorescent material with Sulfur added by 5% for detecting particle beams as described above, ZnS:Ag based fluorescent material with Strontium Sulfide added by 0.6% for detecting particle beams had a significantly low sensitivity to gamma rays and also its decay time was short, and provided significantly small amounts of afterglow.

In summing up this embodiment, peak wavelengths of alpha-ray sensitive fluorescence spectra for eight types of first fluorescent materials manufactured by using various types of fluxes and add-in materials according to Embodiments 3 thorough 8 and their associated major manufacturing conditions are listed in Table 1. According to those results, it is proved that the peak wavelength considered to be one of most important parameters for identifying to ZnS:Ag based fluorescent material for detecting particle beams as the first fluorescent material changes in the range from 395 mm to 410 mm with its manufacturing conditions. It was also proved by studying those experimental results in detail that the fluorescent material including Halide used as a flux with Chloride had a peak wavelength a little shorter than the fluorescent material with Bromide.

The shape of the fluorescence spectrum obtained by alpha-ray irradiation to ZnS:Ag based fluorescent material for detecting particle beams as the first fluorescent material is now referred to as "alpha-ray sensitive fluorescence spectrum", which will be used in the description in Embodiment 2 and following Embodiments.

Embodiment 2

In Embodiment 2, what will be described is Zinc Sulfide activated with Silver (ZnS:Ag) based fluorescent material for detecting particle beams showing a synthesized fluorescence spectrum including a spectral component corresponding to the above described alpha-ray sensitive fluorescence spectrum, that is, the fluorescence spectrum for the fluorescence lights having wavelengths from 320 nm to 580 nm emitted in response to alpha-ray irradiation to ZnS:Ag based fluorescent material for detecting particle beams as the first fluorescent material, and having a peak wavelength from 395 nm to 410 nm;

and a spectral component corresponding to the fluorescence spectrum (herein referred to gamma-ray sensitive fluorescence spectrum) for the fluorescence lights having wavelengths from 380 nm to 560 nm emitted in response to gamma-ray or electron beam irradiation, and having a peak wavelength from 435 nm to 450 nm, in which the quantity of the synthesized fluorescence is 0.35 times larger than or less than 1 (one) time of the quantity of fluorescence for the later component. Note that the fraction of the quantity of fluorescence of alpha-ray sensitive fluorescence spectrum to the quantity of the synthesized fluorescence is defined and referred to as "alpha-ray detection factor" in the following description.

As the color of ZnS:Ag based fluorescent material for detecting particle beams described in Embodiment 1 exhibits light yellowish-brown rather than white, in case of using this ZnS:Ag based fluorescent material as neutron scintillator by being mixed with $^6$LiF or $^{10}B_2O_3$ acting as a neutron converter, the transmittance for fluorescence may be reduced due to coloring of light yellowish-brown, and hence, if the thickness of the neutron scintillator is made larger in order to increase the detection efficiency, the fluorescent generated in the depths of the neutron scintillator having a definite value of thickness are not emitted from the surface of the neutron scintillator, which resultantly reduces the detection efficiency, and thus it is substantially difficult to increase the thickness of the neutron scintillator.

In order to solve this problem, according to the phenomena found in developing ZnS:Ag based fluorescent material for detecting particle beams described in Embodiment 1 that, as the calcination process is performed by changing the quantity of Sulfur or Sulfide as an add-in material, the degree of coloring in ZnS:Ag based fluorescent material in the calcination process increases in proportion to the quantity of add-in materials, a manufacturing method for ZnS:Ag based fluorescent material for detecting particle beams is developed so that the degree of coloring in ZnS:Ag based fluorescent materials may not become an obstacle to its application to neutron scintillators. In addition, though ZnS:Ag based fluorescent material for detecting particle beams manufactured by this method may have a little influence by afterglow, the quantity of fluorescence in alpha-ray irradiation fluorescence spectrum increases advantageously in comparison with the quantity of fluorescence in ZnS:Ag based fluorescent materials as the first fluorescent material.

One example of steps in manufacturing ZnS:Ag based fluorescent material for detecting particle beams in this embodiment will be described below. Detailed steps will be described by referring to a manufacturing method described in Embodiment 3 and following Embodiments.

50 g of Zinc Sulfide are used as a main raw material. Silver as an activating material is used in the form of Silver Nitrate and added by the weight fraction of 0.015% to the quantity of Zinc Sulfide. Lithium Chloride is used as a flux and added by the weight fraction of 6% to the quantity of Zinc Sulfide. Strontium Sulfide is as an add-in material. In a specific embodiment, Strontium Sulfide is added by the weight fraction of 0.175% to the quantity of Zinc Sulfide. 20 cc of distilled water is added to and mixed with the above materials, and then is dried.

As for the crucible composed of graphite with its whole periphery being closed, a graphite crucible having an outer diameter of 60 mm$\varphi$ and a length of 50 mm, an inner diameter of 30 mm$\varphi$, a bottom thickness of 10 mm and a lid thickness of 10 mm is used. The net volume for accommodating the materials is designed to have a diameter of 30 mm$\varphi$ and a length of 30 mm. A hole having a diameter of 1 mm$\varphi$ is provided at the center of the lid in order to release a part of sublimate substances generated from the calcination materials inside the crucible. Dried calcination materials are introduced inside the graphite crucible, and the lid is closed.

Next, the graphite crucible is held into the electric furnace and the calcination process is applied. As for the electric furnace, Electric Furnace KDF-S70 type manufactured by DENKEN Co., Ltd was used. The calcination process was performed in the following conditions.

Calcination Temperature: 820° C.
Cover Gas: $CO_2$ flowing at a flow rate of 2 liters per minute
Calcination Period of Time: 2 hours After sintered materials obtained after the calcination process were ground to powder, and further after rinsing the powder by water, ZnS:Ag based fluorescent material for detecting particle beams is finally obtained. The color of ZnS:Ag based fluorescent materials for detecting particle beams manufactured by this manufacturing method changes from light yellowish-brown nearly to white as the quantity of Sulfur or Sulfide as an add-in material decreases. The color of ZnS:Ag based fluorescent material exhibits significantly light yellowish-brown.

Fluorescence characteristics of ZnS:Ag based fluorescent material for detecting particle beams so obtained as described above were studied with respect to alpha-ray irradiation and gamma-ray irradiation. The samples to be used to measure the fluorescence characteristics were prepared by applying the method described in Embodiment 1. Measurements of fluorescence spectra obtained by alpha-ray irradiation and gamma-ray irradiation were performed in the configuration in which those measurement samples are located at the position where the individual sample is to be set up in the excitation light irradiation system of the fluorescence photometer.

Figure 15:
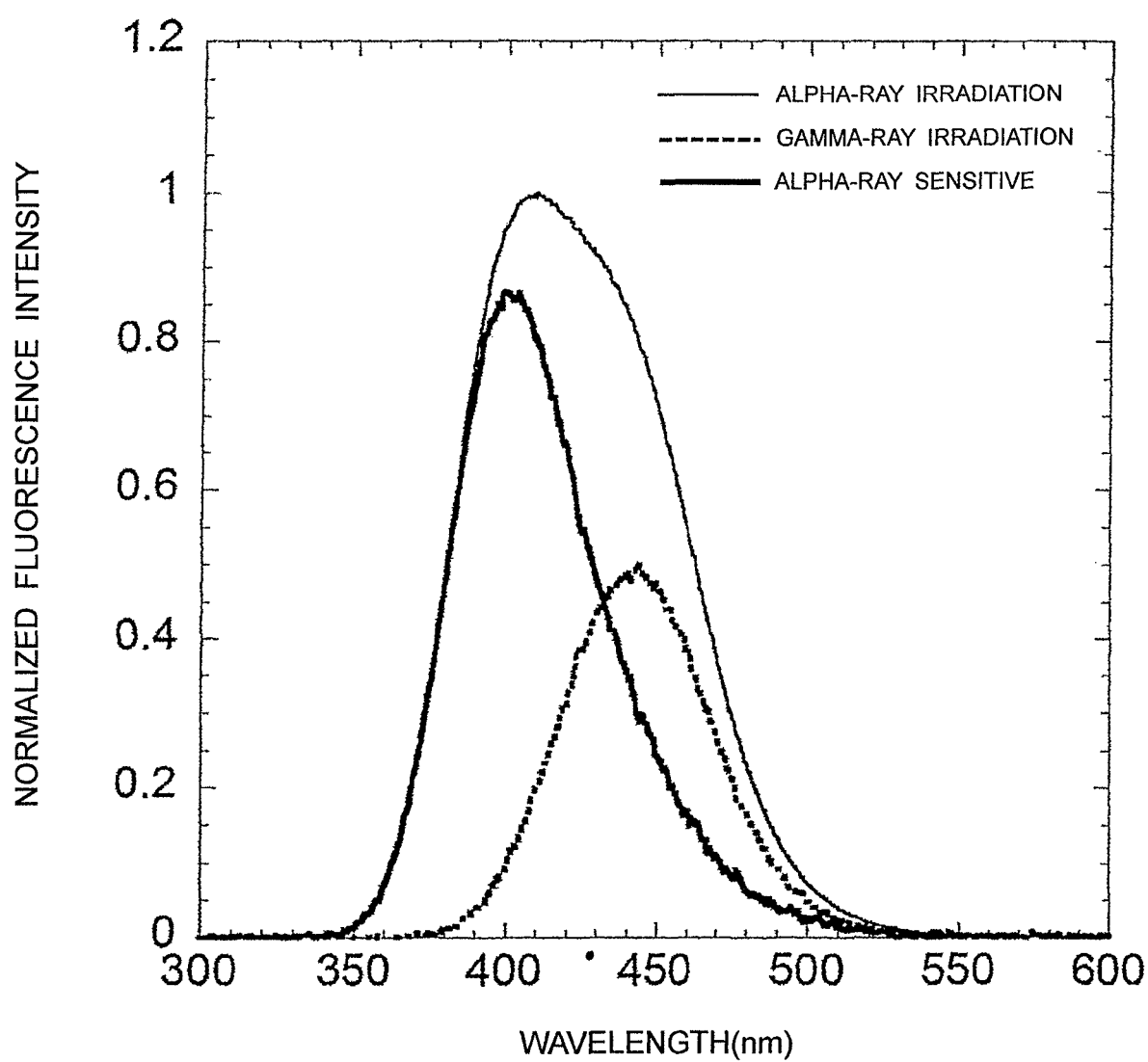

As for the alpha-ray irradiation fluorescence spectrum so obtained for ZnS:Ag based fluorescent material manufactured in the calcination process by adding Strontium Sulfide by 0.175%, and the gamma-ray irradiation fluorescence spectrum so obtained by irradiating gamma-rays, their normalized fluorescence spectra were obtained by normalizing their observed maximum values to 1 (one), and then, an alpha-ray sensitive fluorescence spectrum was obtained by subtracting the gamma-ray irradiation fluorescence spectrum from the alpha-ray irradiation fluorescence spectrum, and thus FIG. 15 shows those three types of fluorescence spectra so obtained. Note that, as for the gamma-ray irradiation fluorescence spectrum used for subtracting operation, as a gamma-ray irradiation fluorescence spectrum cannot be obtained with a sufficient accuracy because the thickness of the sample, prepared by the same method as used in preparing the samples for alpha-ray irradiation measurement, is very mall, the gamma-ray irradiation measurement was performed by using a sample having a thickness 10 times larger than the sample for the alpha-ray irradiation measurement. In the following embodiments, as for the fluorescence spectra used for subtracting operation, fluorescence spectra obtained by such a method as described above were used.

It is proved that ZnS:Ag based fluorescent material for detecting particle beams with Strontium Sulfide added by 0.175% in this embodiment emits fluorescent lights having the wavelengths from 320 nm to 580 nm in response to alpha-ray irradiation. On the other hand, it is difficult to define its peak wavelength because the fluorescence spectrum includes the component of alpha-ray sensitive fluorescence spectrum and the component of gamma-ray sensitive fluorescence spectrum, and its peak part may be shaped to be flat according to the fraction between those components. In this embodiment, the peak wavelength was able to be determined to be 410 nm because the fraction of the component of alpha-ray sensitive fluorescence spectrum was larger, and thus its peak is able to be recognized easily.

Figure 16:
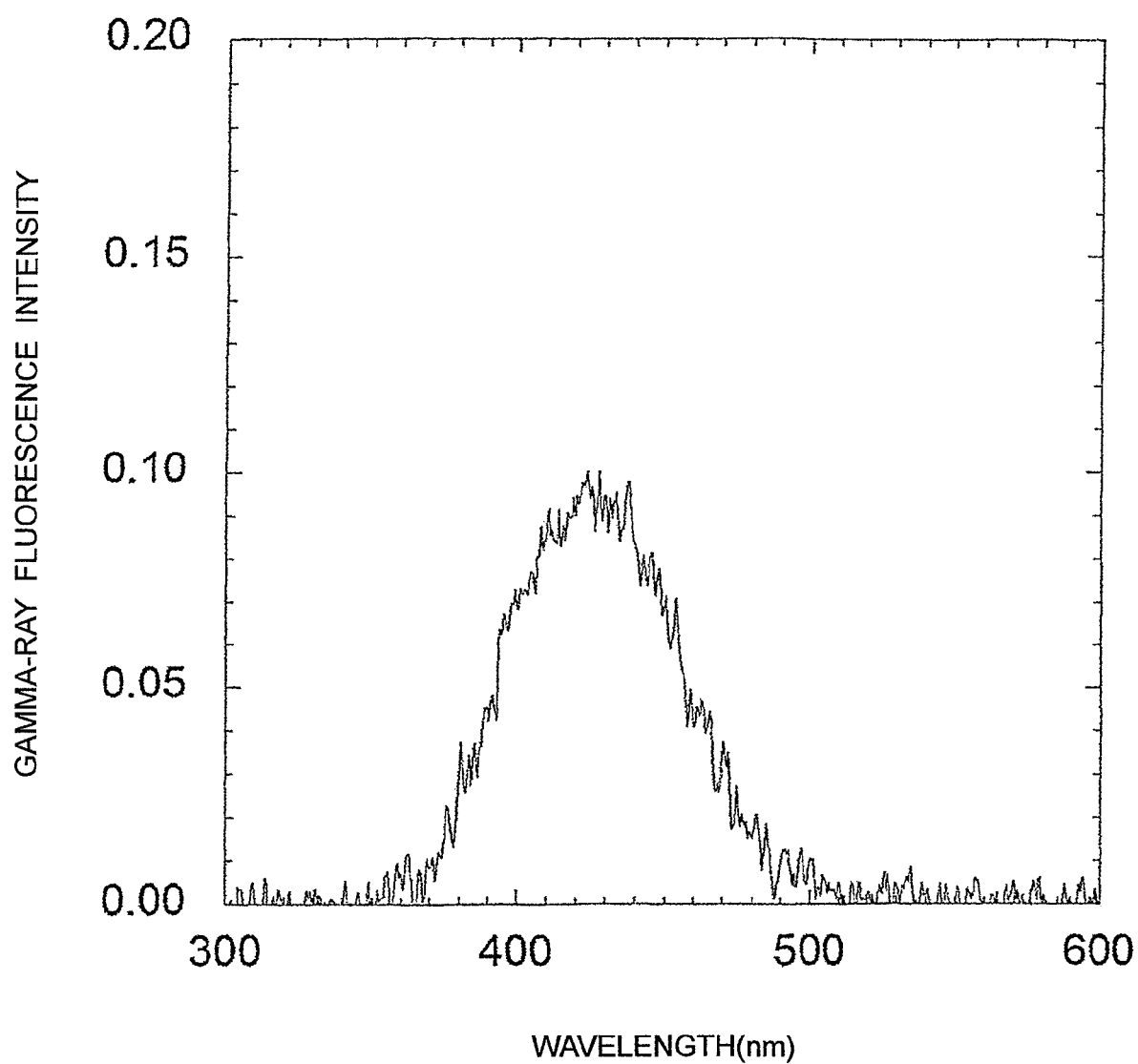

FIG. 16 shows gamma-ray irradiation fluorescence spectrum obtained by irradiating gamma-rays to ZnS:Ag based fluorescent material for detecting particle beams with Strontium Sulfide added by 0.175%. The peak wavelength is 430 nm, which was proved to be shifted to the wavelength slightly shorter than the peak wavelength, 450 nm, of ZnS:Ag based fluorescent material, Type 1109-041, manufactured by Nichia Corporation. It was able to be also confirmed that the quantity of fluorescence (an integral value of the intensity of fluorescent lights in the fluorescence spectrum) emitted from ZnS:Ag based fluorescent material for detecting particle beams in this embodiment is as low as 40% of the quantity of fluorescence emitted from ZnS:Ag based fluorescent material, Type 1109-041, manufactured by Nichia Corporation, and thus ZnS:Ag based fluorescent material for detecting particle beams in this embodiment has a significantly low sensitive to gamma rays.

In this embodiment, the fraction of alpha-ray sensitive irradiation fluorescence spectrum to alpha-ray irradiation fluorescence spectrum was proved to be 0.64%, and thus, it was able to be confirmed that the quantity of fluorescence of alpha-ray sensitive fluorescence spectrum was about twice as large as the quantity of fluorescence of gamma-ray sensitive fluorescence spectrum. In addition, the quantity of fluorescence (an integral value of the intensity of fluorescence in a fluorescence spectrum) emitted from ZnS:Ag based fluorescent material in this embodiment was 105% of the quantity of fluorescence emitted from ZnS:Ag based fluorescent material, Type 1109-041, manufactured by Nichia Corporation, and thus they were almost identical to each other.

Then, fluorescence lifetime characteristic with respect to alpha rays was measured by measuring pulse signals obtained by irradiating alpha rays to ZnS:Ag based fluorescent material for detecting particle beams in this embodiment by using an oscilloscope. The evaluation method described in Embodiment 1 was used.

Figure 17:
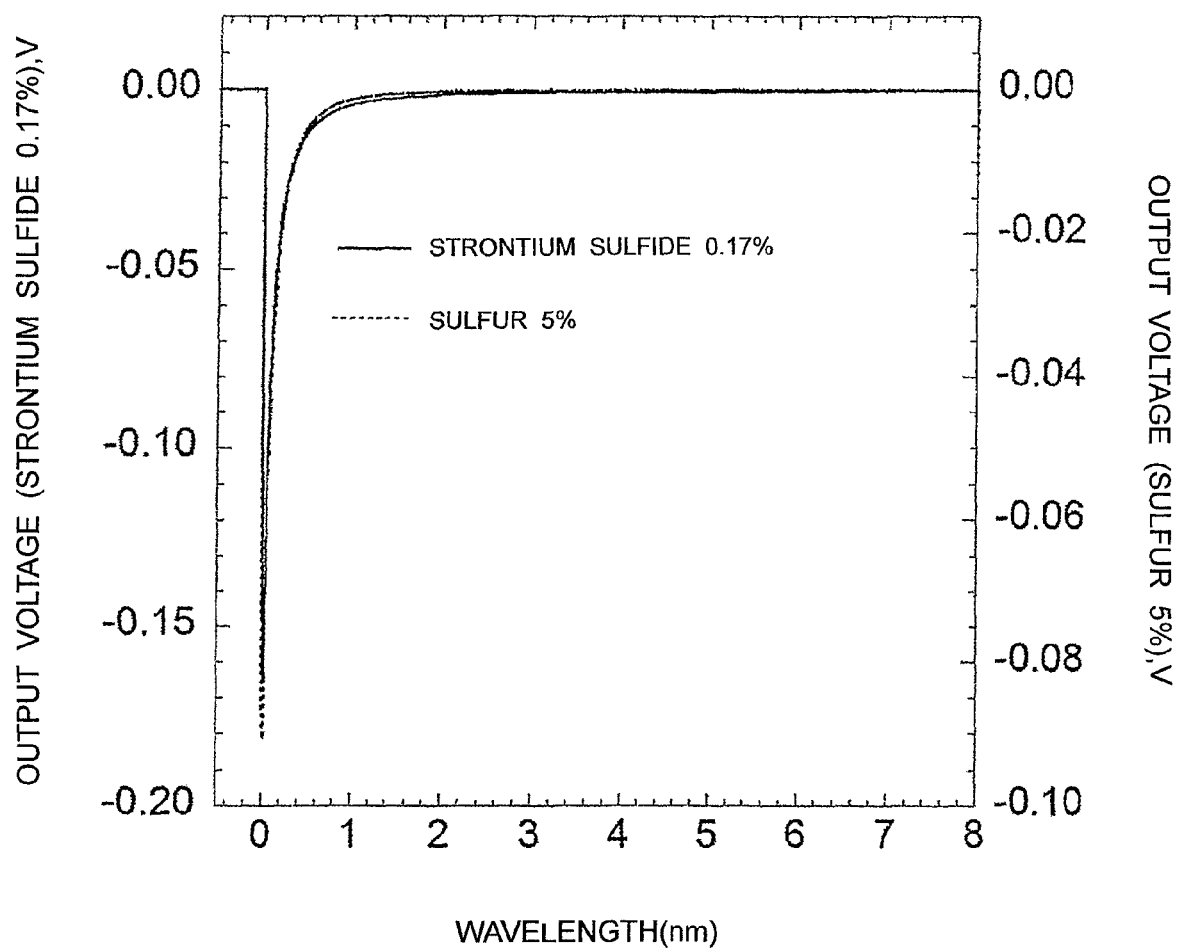

FIG. 17 shows the alpha-ray signal waveform obtained by averaging a set of 2000 measured signals for ZnS:Ag based fluorescent material for detecting particle beams with Strontium Sulfide added by 0.175% together with the alpha-ray signal waveform measured for ZnS:Ag based fluorescent material for detecting particle beams with Sulfur added by 5% described in Embodiment 1 for comparison. It can be confirmed in ZnS:Ag based fluorescent material for detecting particle beams in this embodiment that most of the fluorescence is emitted within 1 μs and the number of photons emitted after 1 μs is significantly small. It is also proved that the quantity of fluorescence emitted after 1 μs only increases slightly in contrast to ZnS:Ag based fluorescent material for detecting particle beams with Strontium Sulfide added by 5% described in Embodiment 1.

Decay time characteristic was analyzed on the basis of obtained signals in order to study the effect of afterglow. The analysis method described in Embodiment 1 was used.

As a result of analysis, as for the decay time of from ZnS:Ag fluorescent material for detecting particle beams according to the present invention, the short-decay time is estimated to be 0.227 μs and the long-decay time is estimated to be 0.527 μs. In comparison with the conventional ZnS:Ag fluorescent material, the fluorescence lifetime characteristic according to the present invention was significantly improved in terms of short-decay time reduced to be 83% and long-decay time reduced to be 30%. As for the afterglow ratio, as the alpha-ray irradiation fluorescence spectrum includes the component of the conventional fluorescence spectrum, it was confirmed that the afterglow ratio increased slightly up to 1.27 in comparison with ZnS:Ag fluorescent material for detecting particle beams as the first fluorescent material described in Embodiment 1.

Embodiment 3

In this embodiment, three examples of manufacturing method for ZnS:Ag fluorescent materials for detecting particle beams as the first fluorescent material and the second fluorescent materials will be described; a manufacturing method for ZnS:Ag fluorescent materials for detecting particle beams as the first fluorescent material by adding Lithium Sulfide ($Li_2S$) as an add-in material together with Zinc Sulfide as a main raw material, Silver as an activating material, and flux, a manufacturing method for ZnS:Ag fluorescent material for detecting particle beams as the first fluorescent material by adding mixture of Sulfur and Strontium as an add-in material, and a manufacturing method for ZnS:Ag fluorescent material for detecting particle beams as the second fluorescent material by adding Calcium Sulfide (CaS) as an add-in material.

Figure 18:
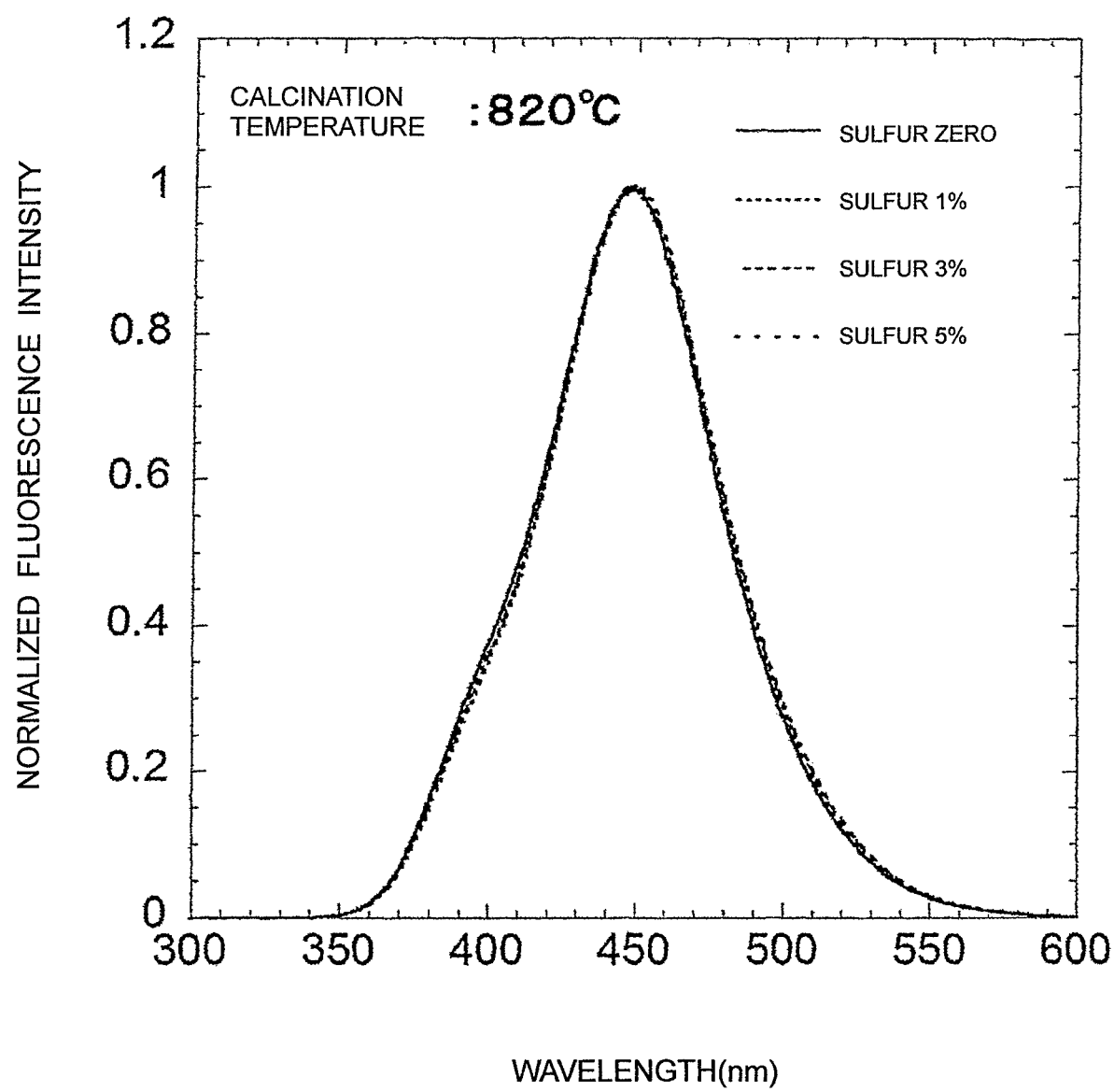

A result of studying an influence of the introduction of Sulfur to Zinc Sulfide over the component of alpha-ray sensitivity fluorescence spectrum is described at first before describing details of the manufacturing methods. An experiment was performed in which a calcination process was applied by changing the quantity of Sulfur from 0% to 5% by weight only using Zinc Sulfide and Silver as an activating material without flux added. The calcination temperature was 820° C. The median grain size of Zinc Sulfide used was 8 μm. As for Zinc Sulfide used as a main raw material in Embodiment 1 through Embodiment 8, its median grain size was 8 μm except in a special case to be described below. FIG. 18 shows a result of measurement of alpha-ray irradiation fluorescence spectrum for ZnS:Ag fluorescent materials obtained in this experiment. There were almost no changes in Alpha-ray irradiation fluorescent spectra even by changing the quantity of added Sulfur from 0% to 5%.

Figure 19:
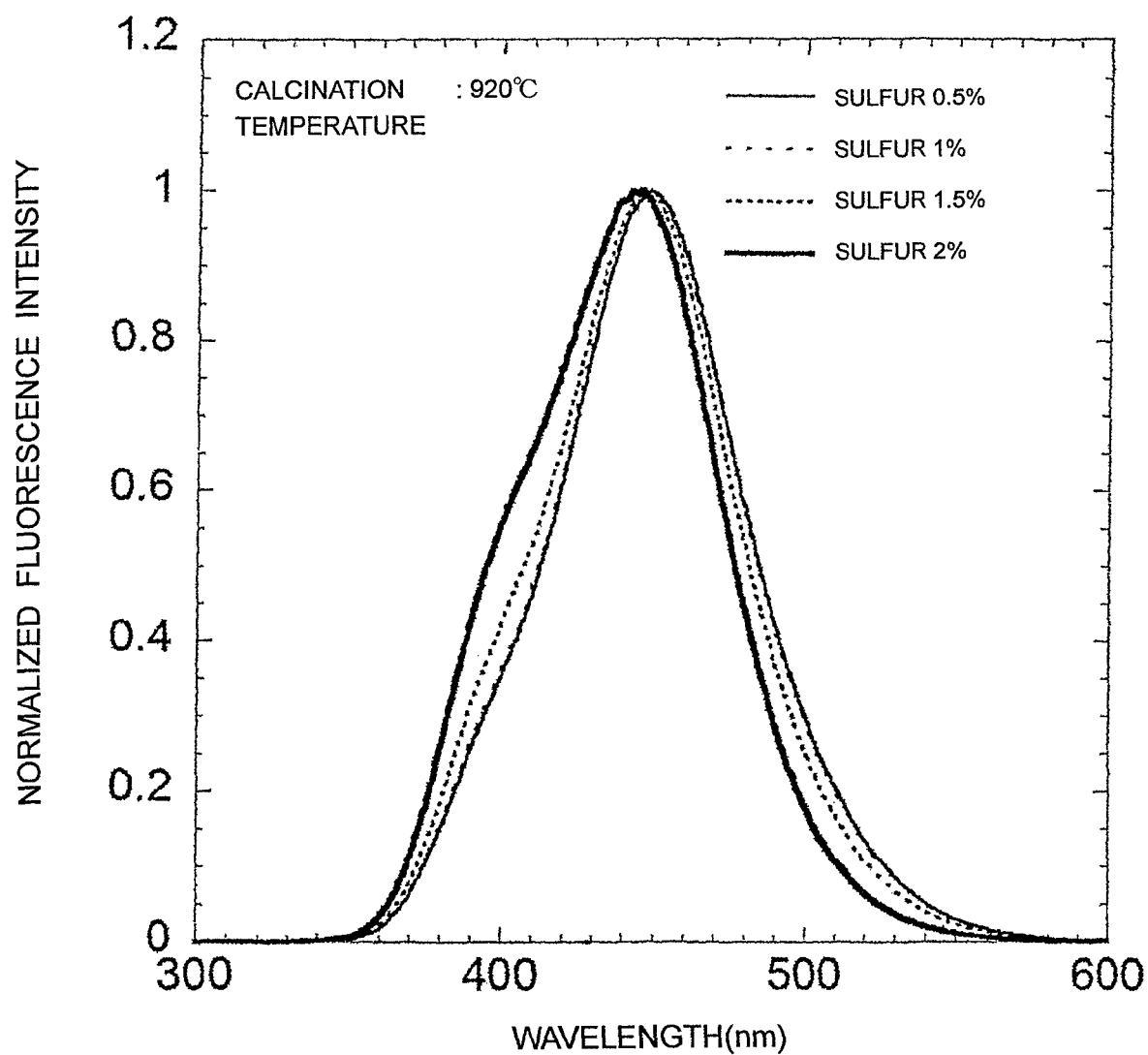

An experiment identical to the same experiment as described above was performed by changing the median grain size of Zinc Sulfide to 3 μm so that the contact area for Zinc Sulfide to Sulfur may increase, that is, the effective surface area of ZnS may increase, and by increasing the calcination temperature up to 920° C. so that Sulfur may be introduced easily into Zinc Sulfide. FIG. 19 shows a result of measurement of alpha-ray irradiation fluorescence spectrum for ZnS:Ag fluorescent materials obtained in this experiment. It was able to be confirmed that the component of alpha-ray sensitive fluorescence spectrum increases as well as its peak position was shifted to the shorter wavelength range if the quantity of Sulfur so added exceeds 1.5% in term of weight fraction. It was able to be confirmed, therefore, that the component of alpha-ray sensitive fluorescence spectrum increases as the component of Sulfur increased. It was able to be also confirmed from those experimental results that the quantity of Sulfur to be introduced was significantly small if flux is not used in the calcination process with Sulfur added as an add-in material, and that a good effect by using flux in introducing Sulfur or Sulfide was obtained definitely.

Figure 20:
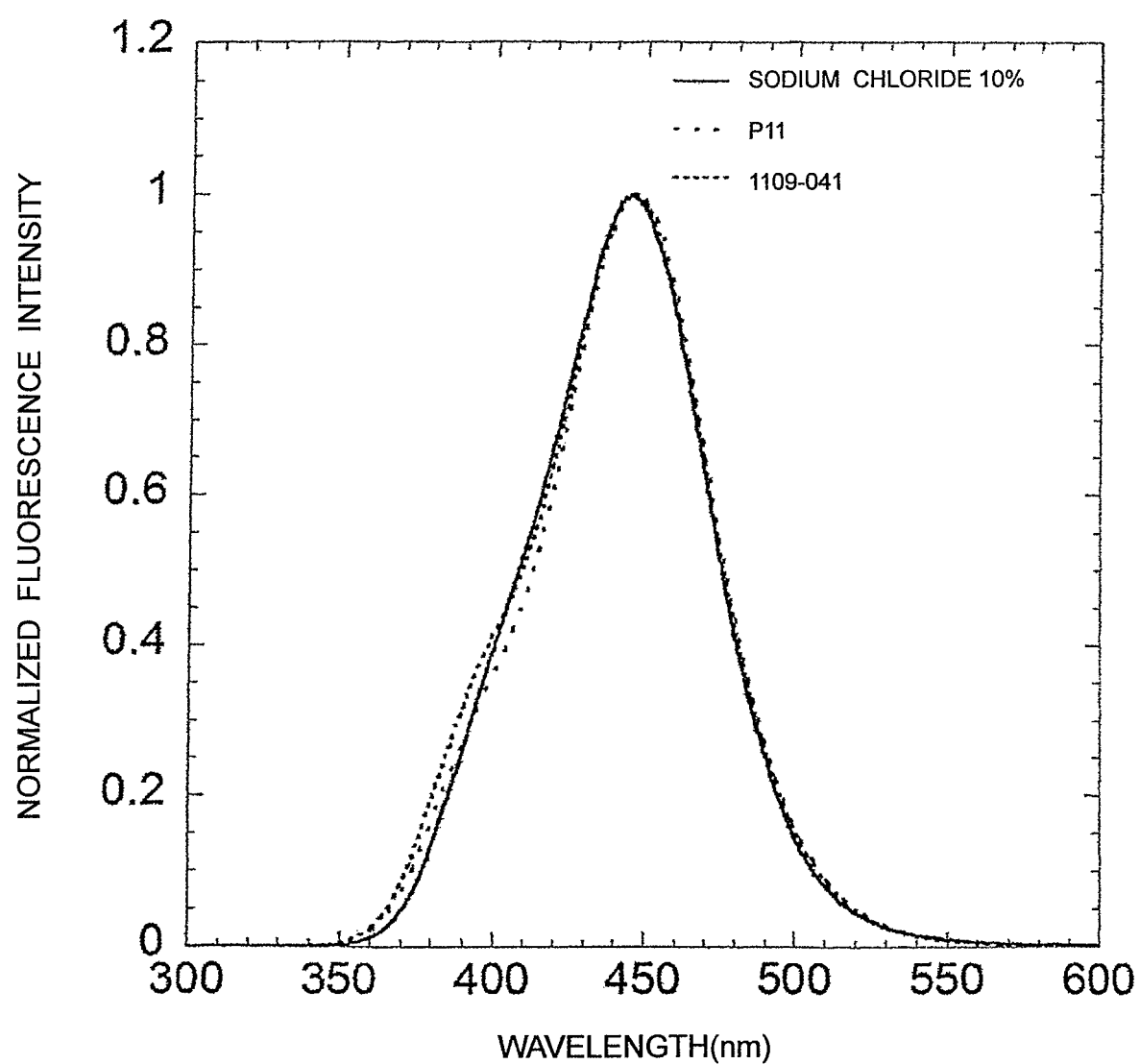

As there was an experience in increasing the quantity of flux as an expecting method for increase the component of alpha-ray sensitive fluorescence spectrum, a calcination process was performed at the calcination temperature of 920° C. without Sulfur added, and by adding Sodium Chloride (NaCl) conventionally used as a flux by the weight fraction 10% of the weight of ZnS which was approximately two times larger as compared with conventional method. FIG. 20 shows the fluorescence spectrum obtained by irradiating alpha rays in this embodiment, and the fluorescence spectra of P11 fluorescent material and 1109-041 ZnS:Ag—Cl fluorescent material manufactured by Nichia Corporation, those measured for comparison. The alpha-ray irradiation fluorescence spectrum identical to that of the conventional ZnS:Ag fluorescent material was obtained. According to this experimental result, it was able to be confirmed again that the component of alpha-ray sensitive fluorescence spectrum cannot be increased only by increasing the quantity of Sodium Chloride as a flux, and that the component of alpha-ray sensitive fluorescence spectrum can be increased substantially by adding Sulfur or Sulfide.

Based on the experimental results described above, an embodiment of manufacturing method for ZnS:Ag based fluorescent material for detecting particle beams as the first fluorescent material prepared by applying the calcination process with Lithium Sulfide ($Li_2S$) added as Sulfide of alkaline metal by the weight fraction of 0.25% to the quantity of Zinc Sulfide will be described below.

50 g of Zinc Sulfide are used as a main raw material. Silver (Ag) as an activating material is used in the form of Silver Nitrate and added by the weight fraction of 0.015% to the quantity of Zinc Sulfide. Lithium Chloride is used as a flux and added by the weight fraction of 6% to the quantity of Zinc Sulfide. Lithium Chloride having a melting point at 613° C. is used as an add-in material, and added by the weight fraction of 0.25% to the quantity of Zinc Sulfide. 20 cc of distilled water is added to and mixed with the above materials, and then is dried.

As for the crucible composed of graphite with its whole periphery being closed, a graphite crucible having an outer diameter of 60 mmφ and a length of 50 mm, an inner diameter of 10 mmφ, a bottom thickness of 10 mm and a lid thickness of 10 mm is used. The net volume for accommodating the materials is designed to be a diameter of 10 mmφ and a length of 30 mm. A hole having a diameter of 1 mmφ is provided at the center of the lid in order to release a part of sublimate substances generated from the calcination materials inside the crucible. Dried calcination materials are introduced inside the graphite crucible, and the lid is closed.

Next, the graphite crucible is held into the electric furnace and the calcination process is applied. As for the electric furnace, Electric Furnace KDF-S70 type manufactured by DENKEN Co., Ltd which has a maximum operating temperature at 1100° C. was used. The calcination process was performed in the following conditions.

Calcination Temperature: 820° C.

Cover Gas: $CO_2$ flowing at a flow rate of 2 liters per minute

Calcination Period of Time: 3 hours

After sintered materials obtained after the calcination process were ground to powder, and further after rinsing the powder by water, ZnS:Ag based fluorescent material for detecting particle beams is finally obtained. The color of the obtained ZnS:Ag based fluorescent materials for detecting particle beams exhibits light yellowish-brown rather than white.

Fluorescent emission characteristics of ZnS:Ag based fluorescent materials so obtained were studied with respect to alpha-ray irradiation and gamma-ray irradiation. The samples to be used to measure the fluorescent emission characteristics were prepared by applying the method described in Embodiment 1. Measurements of fluorescence spectra obtained by alpha-ray irradiation and gamma-ray irradiation were performed in the configuration in which those measurement samples are located at the position where the individual sample is to be set up in the excitation light irradiation system of the fluorescence photometer.

Figure 21:
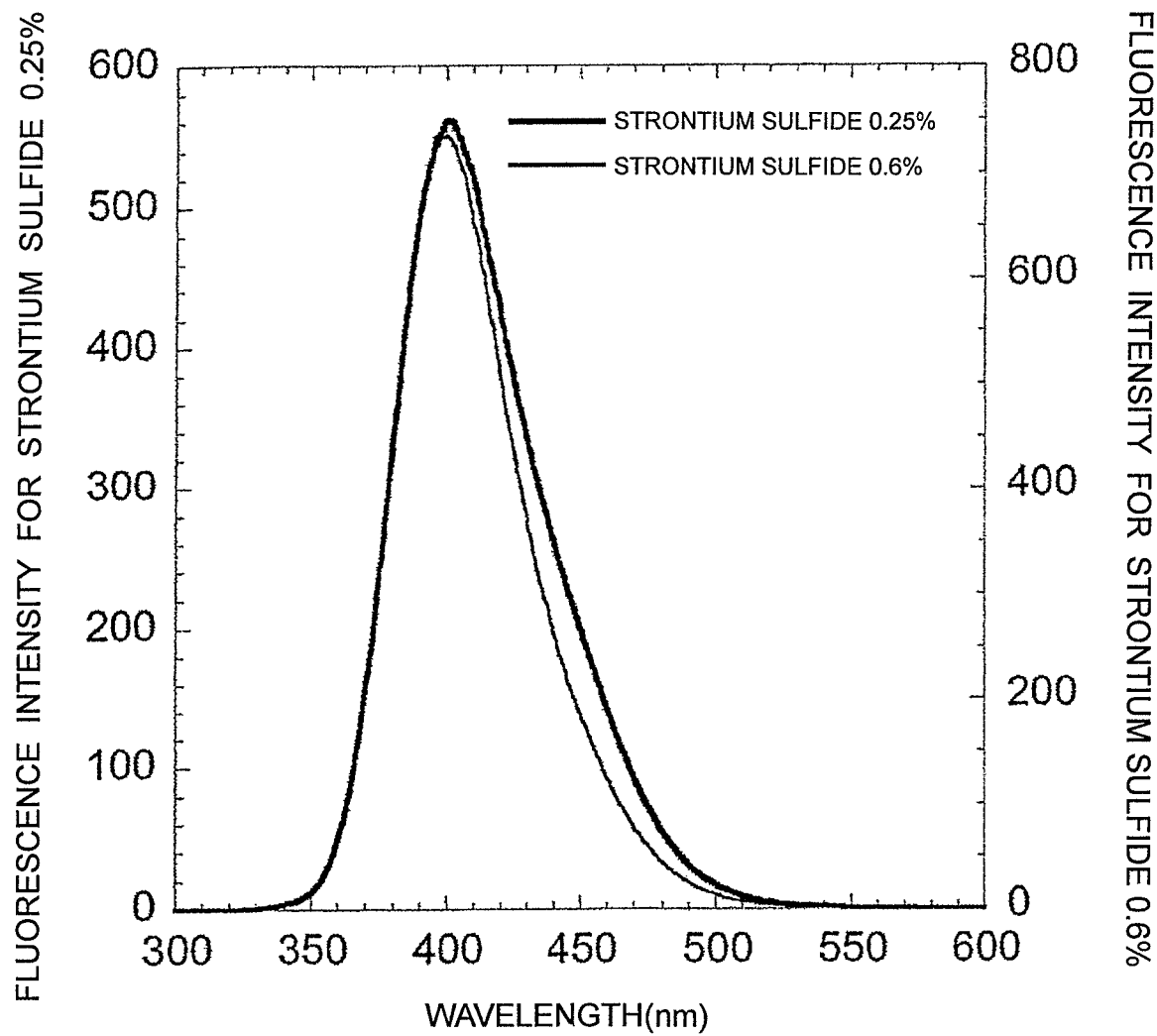

FIG. 21 shows the alpha-ray irradiation fluorescence spectrum of ZnS:Ag based fluorescent material for detecting particle beams with Lithium Sulfide added by 0.25% together with the alpha-ray irradiation spectrum of ZnS:Ag based fluorescent material for detecting particle beams with Strontium Sulfide added by 0.6% as described in Embodiment 1 prepared for comparison. It is proved that ZnS:Ag based fluorescent material for detecting particle beams with Lithium Sulfide added by 0.25% in this embodiment has the wavelengths from 320 nm to 580 nm and that its peak wavelength is 401 nm in its alpha-ray irradiation spectrum.

In contrast, ZnS:Ag based fluorescent material for detecting particle beams with Strontium Sulfide added by 0.6% in Embodiment 1 embodiment has the wavelengths from 320 nm to 580 nm and that its peak wavelength is 398 nm. In comparing those spectra, it was proved that the spectral intensity of the fluorescence spectrum of ZnS:Ag based fluorescent material for detecting particle beams with Lithium Sulfide added by 0.25% increases slightly at the longer-wavelength range globally.

As the second embodiment, an embodiment for a manufacturing method for ZnS:Ag fluorescent materials for detecting particle beams as the first fluorescent material by adding mixture of Sulfur and Strontium Sulfide as add-in materials will be described.

Manufacturing steps were applied in the same condition as the steps described above except the quantity of mixture of Sulfur and Strontium Sulfide as add-in materials and the calcination temperature.

50 g of Zinc Sulfide are used as a main raw material. Silver as an activating material is used in the form of Silver Nitrate and added by the weight fraction of 0.015% to the quantity of Zinc Sulfide. Lithium Chloride (LiCl) is used as a flux and added by the weight fraction of 6% to the quantity of Zinc Sulfide. Mixture of Sulfur and Strontium Sulfide is used as add-in materials, in which Sulfur is added by the weight fraction of 2% to the quantity of Zinc Sulfide, and Strontium Sulfide is added by the weight fraction of 1% to the quantity of Zinc Sulfide. 20 cc of distilled water is added to and mixed with the above materials, and then is dried.

Calcination process was performed at the calculation temperature of 820° C. The color of the obtained ZnS:Ag based fluorescent materials for detecting particle beams exhibited light yellowish-brown rather than white.

Fluorescent emission characteristics of ZnS:Ag based fluorescent material for detecting particle beams so obtained were studied with respect to alpha-ray irradiation. The samples to be used to measure the fluorescent emission characteristics were prepared by applying the method described in Embodiment 1. Measurements of fluorescence spectra obtained by alpha-ray irradiation were performed in the configuration in which those measurement samples are located at the position where the individual sample is to be set up in the excitation light irradiation system of the fluorescence photometer.

Figure 22:
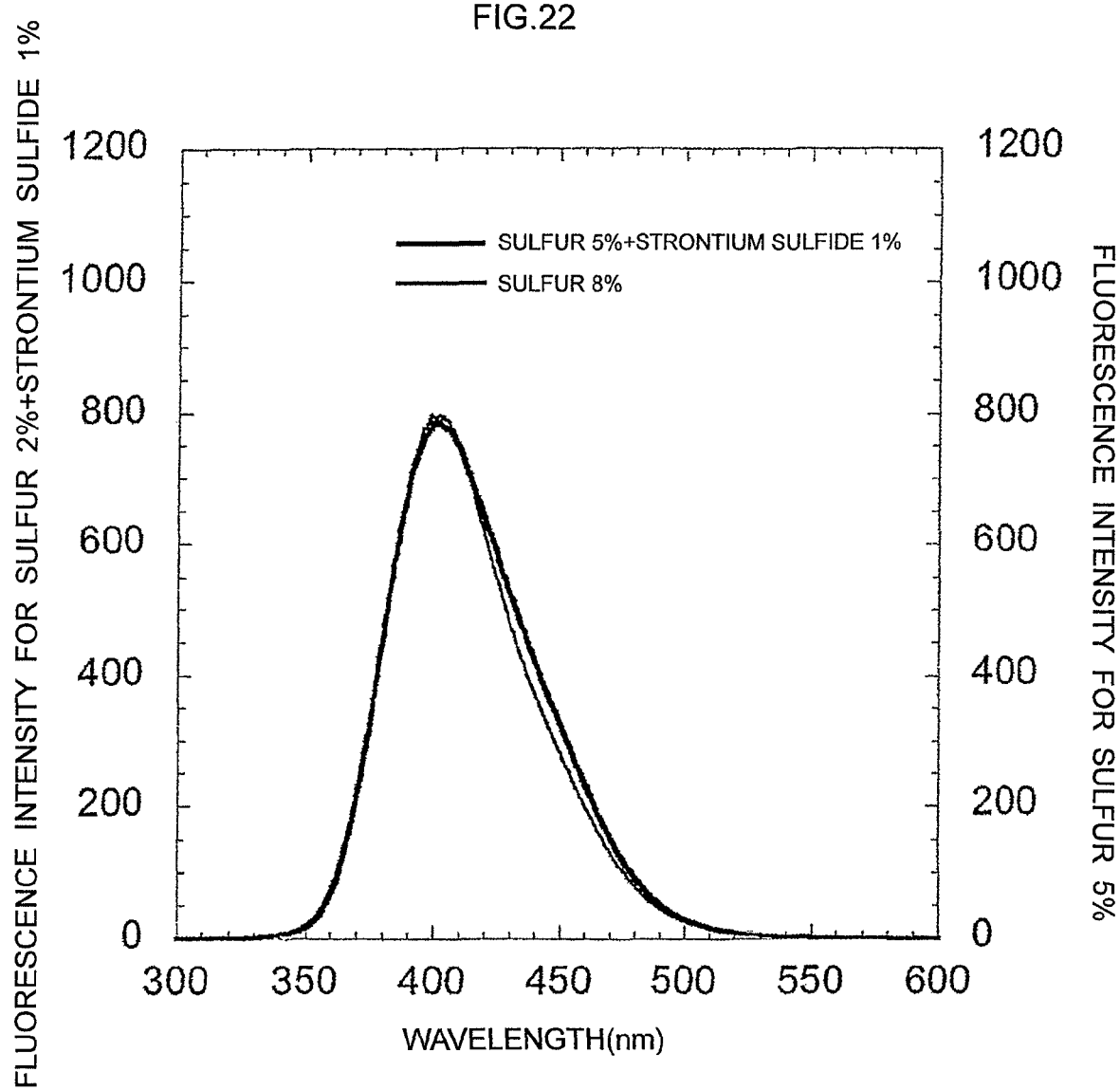

FIG. 22 shows the alpha-ray irradiation fluorescence spectrum of ZnS:Ag based fluorescent material for detecting particle beams with mixture of Sulfur added by 2% and Strontium Sulfide added by 1% being added as add-in materials together with the alpha-ray irradiation spectrum of ZnS:Ag based fluorescent material for detecting particle beams with Sulfur added by 5% as described in Embodiment 1 for comparison. It is found that alpha-ray irradiation fluorescence spectrum of ZnS:Ag based fluorescent material with mixture of Sulfur added by 2% and Strontium Sulfide added by 1% being added as add-in materials in this embodiment has the wavelengths from 320 nm to 580 nm and that its peak wavelength is 401 nm in its alpha-ray irradiation spectrum. In contrast, ZnS:Ag based fluorescent material for detecting particle beams with Sulfur added by 5% in Embodiment 1 has the wavelengths from 320 nm to 580 nm and that its peak wavelength is 402 nm. In comparing those spectra, it was able to be confirmed that those spectrums are formed as the first fluorescence spectrum and their peak wavelengths are almost identical to each other, though the spectral intensity of the fluorescence spectrum in this embodiment increases slightly and more globally at the longer wavelength range.

Another ZnS:Ag based fluorescent material for detecting particle beams was manufactured by the calcination process under the same conditions as those described above, in which mixture of Sulfur and Strontium Sulfide was used as add-in materials, and the mixture ratio was different from that in the previous embodiment, that is, Sulfur was added by the weight fraction of 2% to the quantity of Zinc Sulfide, and Strontium Sulfide was added by the weight fraction of 0.5% to the quantity of Zinc Sulfide.

Fluorescence characteristics of ZnS:Ag based fluorescent material for detecting particle beams so obtained with mixture of Sulfur added by 2% and Strontium Sulfide added by 0.5% being added were studied with respect to alpha-ray irradiation. The samples to be used to measure the fluorescent emission characteristics were prepared by applying the method described in Embodiment 1. Measurements of fluorescence spectra obtained by alpha-ray irradiation were performed in the configuration in which those measurement samples were located at the position where the individual sample was to be set up in the excitation light irradiation system of the fluorescence photometer.

Figure 23:
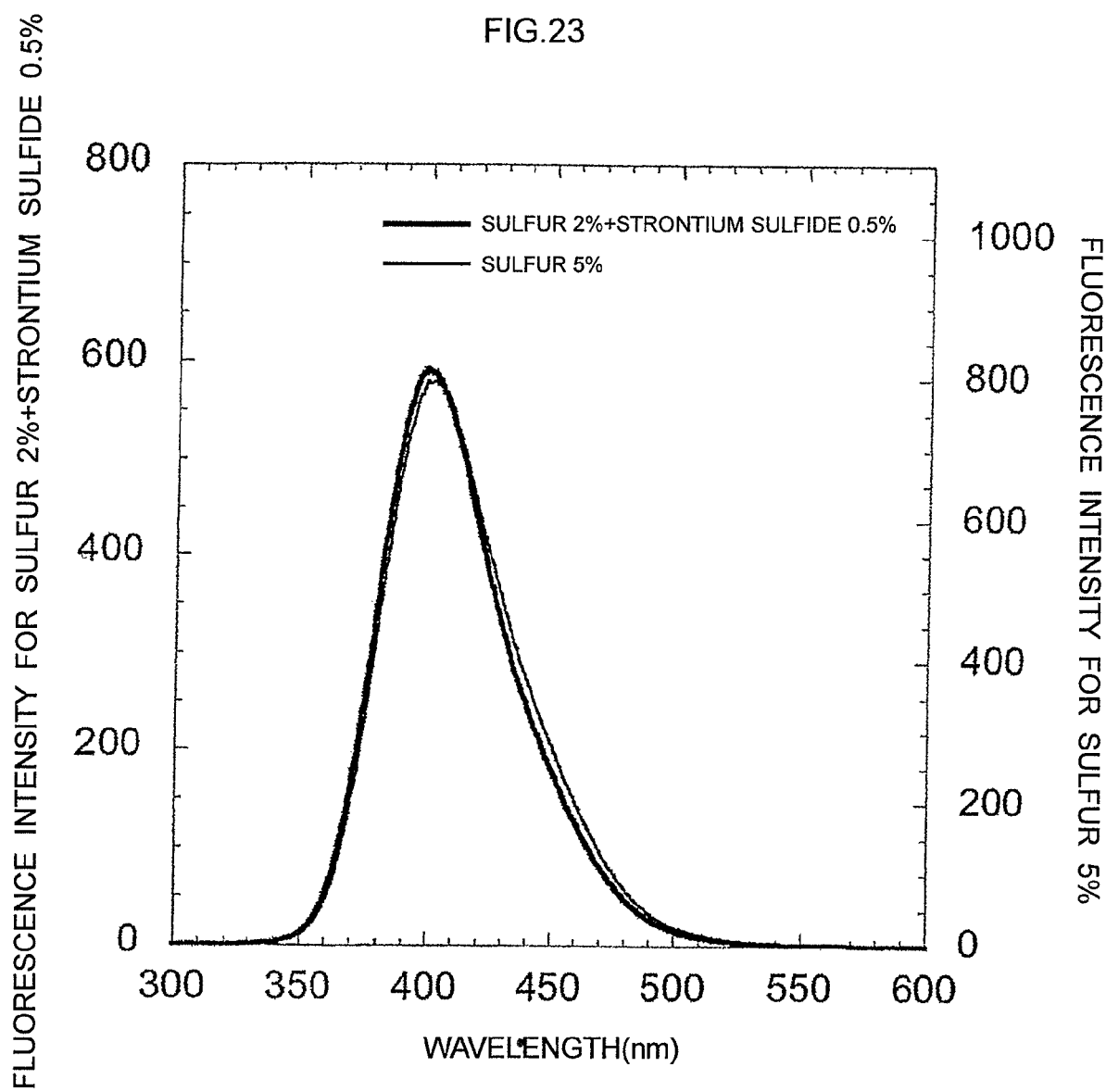

FIG. 23 shows an alpha-ray irradiation fluorescence spectrum of ZnS:Ag based fluorescent material for detecting particle beams with mixture of Sulfur added by 2% and Strontium Sulfide added by 0.5% being added as add-in materials, together with the alpha-ray irradiation fluorescence spectrum of ZnS:Ag based fluorescent material for detecting particle beams with Sulfur added by 5% as described in Embodiment 1 for comparison. It is found that the alpha-ray irradiation fluorescence spectrum of ZnS:Ag based fluorescent material for detecting particle beams with mixture of Sulfur added by 2% and Strontium Sulfide added by 0.5% being added as add-in materials in this embodiment has the wavelengths from 320 nm to 580 nm and that its peak wavelength is 400 nm in its alpha-ray irradiation spectrum. Compared with ZnS:Ag based fluorescent material for detecting particle beams with Sulfur added by 5% as described in Embodiment 1, it was proved that the quantity of fluorescence in the fluorescence spectrum in this Embodiment decreased at a shorter wavelength rage in contrast to the above described alpha-ray irradiation fluorescence spectrum of ZnS:Ag based fluorescent material for detecting particle beams with mixture of Sulfur added by 2% and Strontium Sulfide added by 1%.

According to the result described above, it was proved that, in case of manufacturing ZnS:Ag based fluorescent material for detecting particle beams as the first fluorescence material, a fluorescence spectrum almost identical to the fluorescence spectrum obtained by adding Sulfur by 5% as shown in Embodiment 1 was able to be obtained.

At the last part of the description of Embodiment 3, a manufacturing method for manufacturing ZnS:Ag based fluorescent material for detecting particle beams as the second fluorescence material by adding Calcium Sulfide (CaS) as an add-in material will be described.

Manufacturing steps were applied in the same condition as the steps described above except the quantity of Calcium Sulfide as an add-in material to be added to ZnS and the calcination temperature.

50 g of Zinc Sulfide are used as a main raw material. Silver as an activating material is used in the form of Silver Nitrate and added by the weight fraction of 0.015% to the quantity of Zinc Sulfide. Lithium Chloride (LiCl) is used as a flux and added by the weight fraction of 6% to the quantity of Zinc Sulfide. Calcium Sulfide is used as add-in material, in which Calcium Sulfide is added by the weight fraction of 5% to the quantity of Zinc Sulfide. 20 cc of distilled water is added to and mixed with the above materials, and then is dried.

Calcination process was performed at the calculation temperature of 920° C. because the melting point of Calcium Sulfide is as high as 2400° C. The color of the obtained ZnS:Ag based fluorescent materials for detecting particle beams exhibited extremely light yellowish-brown.

Fluorescent emission characteristics of ZnS:Ag based fluorescent material for detecting particle beams were studied with respect to alpha-ray irradiation and gamma-ray irradiation. The samples to be used to measure the fluorescent emission characteristics were prepared by applying the method described in Embodiment 1. Measurements of fluorescence spectra obtained by alpha-ray irradiation and gamma-ray irradiation were performed in the configuration in which those measurement samples were located at the position where the individual sample was to be set up in the excitation light irradiation system of the fluorescence photometer.

Figure 24:
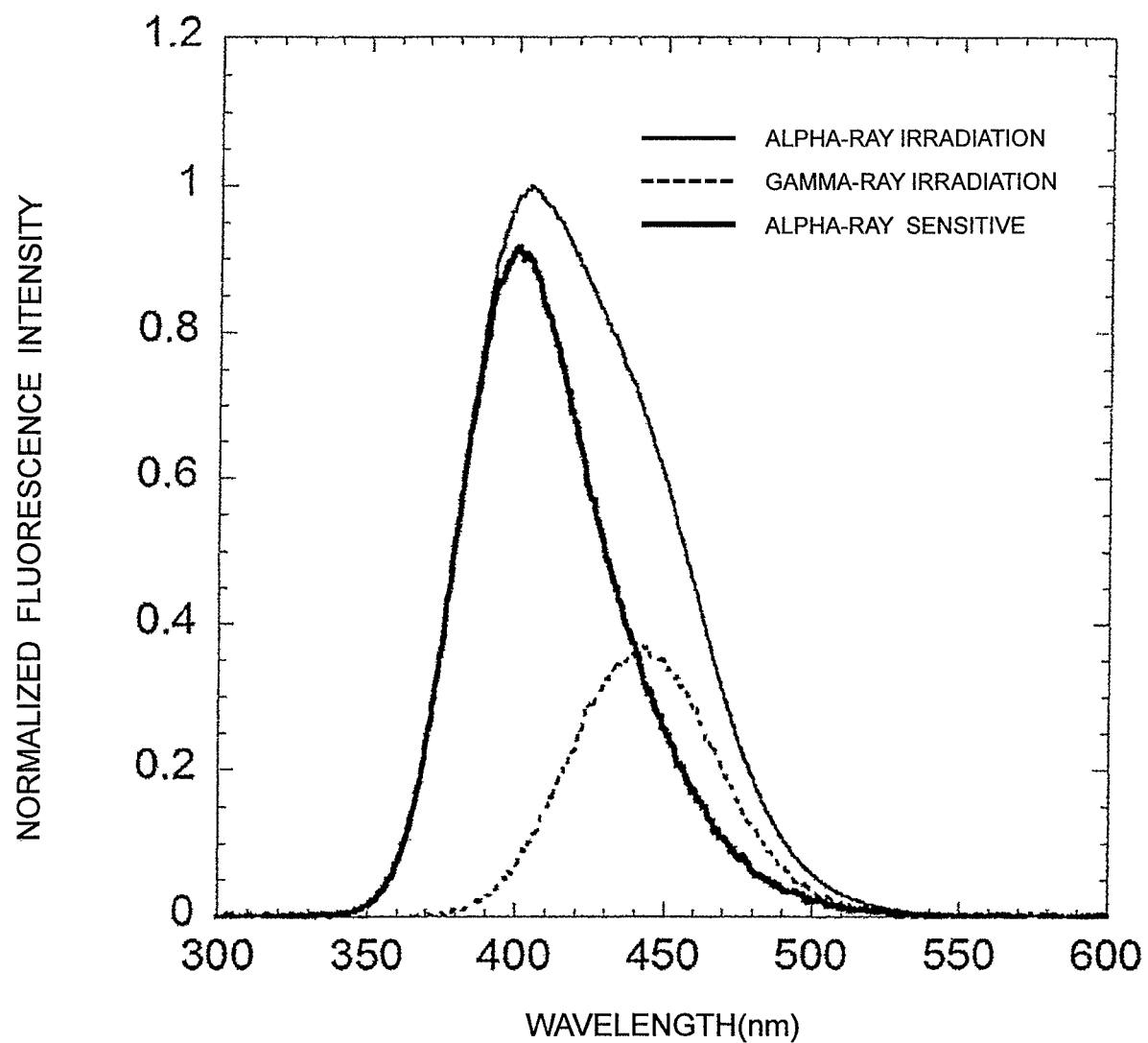
Figure 25:
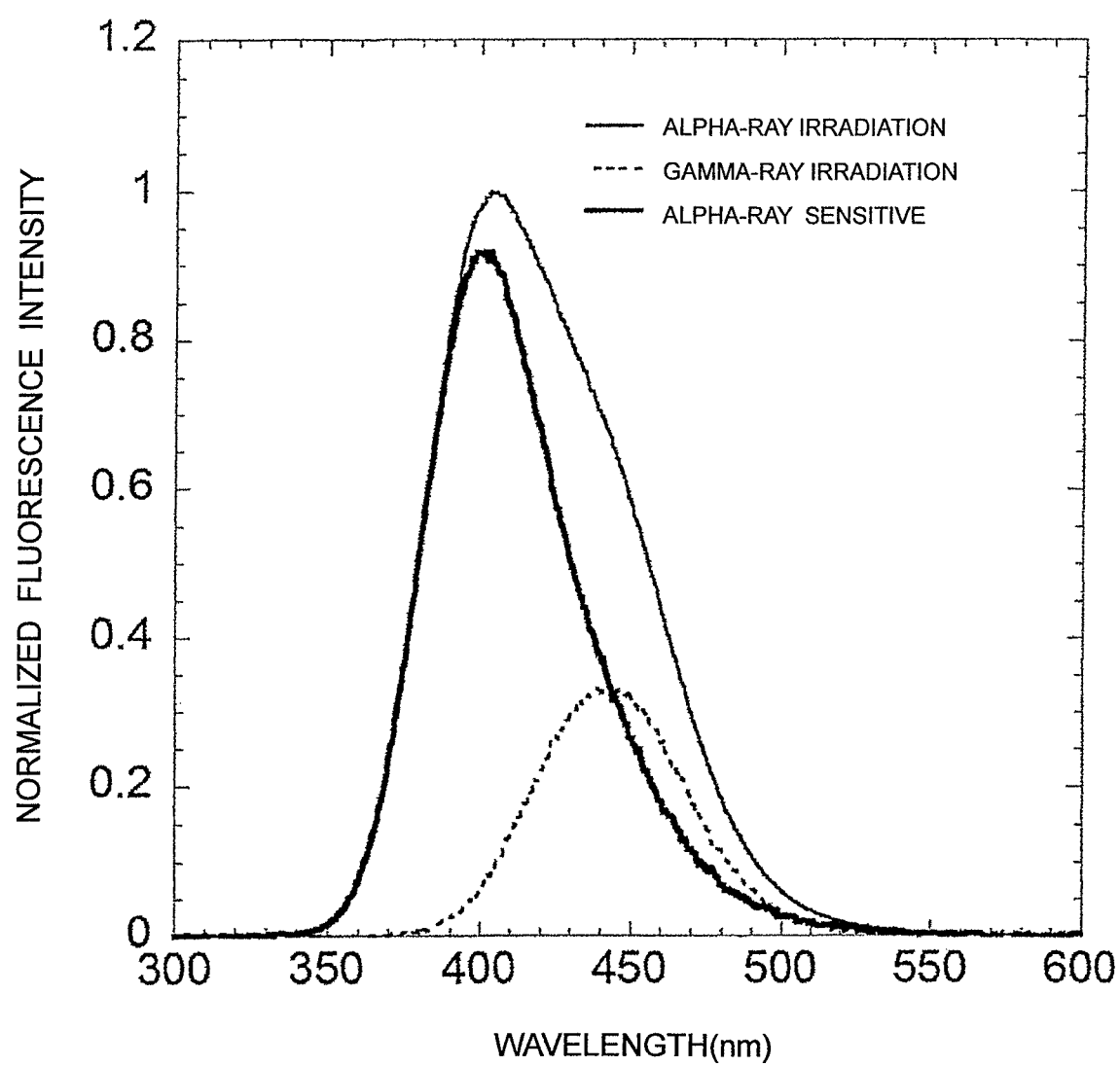
Figure 26:
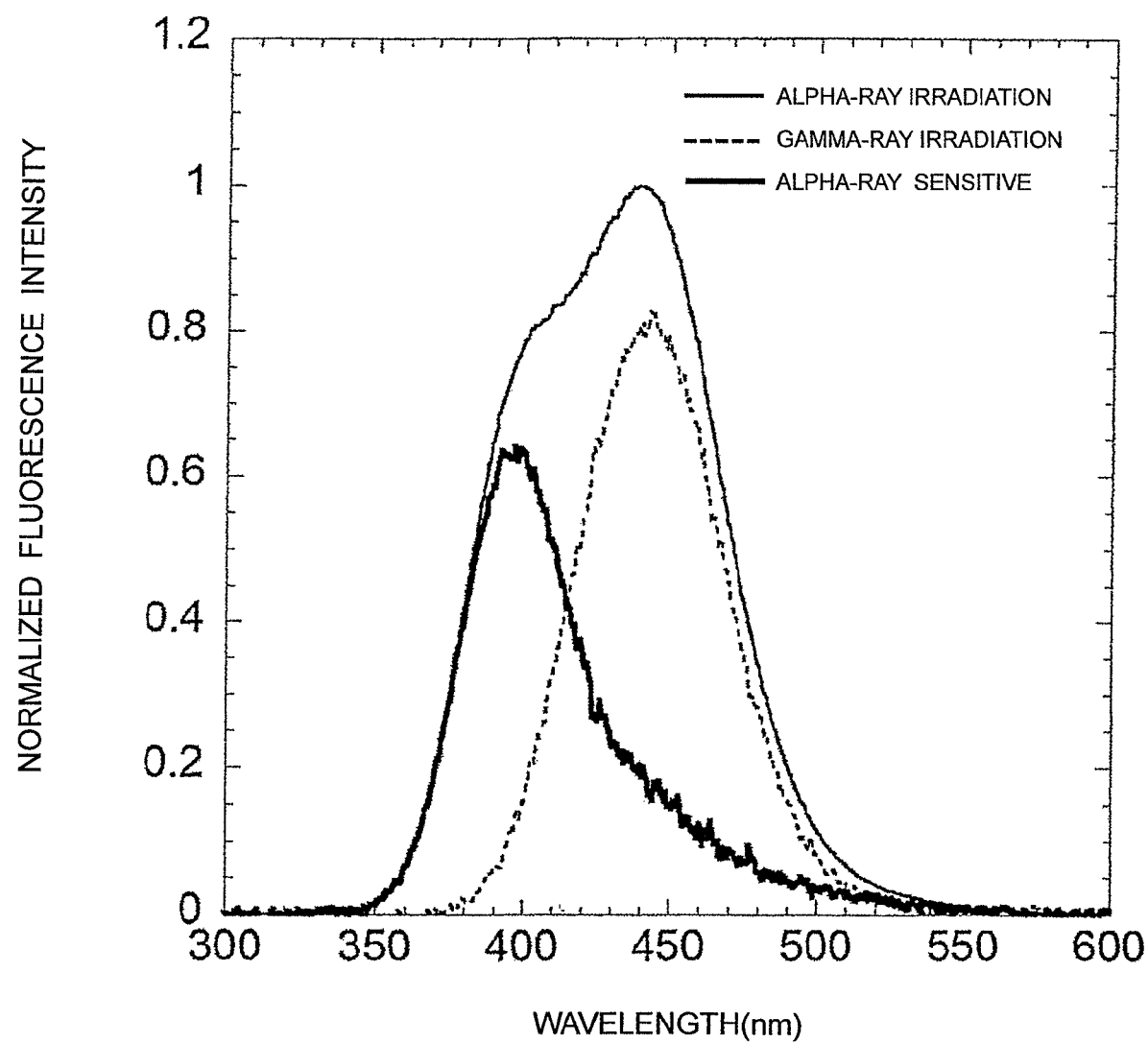
Figure 27:
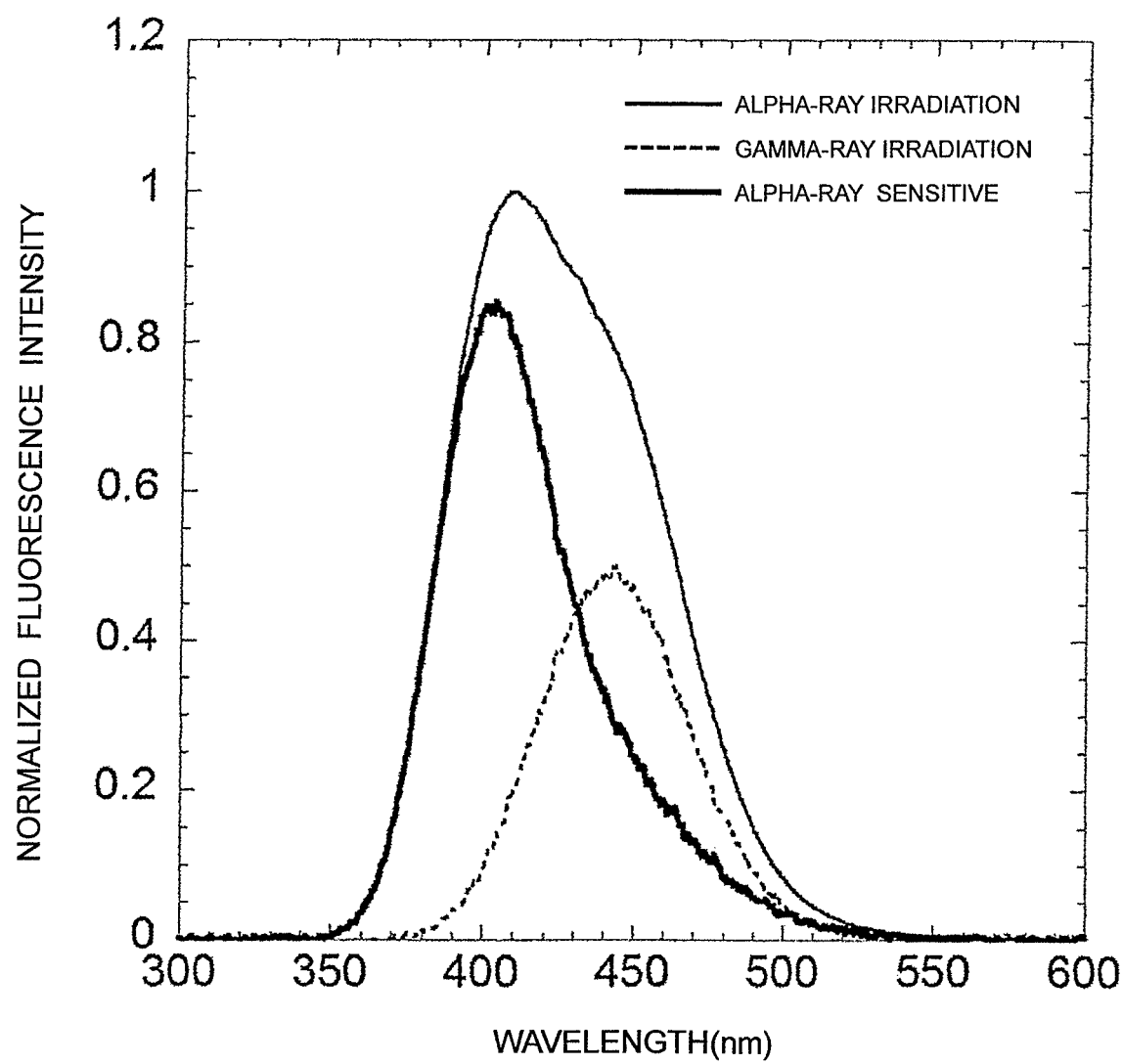
Figure 28:
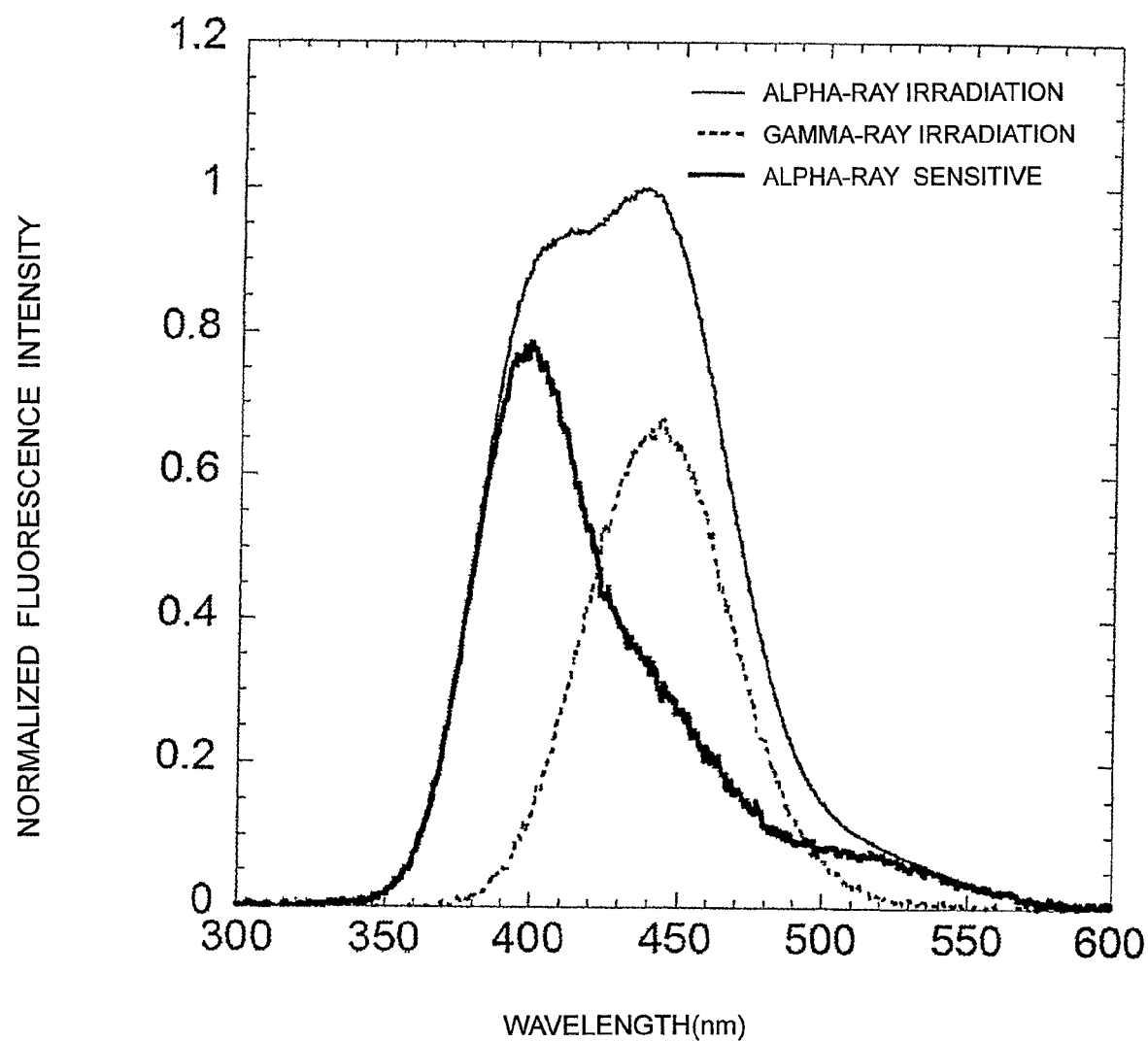
Figure 29:
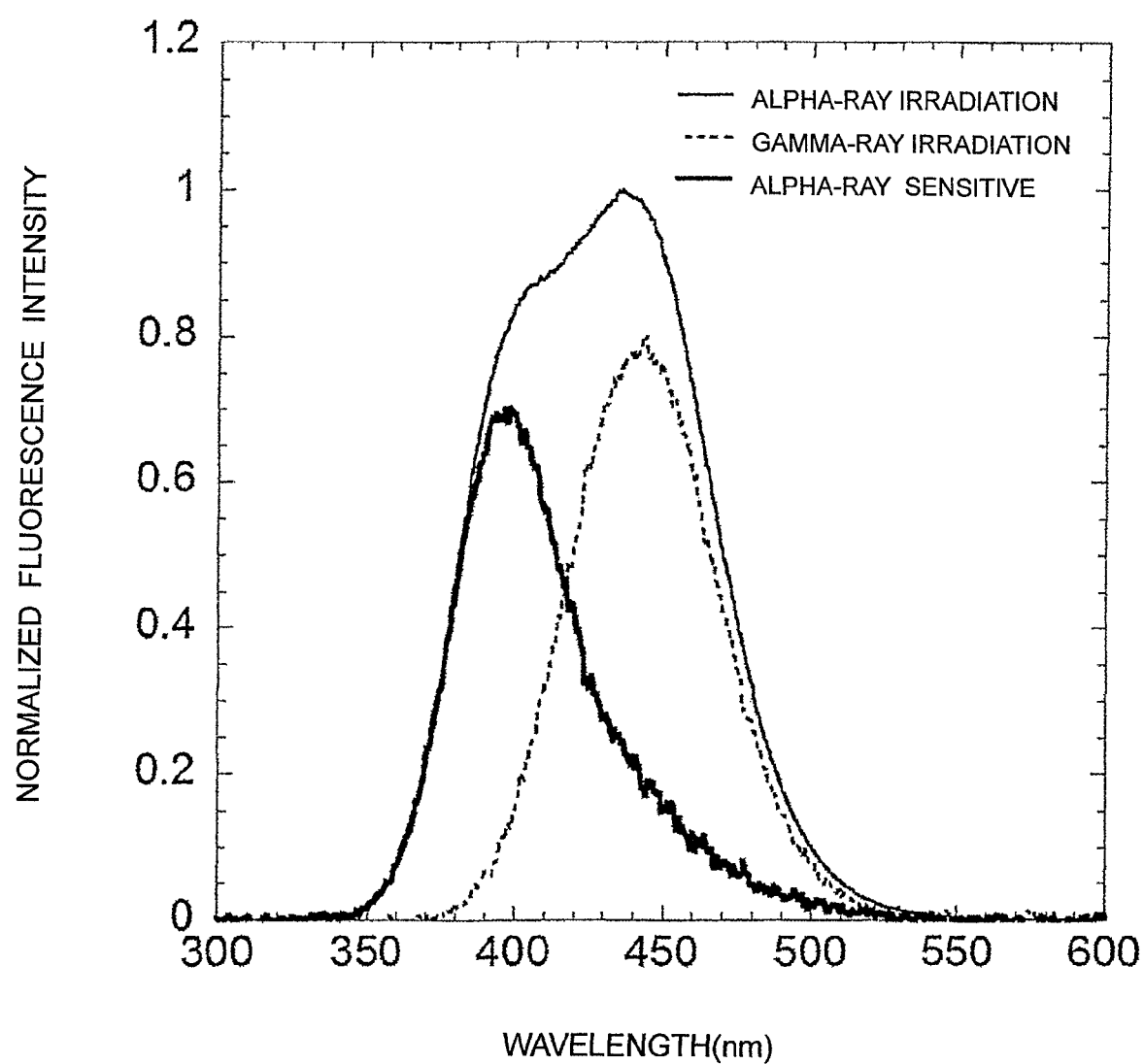
Figure 30:
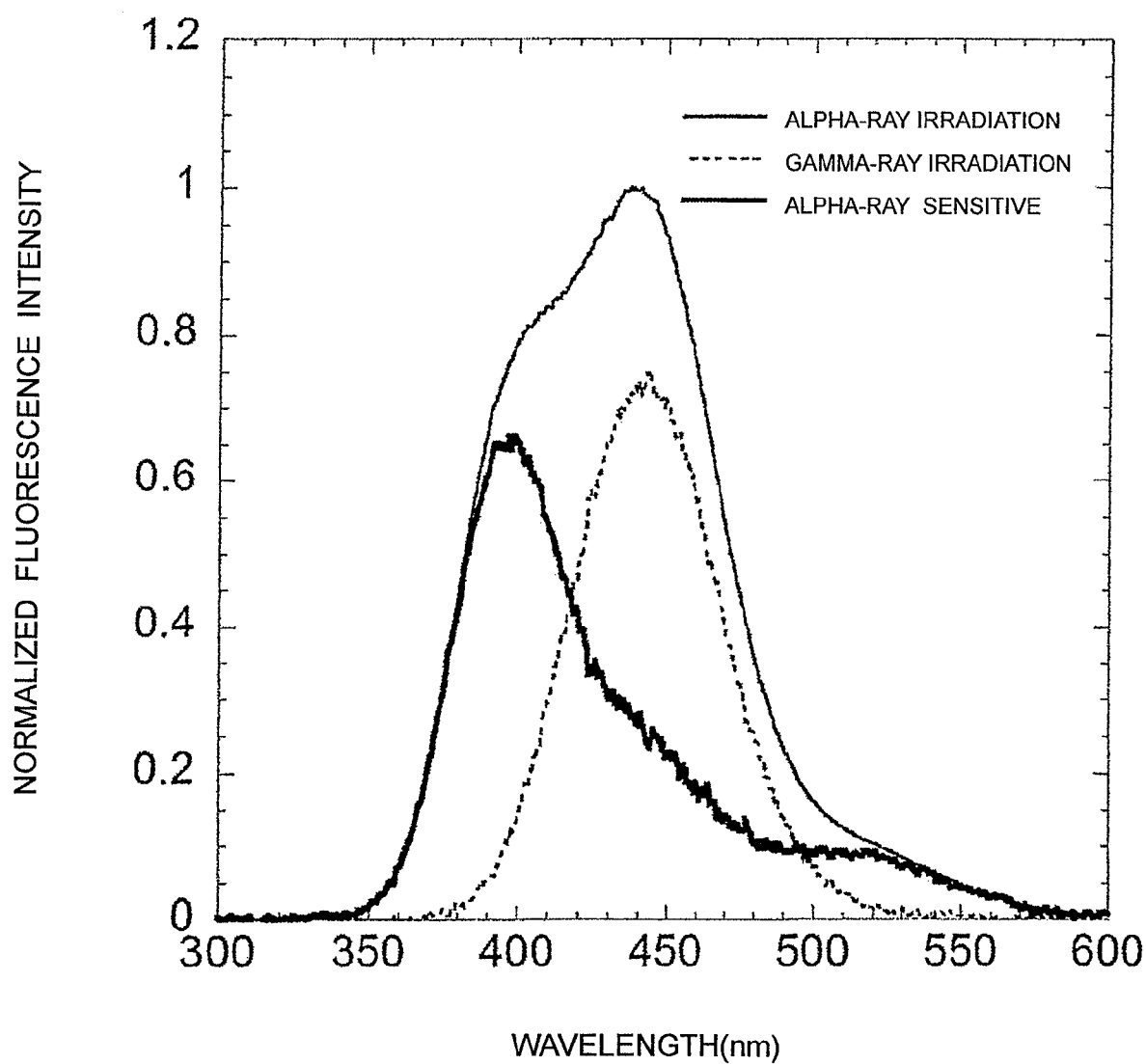
Figure 31:
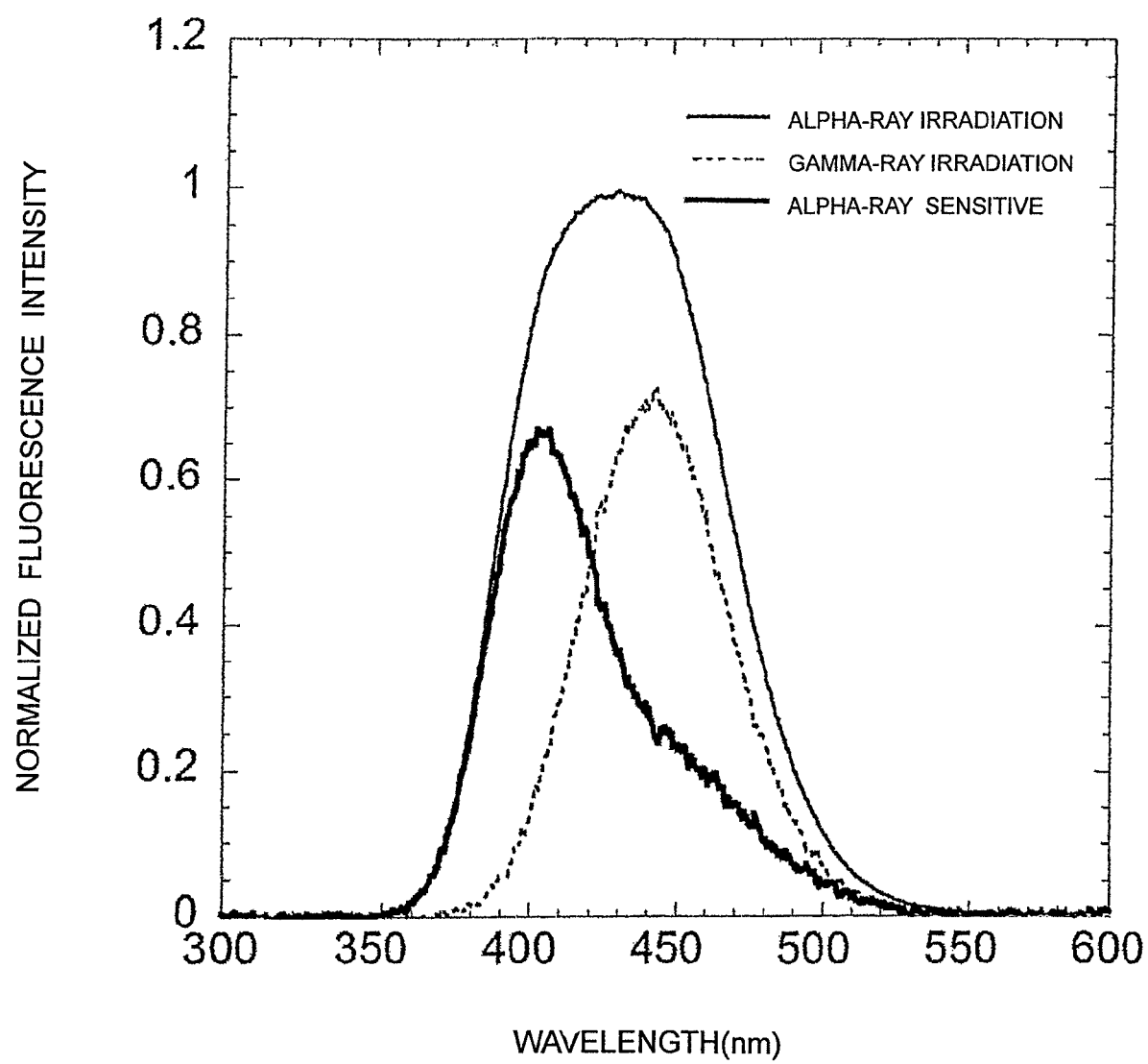
Figure 32:
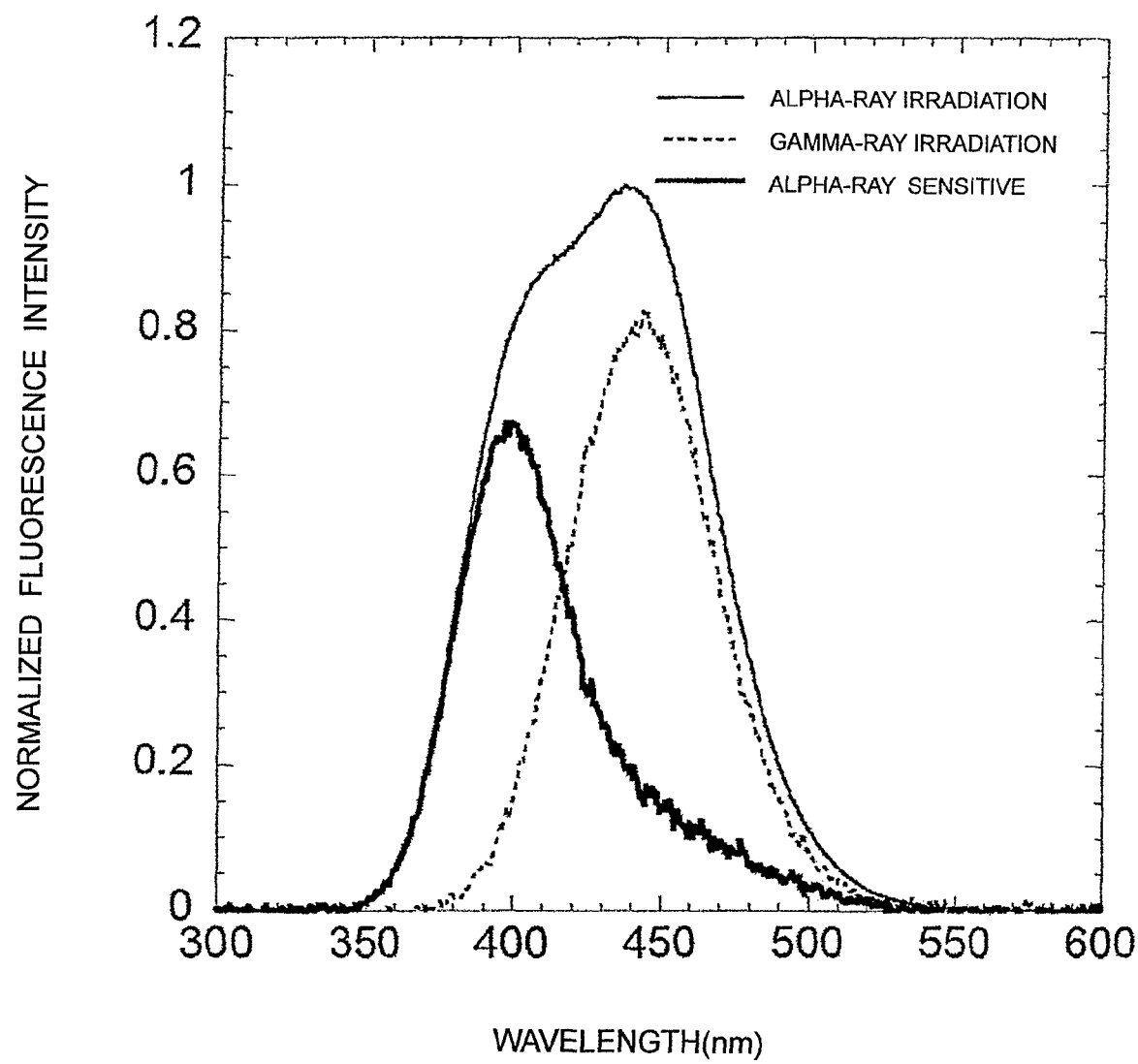
Figure 33:
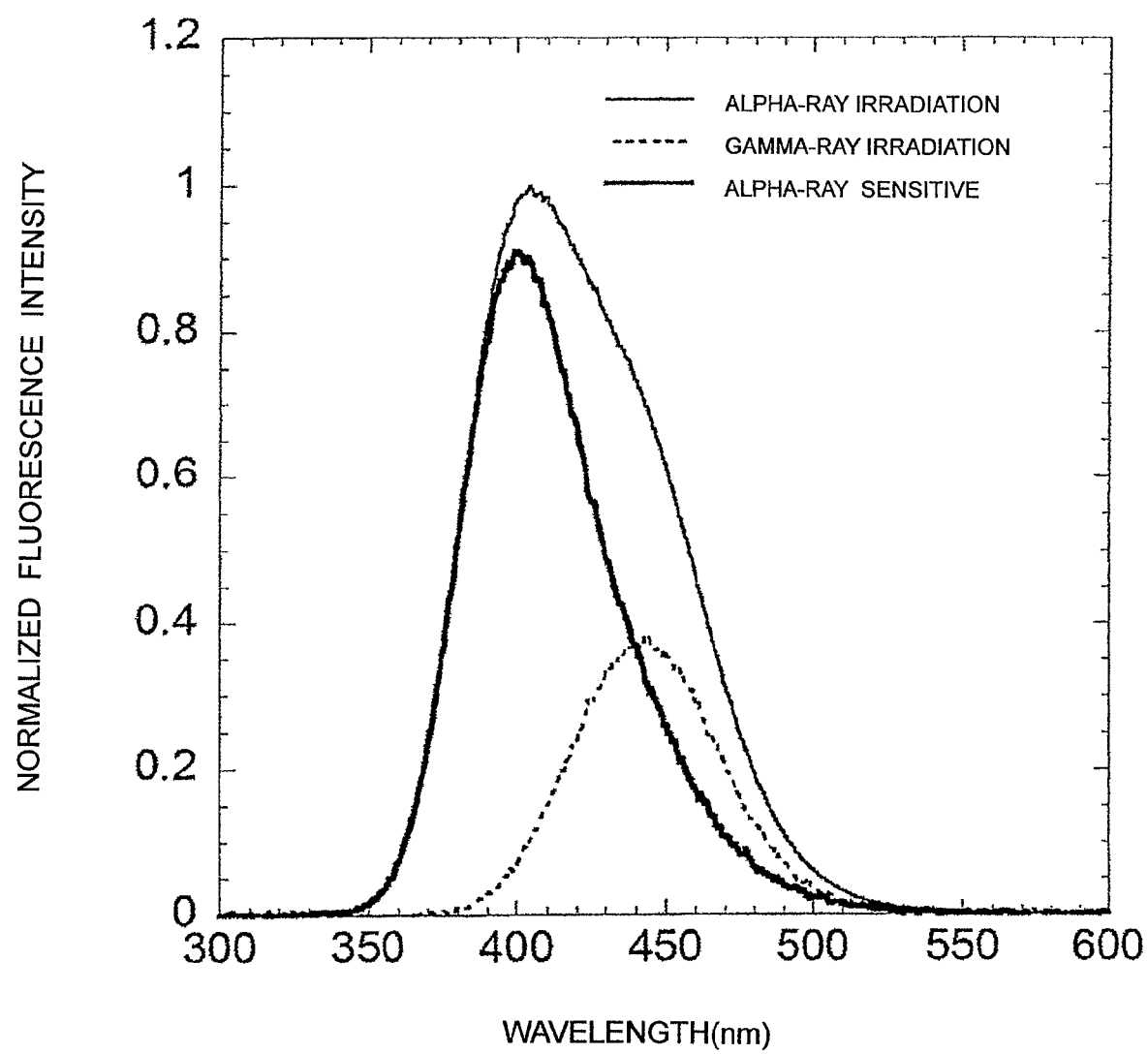
Figure 34:
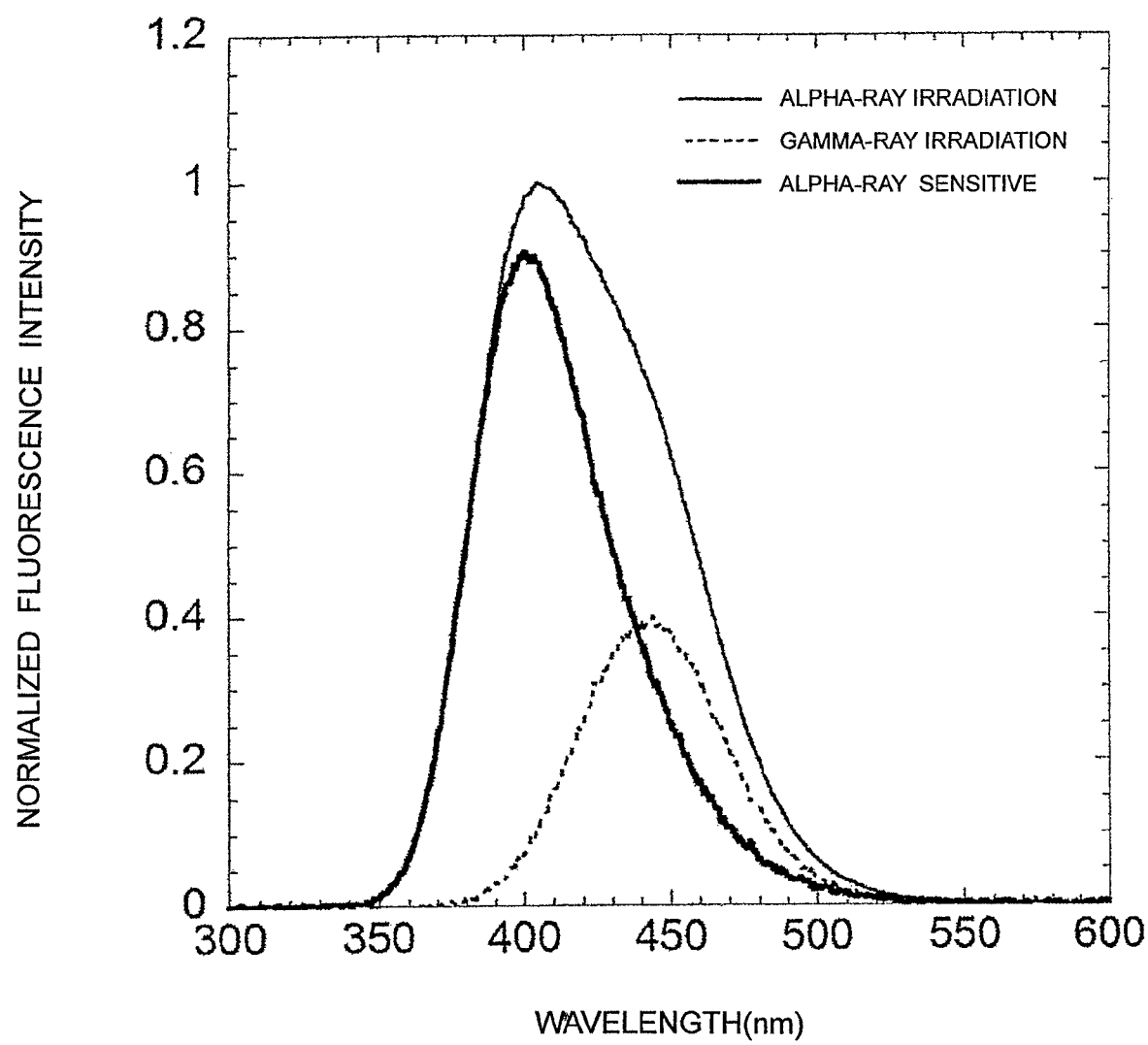
Figure 35:
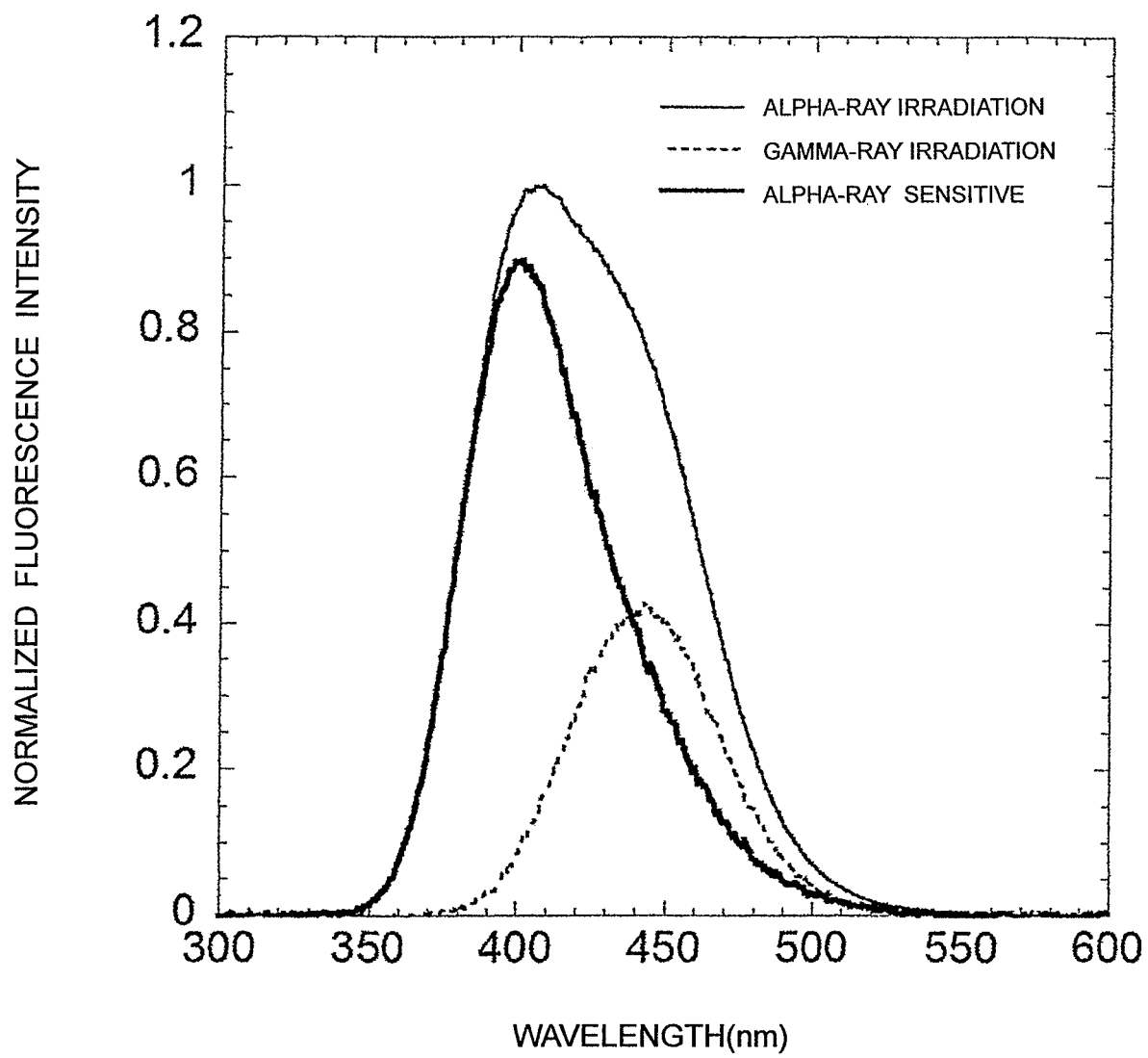
Figure 36:
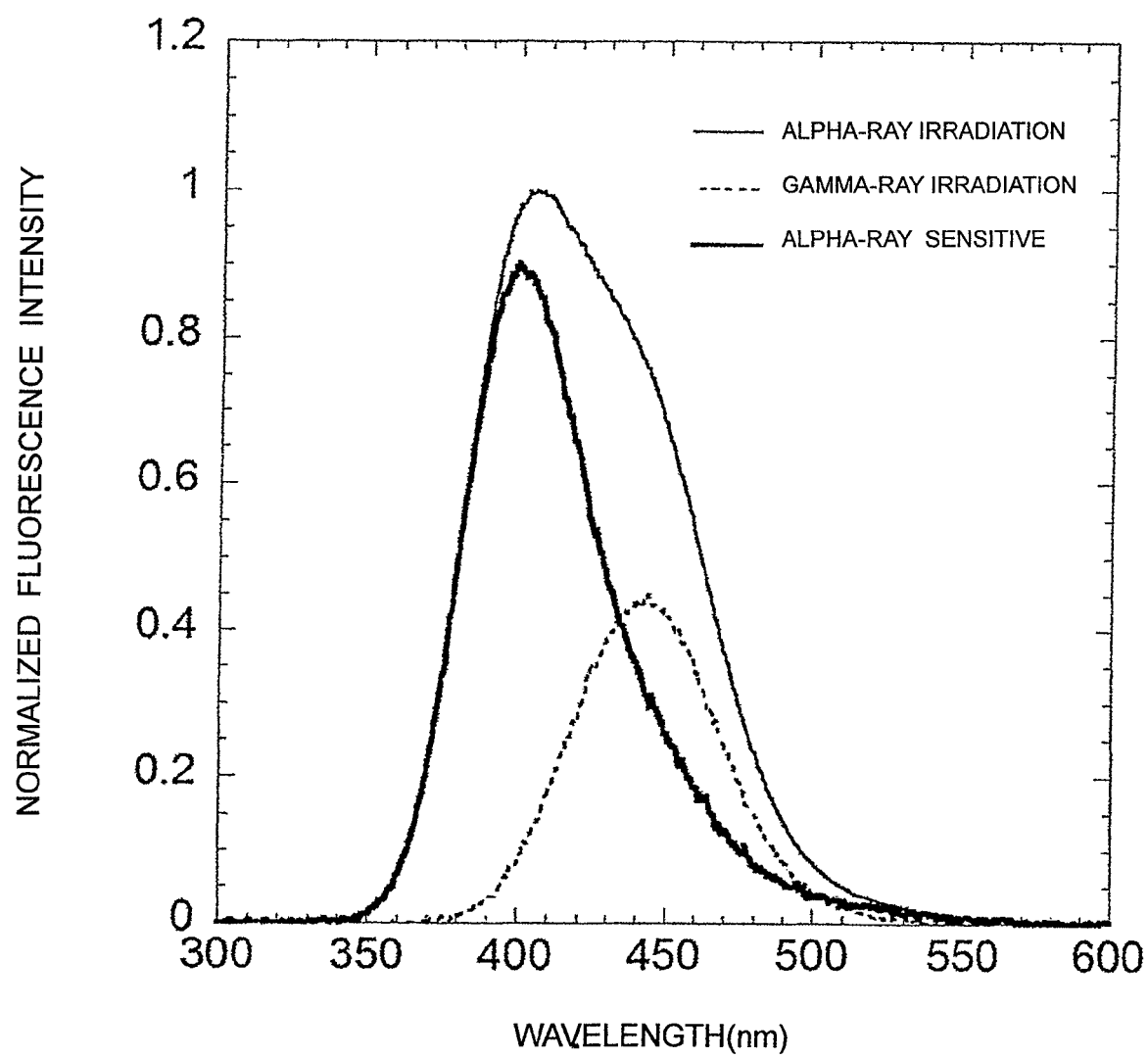

As for the alpha-ray irradiation fluorescence spectrum so obtained for ZnS:Ag based fluorescent material manufactured in the calcination process by adding Calcium Sulfide by the weight fraction of 5% to the quantity of Zinc Sulfide, and the gamma-ray irradiation fluorescence spectrum so obtained by irradiating gamma-rays, their normalized fluorescence spectra were obtained by normalizing their observed maximum values to 1 (one), and then, an alpha-ray sensitive fluorescence spectrum was obtained by subtracting the gamma-ray irradiation fluorescence spectrum from alpha-ray irradiation fluorescence spectrum. FIG. 24 shows those three types of fluorescence spectra so obtained.

It was proved that the alpha-ray detection factor representing the fraction of the quantity of fluorescence in alpha-ray sensitive spectrum to the quantity of fluorescence in alpha-ray irradiation fluorescence spectrum was 0.71%. The quantity of fluorescence (an integral value of the intensity of fluorescence in a fluorescence spectrum) emitted from ZnS: Ag based fluorescent material for detecting particle beams was obtained by 90% of the quantity of fluorescence emitted from the fluorescent material, Type 1109-041, manufactured by Nichia Corporation.

Embodiment 4

In this embodiment, in the manufacturing method described in Embodiment 3, a manufacturing method will be described in which LiX, NaX, KX, RbX, CsX (in which X represents Cl, Br and F) as Halide of Alkaline metal including Sodium Chloride which has been conventionally used for reducing the calcination temperature, MgX and CaX, SrX, BaX and CeX (in which X represents Cl, Br and F) as Halide of Alkaline earth metal are added by the weight fraction of 2% to 8% to the quantity of Zinc Sulfide.

In manufacturing ZnS:Ag fluorescent materials, Sodium Chloride and Barium Chloride (BaCl) have been used conventionally as fluxes, in which "Cl" is added as ZnS:Ag, Cl in case of labelling more precisely.

In this embodiment, easily available materials were used as fluxes by selecting among candidate materials including LiX, NaX, KX, RbX, CsX (in which X represents Cl, Br and F) as Halide of Alkaline metal including Sodium Chloride which has been conventionally used for reducing the calcination temperature, MgX and CaX, SrX, BaX and CeX (in which X represents Cl, Br and F) as Halide of Alkaline earth metal. In this selection, considering the melting point of material to be an important factor, as the melting point of Bromine is generally low and the melting point of Chloride is higher, and the melting point of Fluoride is the highest, as for Chloride of Alkaline metal or Alkaline earth Metal having a higher melting point, Bromine of the same Alkaline metal or Alkaline earth metal was selected.

As Lithium Chloride was the most easily available material among candidate materials, Lithium Chloride was used in Embodiments 1 to 3, and Embodiments 5 to 8.

What will be described below are embodiments in case of using, as for Halide of Alkaline metal, Sodium Chloride (NaCl) and Rubidium Chloride (RbCl) as Chloride, Lithium Bromide (LiBr), Potassium Bromide (KBr), Rubidium Bromide (RbBr) and Cesium Bromide (CsBr) as Bromide, and Lithium Fluoride (LiF) as Fluoride, each being as a flux.

50 g of Zinc Sulfide are used as a main raw material. Silver as an activating material is used in the form of Silver Nitrate and added by the weight fraction of 0.015% to the quantity of Zinc Sulfide. Seven types of materials described above are used as fluxes and added by the weight fraction of 6% to the quantity of Zinc Sulfide. Sulfur (S) or Sulfide is used as an add-in material, and, as for the adding quantity, the weight fractions to the quantity of Zinc Sulfide shown in Table 2 are added. 20 cc of distilled water is added to and mixed with the above materials, and then is dried.

TABLE 2

| | Add-in Material | | Flux | | Calcination Conditions | | |
|---|---|---|---|---|---|---|---|
| Sample Number | Material | Weight Fraction to ZnS (%) | Material | Weight Fraction to ZnS (%) | Temperature (° C.) | Time (Hour) | Alpha-ray Detection Rate |
| 1 | S | 2 | NaCl | 6 | 920 | 3 | 0.73 |
| 2 | S | 2 | RbCl | 6 | 920 | 3 | 0.43 |
| 3 | S | 2 | LiBr | 6 | 820 | 2 | 0.63 |
| 4 | S | 2 | KBr | 6 | 920 | 3 | 0.45 |
| 5 | S | 2 | RbBr | 6 | 920 | 3 | 0.45 |
| 6 | S | 2 | CsBr | 3 | 920 | 3 | 0.39 |
| 7 | S | 2 | LiF | 6 | 940 | 3 | 0.49 |
| 8 | S | 2 | $CaCl_2$ | 6 | 920 | 3 | 0.43 |
| 9 | S | 2 | $CeCl_3$ | 3 | 920 | 3 | 0.71 |
| 10 | S | 2 | $SrCl_2$ | 3 | 920 | 3 | 0.7 |
| 11 | S | 2 | $MgBr_2$ | 6 | 920 | 3 | 0.69 |
| 12 | S | 2 | $BaBr_2$ | 3 | 920 | 3 | 0.67 |

As for the crucible composed of graphite with its whole periphery being closed, a graphite crucible having an outer diameter of 60 mmφ and a length of 50 mm, an inner diameter of 30 mmφ, a bottom thickness of 10 mm and a lid thickness of 10 mm is used. The net volume for accommodating the materials is designed to have a diameter of 30 mmφ and a length of 30 mm. A hole having a diameter of 1 mmφ is provided at the center of the lid in order to release a part of sublimate substances generated from the calcination materials inside the crucible. Dried calcination materials are introduced inside the graphite crucible, and the lid is closed.

Next, the graphite crucible is held into the electric furnace and the calcination process is applied. As for the electric furnace, Electric Furnace KDF-S70 type manufactured by DENKEN Co., Ltd which has a maximum operating temperature at 1100° C., was used. The calcination process was performed in the following conditions.

Calcination Temperature: Temperature shown in Table 2 used
Cover Gas: $CO_2$ flowing at a flow rate of 2 liters per minute
Calcination Period of Time: Period of time shown in Table 2 used After sintered materials obtained after the calcination process were ground to powder, and further after rinsing the powder by water, ZnS:Ag based fluorescent materials for detecting particle beams are finally obtained Measurement samples were prepared for seven types of ZnS:Ag fluorescent materials for detecting particle beams so obtained by the calcination process by using seven types of flux, Sodium Chloride and Rubidium Chloride, Lithium Bromide (LiBr), Potassium Bromide (KBr), Rubidium Bromide (RbBr), Cesium Bromide (CsBr), and Lithium Fluoride (LiF), and then, measurements of fluorescence spectra obtained by alpha-ray irradiation were performed in the configuration in which those measurement samples were located at the position where the individual sample was to be set up in the excitation light irradiation system of the fluorescence photometer. Alpha-ray irradiation fluorescence spectra for those seven types of ZnS:Ag fluorescent materials for detecting particle beams so obtained are shown in FIG. 25 to FIG. 30 by normalizing the observed maximum values in the spectra to 1 (one) in order to compare the shapes of alpha-ray irradiation fluorescent spectra.

As the result of analyzing alpha-ray fluorescence spectra so obtained, alpha-ray detection factors representing the fractions of the quantity of fluorescence in alpha-ray sensitive fluorescence spectra to the quantity of fluorescence in their corresponding gamma-ray sensitive fluorescence spectra are shown in Table 2. As any value of alpha-ray detection factors became equal to or larger than its target value, 0.3, it was able to be confirmed that ZnS:Ag fluorescent materials for detecting particle beams as the second fluorescent material can be manufactured with those types of fluxes.

What will be described below are embodiments in case that, as for Magnesium and Halide of Alkaline metal, Calcium Chloride ($CaCl_2$), Cerium Chloride ($CeCl_3$) and Strontium Chloride ($SrCl_2$) as Chloride, and Magnesium Bromide ($MgBr_2$) and Barium Bromide ($MaBr_2$) as Bromide are used for fluxes.

Figure 1:
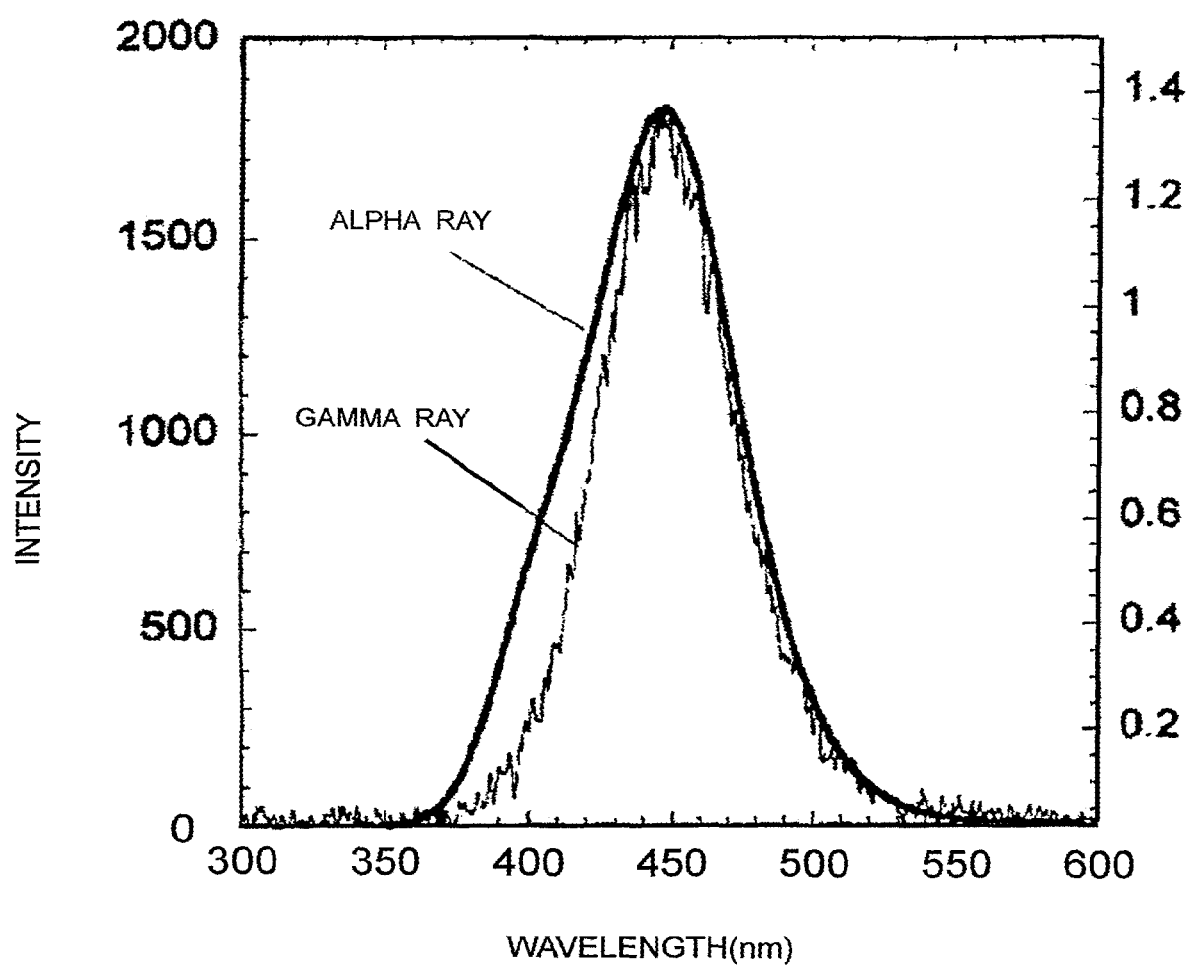
FIG. 1
A line graph representing the fluorescence spectrum shown in Patent Literature 1 (Prior Art).
Figure 2:
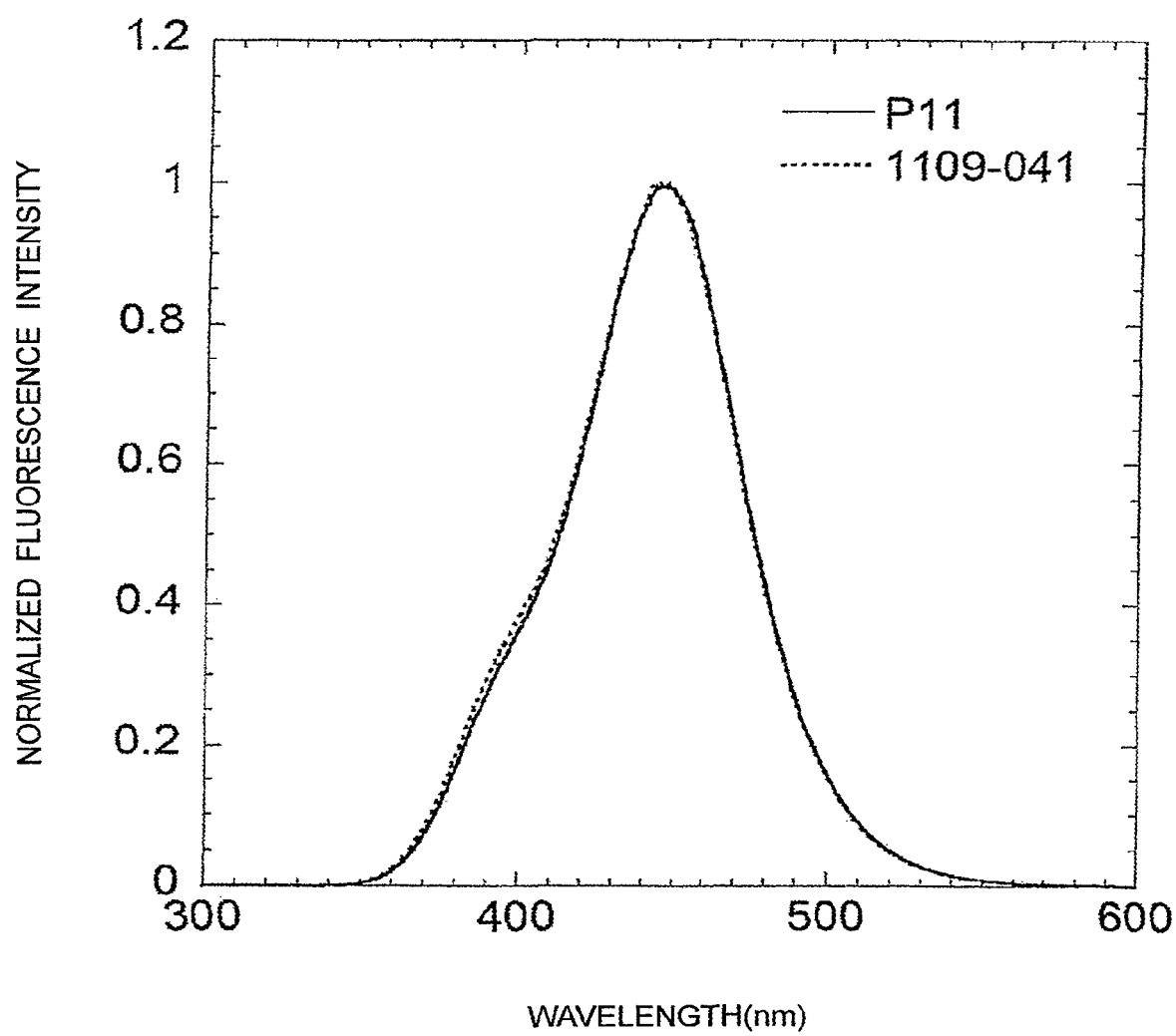
FIG. 2
A line graph representing the alpha-ray irradiation fluorescence spectrums of the fluorescent material in Patent Literature 1 and P11 fluorescent material publically available (Prior Art).
Figure 3:
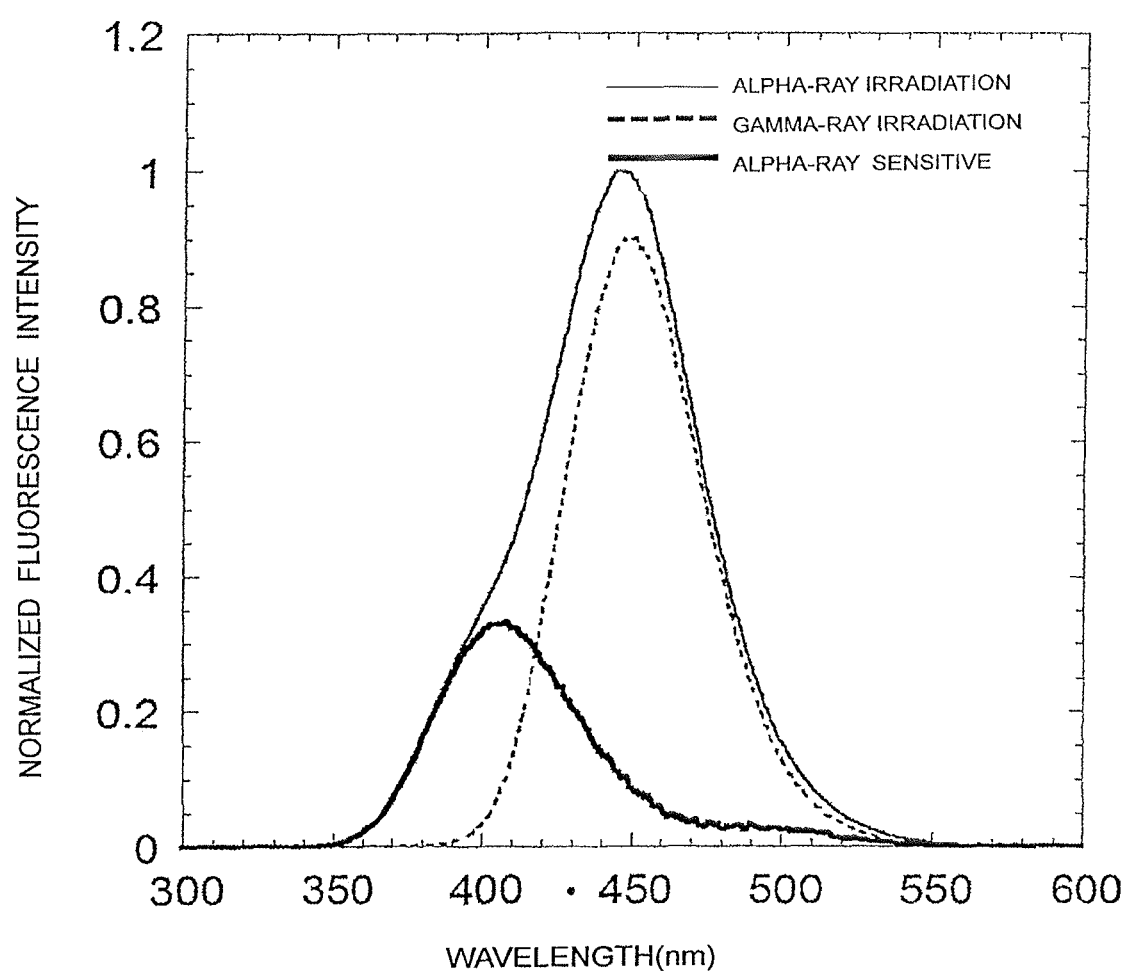
FIG. 3

The same manufacturing steps as described above were applied, in which the quantity of Sulfur as an add-in material and the calcination temperature as the manufacturing conditions are shown in FIG. 2.

Measurement samples were prepared for seven types of ZnS:Ag fluorescent materials for detecting particle beams so obtained by the calcination process by using five types of fluxes, Calcium Chloride, Cerium Chloride, Strontium Chloride, Magnesium Bromide and Barium Bromide, and then, measurements of fluorescence spectra obtained by alpha-ray irradiation were performed in the configuration in which those measurement samples were located at the position where the individual sample was to be set up in the excitation light irradiation system of the fluorescence photometer.

Alpha-ray irradiation fluorescence spectra for those five types of ZnS:Ag fluorescent materials for detecting particle beams so obtained are shown in FIG. 32 to FIG. 36 by normalizing the observed maximum values in the spectra to 1 (one) in order to compare the shapes of alpha-ray irradiation fluorescent spectra. As the result of analyzing alpha-ray fluorescence spectra so obtained, the fractions of the quantity of fluorescence in alpha-ray sensitive fluorescence spectra to the quantity of fluorescence in alpha-ray sensitive fluorescence spectra are shown in Table 2. As the value of every fraction became equal to or larger than its target value, 0.35, it was able to be confirmed that ZnS:Ag fluorescent materials for detecting particle beams as the second fluorescent material can be manufactured with those types of fluxes.

As described above, as alpha-ray detection factor representing the fraction of the quantity of alpha-ray sensitive fluorescence spectrum to the quantity of alpha-ray irradiation fluorescence spectrum can be controlled by using Alkaline metal, Magnesium (Mg) and Alkaline earth metal as a flux, and by adding Sulfur or Strontium Sulfide as Sulfide, it was able to be confirmed that ZnS:Ag fluorescent materials as the first fluorescent materials for detecting particle beams and ZnS:Ag fluorescent materials as the second fluorescent materials for detecting particle beams, both with their alpha-ray detecting factors being potentially 1 (one) can be manufactured.

Embodiment 5

In this embodiment, what will be described is a manufacturing method in case of manufacturing ZnS:Ag fluorescent material for detecting particle beams as the second fluorescent material by applying the manufacturing methods described in Embodiment 3 and Embodiment 4, which is characterized by that calcination materials are prepared by mixing Zinc Sulfide as a main raw material, Silver (Ag) as an activating material, flux used for reducing the calcination temperature, and Sulfur or Sulfide used as an add-in material;

a crucible composed of graphite, with its whole periphery being closed and having a hole with a small diameter at the center of the lid of the crucible in order to release a part of sublimate substances generated from the calcination materials inside the crucible during the calcination process is used; and after providing the calcination materials inside the graphite crucible, a calcination process is applied at the temperature between the temperature value higher than the melting point of flux and the temperature value of 1000° C. or lower which is sufficiently lower than the sublimation temperature of ZnS, and for the calcination period of time from 2 hours to 3 hours while supplying carbon dioxide or nitrogen gas as cover gas.

In Embodiment 1 through Embodiment 4, what has been already described is such an example that a crucible composed of graphite, with its whole periphery being closed and having a hole with a small diameter at the center of the lid of the crucible in order to release a part of sublimate substances generated from the calcination materials inside the crucible during the calcination process is used; and after providing the calcination materials inside the graphite crucible, a calcination process is applied at the temperature between the temperature value higher than the melting point of flux and the temperature value of 1000° C. or lower which is sufficiently lower than the sublimation temperature of ZnS, and for the calcination period of time from 2 hours to 3 hours while supplying carbon dioxide or nitrogen gas as cover gas.

In this embodiment, what will be described at first is an influence to alpha-ray irradiation fluorescence spectra of ZnS:Ag fluorescent material given by changing the size of hole provided at the center of the lid of the crucible composed of graphite, with its whole periphery being closed, in order to release a part of sublimate substances generated from the calcination materials inside the crucible during the calcination process.

A small-sized hole provided in order to release a part of sublimate substances generated from the calcination materials inside the graphite crucible is considered to serve as an important role, in the reaction process between Zinc Sulfide and sublimate substances originated from Zinc Sulfide, flux, and Sulfur and Sulfide as add-in materials, specifically sublimate substances composed of Sulfur and Zinc remaining inside the graphite crucible during the calcination process, by keeping an optimum balance between their remaining amount inside the crucible and their released amount from the crucible.

50 g of Zinc Sulfide are used as a main raw material. In this example of the present invention, Zinc Sulfide having a median grain size of 8 μm was used. Silver as an activating material is used in the form of Silver Nitrate and added by the weight fraction of 0.015% to the quantity of Zinc Sulfide. Barium Bromine ($BaBr_2$) is used as a flux and added by the weight fraction of 6% to the quantity of Zinc Sulfide. Sulfur is used as an add-in material, and added by the weight fraction of 2% to the quantity of Zinc Sulfide. 20 cc of distilled water is added to and mixed with the above materials, and then is dried.

As for the crucible composed of graphite with its whole periphery being closed, a graphite crucible having an outer diameter of 60 mmφ and a length of 50 mm, an inner diameter of 30 mmφ, a bottom thickness of 10 mm and a lid thickness of 10 mm is used. A hole is provided at the center of the lid in order to release a part of sublimate substances generated from the calcination materials inside the crucible. Three lids were prepared by providing each hole having a diameter of 0.7 mm, 1 mm and 1.4 mm, respectively. Thus, three types of graphite crucible were prepared by providing dried calcination materials inside the crucibles and closing the lids.

The graphite crucible is held into the electric furnace and the calcination process is applied. As for the electric furnace, Electric Furnace KDF-S70 type manufactured by DENKEN Co., Ltd was used. The calcination process was performed in the following conditions.

Calcination Temperature: 920° C.

Cover Gas: $CO_2$ flowing at a flow rate of 2 liters per minute

Calcination Period of Time: 2 hours

After sintered materials obtained after the calcination process were ground to powder, and further after rinsing the powder by water, ZnS:Ag based fluorescent material for detecting particle beams was finally obtained.

Figure 37:
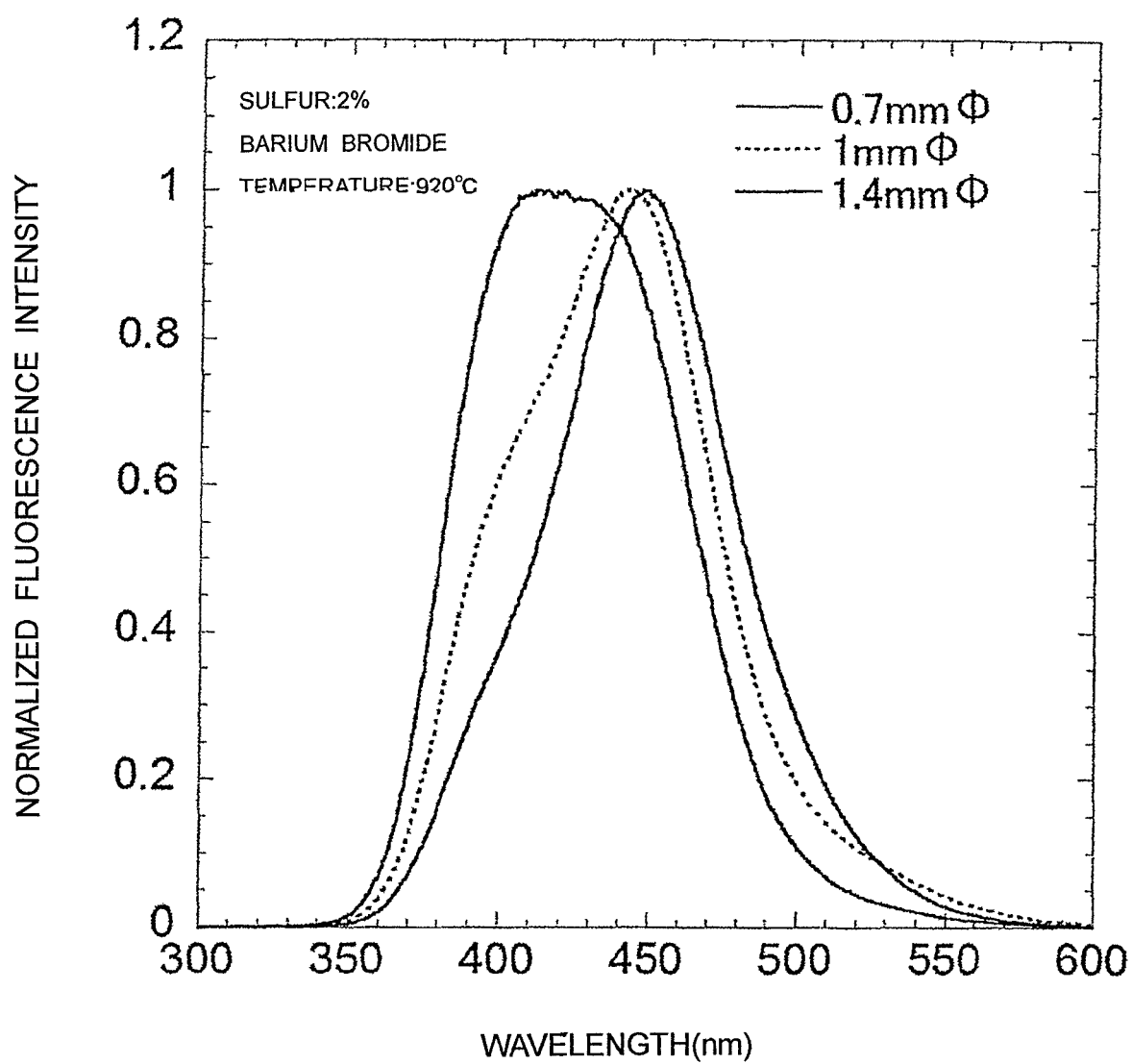

Measurement samples are prepared for three types of ZnS:Ag fluorescent materials so obtained by the calcination process by using Barium Bromide as a flux by the weight fraction of 6% and Sulfur as an add-in material by the weight fraction of 2%, and then measurements of fluorescence spectra obtained by alpha-ray irradiation and gamma-ray irradiation were performed in the configuration in which those measurement samples are located at the position where the individual sample is to be set up in the excitation light irradiation system of the fluorescence photometer. Alpha-ray irradiation fluorescence spectra for those three types of ZnS:Ag fluorescent materials so obtained are shown in FIG. 37 by normalizing the observed maximum values in the spectra to 1 (one) in order to compare the shapes of alpha-ray irradiation fluorescent spectra. It is proved that the quantity of fluorescence of the component of alpha-ray sensitive fluorescence spectrum corresponding to the wavelength range at 420 nm or shorter in alpha-ray irradiation fluorescence spectrum increases as the size of hole provided at the lid of the graphite crucible increases.

From this experimental result, it was able to be confirmed that the quantity of fluorescence in a part of alpha-ray sensitive fluorescence spectrum of ZnS:Ag fluorescent materials was able to be controlled by using a crucible composed of graphite, with its whole periphery being closed and having a hole with a small diameter at the center of the lid of the crucible in order to release a part of sublimate substances generated from the calcination materials inside the crucible during the calcination process. Alpha-ray detection factor was obtained by analyzing alpha-ray fluorescence spectra so obtained. According to the analytical result, as the alpha-ray detection factor became 0.56 and reached a value higher than the target value 0.35 if a graphite crucible with a lid having a hole having a diameter of 1.4 mm was used, it was able to be confirmed that ZnS:Ag fluorescent materials for detecting particle beams as the second fluorescent material can be manufactured.

According to the above results, it was able to be confirmed that intended ZnS:Ag fluorescent materials for detecting particle beams was able to be manufactured by the calcination process by means of providing a hole at the center of the lid of the graphite crucible in order to release a part of sublimate substances generated from the calcination materials inside the crucible, and controlling the quantity of sublimate substances by selecting the type of add-in materials and their quantities as parameters.

As for another embodiment of manufacturing method, an influence to ZnS:Ag fluorescent materials for detecting particle beams due to the quantity of Lithium Chloride as an add-in material for flux was studied. The above described manufacturing method was used. Silver as an activating material was used in the form of Silver Nitrate and added by the weight fraction of 0.015% to the quantity of Zinc Sulfide. Sulfur as an add-in material was added by the weight fraction of 2% to the quantity of Zinc Sulfide, and Lithium Chloride as a flux was added by 2%, 4%, 6% and 8%, respectively, and thus four types of calcination materials were prepared. The calcination temperature was set to be 820° C., and the calcination process was applied for two hours.

Figure 38:
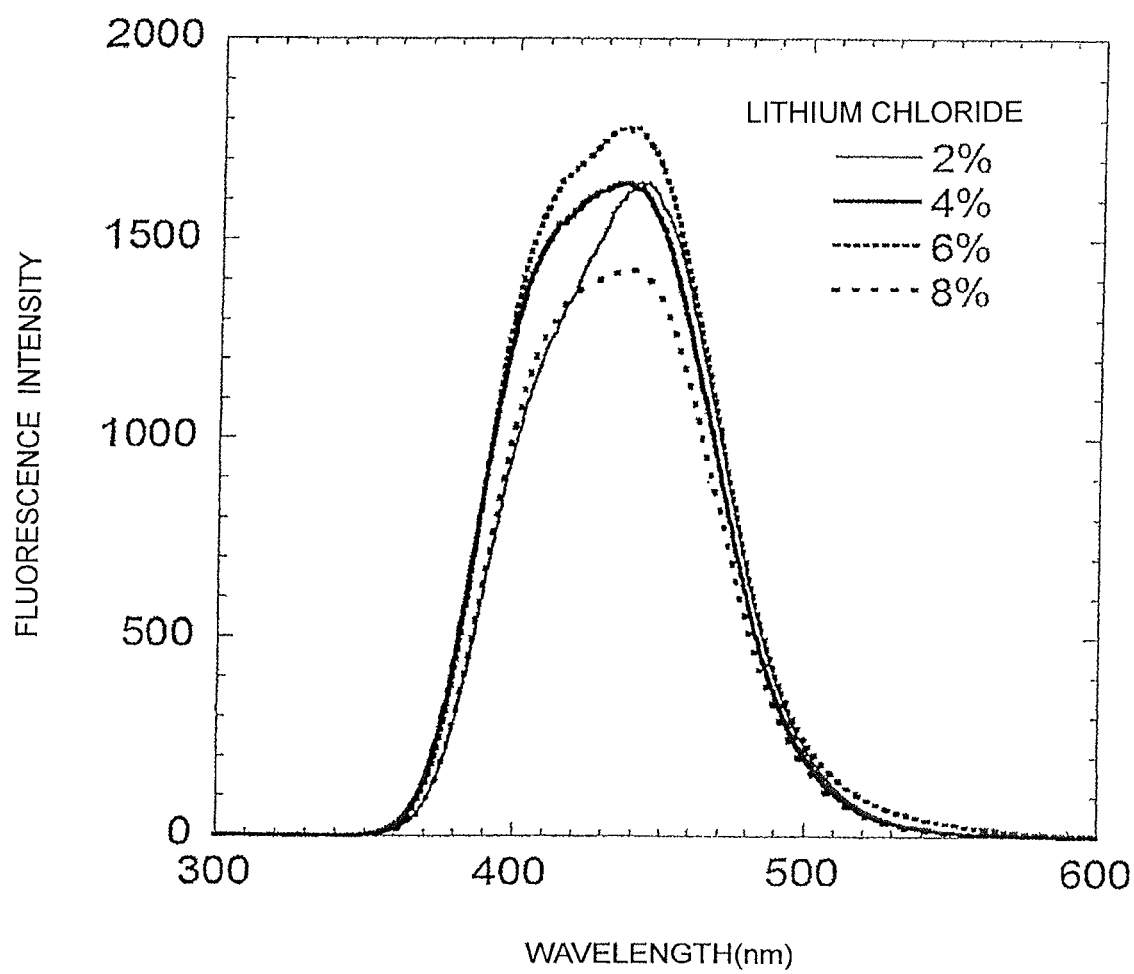

FIG. 38 shows alpha-ray irradiation spectra for four types of ZnS:Ag fluorescent materials for detecting particle beams with Lithium Chloride added by 2%, 4%, 6% and 8%, respectively. Though a part of alpha-ray sensitive fluorescence spectrum decreased significantly in case of adding the least quantity of Lithium Chloride, 2%, it was able to be confirmed that identical effects was able to be obtained for the other cases. Thus, it was able to be confirmed that the quantity of Lithium Chloride added as a flux was preferably from 4% to 8%.

As for yet another embodiment of manufacturing method, an influence to ZnS:Ag fluorescent materials for detecting particle beams finished after applying the calcination process due to the quantity of Silver Nitrate as an activating material was studied. The above described manufacturing method was used, Sulfur as an add-in material was added by the weight fraction of 2% to the quantity of Zinc Sulfide, Lithium Chloride as a flux was added by the weight fraction of 6% to the quantity of Zinc Sulfide, and Silver as an activating material was used in the form of Silver Nitrate and added by the weight fractions of 0.005%, 0.008%, 0.012%, 0.025% and 0.045%, respectively, to the quantity of Zinc Sulfide, and five types of calcination materials are prepared. The calcination temperature was set to be 720° C., and the calcination process was applied for two hours.

Figure 39:
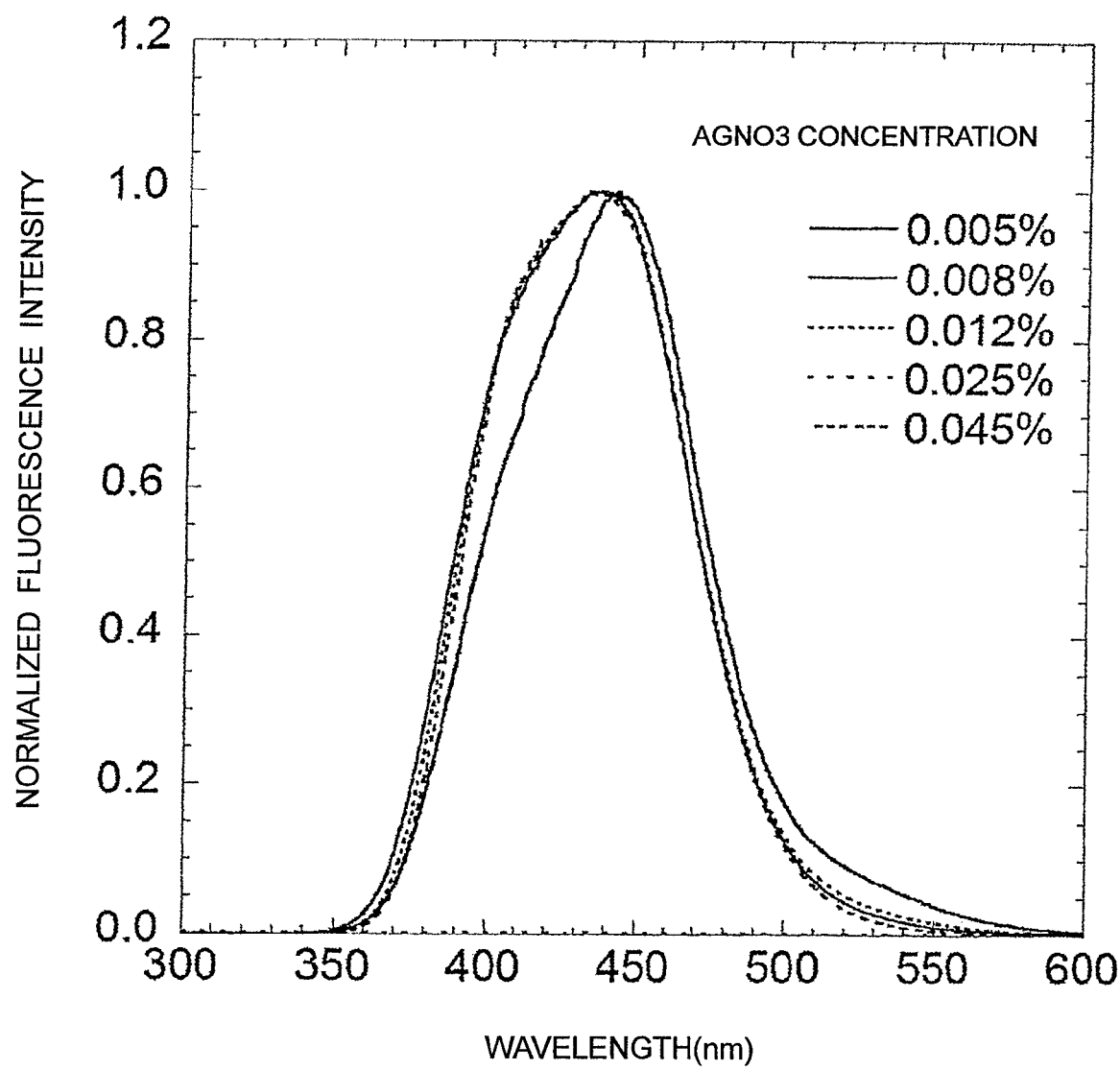

FIG. 39 shows alpha-ray irradiation spectra for five types of ZnS:Ag fluorescent materials for detecting particle beams with Silver as an activating material added in the form of Silver Nitrate by the weight fractions of 0.005%, 0.008%, 0.012%, 0.025% and 0.045%, respectively, to the quantity of Zinc Sulfide. Though a part of alpha-ray sensitive fluorescence spectrum decreased significantly in case of adding the least quantity of Silver, 0.005%, it was able to be confirmed that identical effects was able to be obtained for the other cases. In addition, in case of adding the maximum quantity of Silver, 0.045%, ZnS:Ag fluorescent material obtained after applying the calcination process exhibited coloring. Thus, it was able to be confirmed that the quantity of Silver Nitrate added as an activating material was preferably from 0.008% to 0.025%.

In the above described embodiments of the present invention, though Carbon Dioxide gas ($CO_2$) were used as cover gas of low oxygen concentration to be supplied into the electric furnace in the calcination process for ZnS:Ag fluorescent materials, what was performed for this embodiment is an experiment for confirming that ZnS:Ag fluorescent materials can be manufactured by the calcination process in case of supplying Nitrogen gas ($N_2$) as another cover gas.

Lithium Chloride (LiCl) was used as a flux and added by the weight fraction of 6% to the quantity of Zinc Sulfide, and Sulfur is used as an add-in material and added by the weight fraction of 2% to the quantity of Zinc Sulfide. The calcination temperature is 920° C. in either case, and other conditions are the same as those in the above described embodiments.

Figure 40:
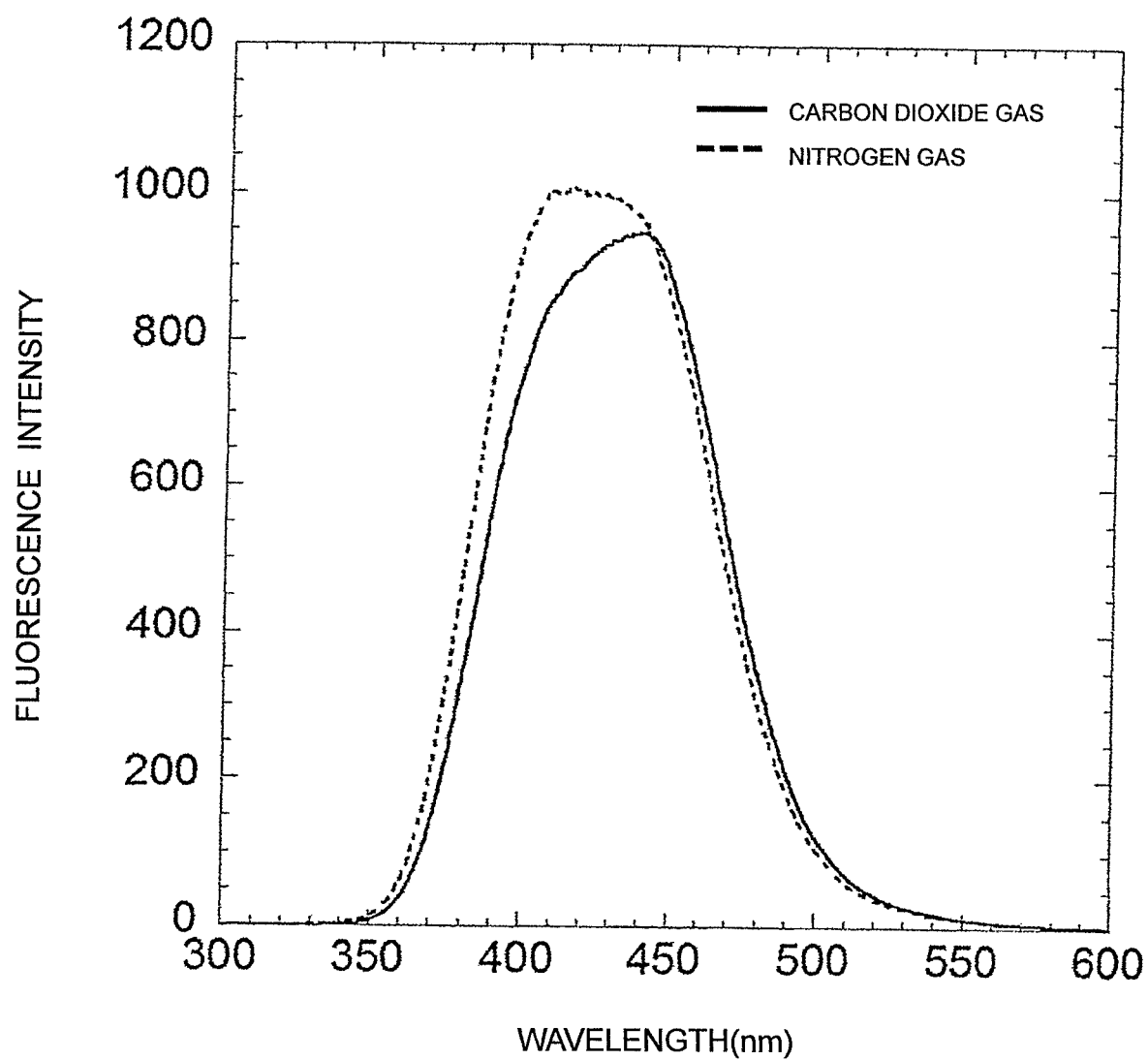

Alpha-ray irradiation fluorescence spectra for two types of ZnS:Ag fluorescent materials for detecting particle beams so obtained in the calcination process by supplying Carbon Dioxide gas and Nitrogen gas, respectively, as cover gas are shown in FIG. 40 by normalizing the observed maximum values in the spectra to 1 (one) in order to compare the shapes of alpha-ray irradiation fluorescent spectra. It can be confirmed that for a part of alpha-ray sensitive fluorescence spectrum in the fluorescence spectrum for both types of ZnS:Ag fluorescent materials decreases substantially though the quantity of fluorescence in alpha-ray sensitive fluorescence spectrum corresponding to the case of using Nitrogen gas is relatively large, and hence that the alpha-ray detection factor is equal to or more than 0.35. From this experimental result, it was able to be confirmed that ZnS:Ag fluorescent materials for detecting particle was able to be manufactured by using either Carbon Dioxide gas or Nitrogen gas as cover gas.

As the last part of this embodiment, experiments were performed for studying an influence of the difference in the calcination time over the alpha-ray sensitivity fluorescence spectrum ZnS:Ag fluorescent materials for detecting particle beams so obtained in the calcination process with the calcination times of 2 hours and 3 hours and two types of fluxes. Strontium Bromide ($SrBr_2$) and Magnesium Bromide ($MgBr_2$) were used as fluxes and added by the weight fraction of 6% to the quantity of Zinc Sulfide, and Sulfur was used as an add-in material and added by the weight fraction of 2% to the quantity of Zinc Sulfide. The calcination temperature was 920° C. in either case.

Figure 41:
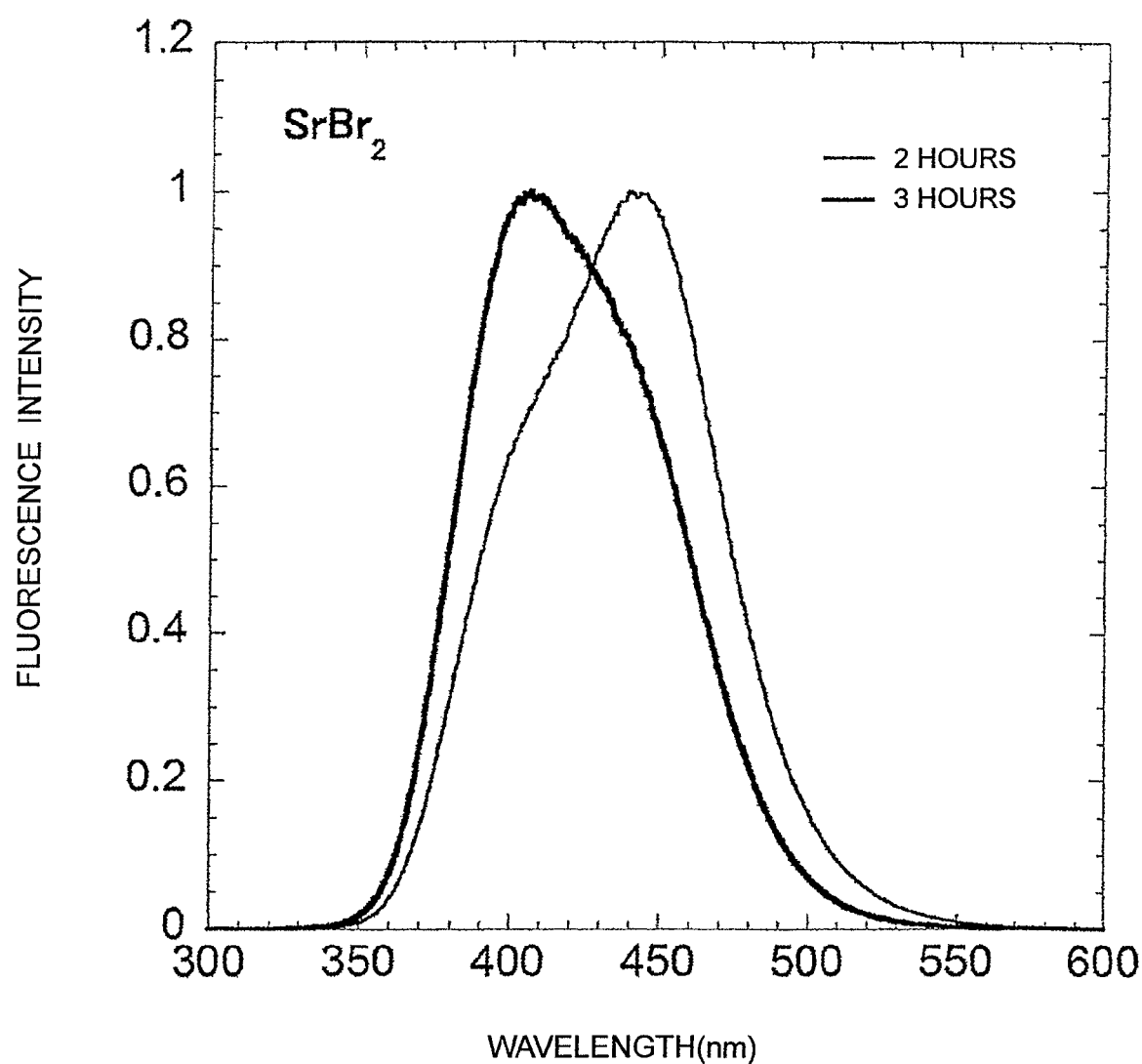
Figure 42:
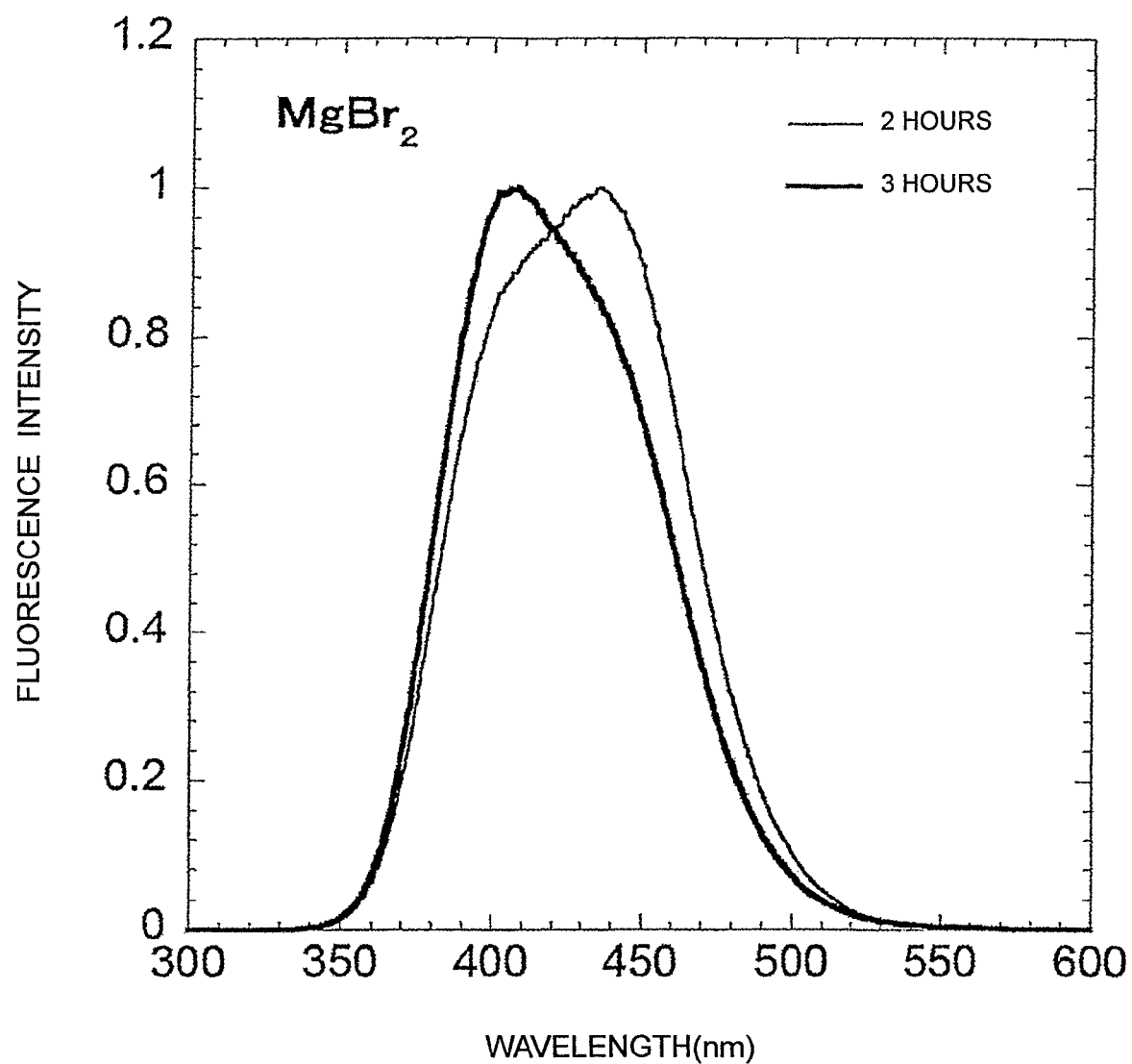

Alpha-ray irradiation fluorescence spectra for those two types of ZnS:Ag fluorescent materials for detecting particle beams so obtained in the calcination process for two hours and three hours, respectively, and by using Strontium Bromide and Magnesium Bromide as fluxes are shown in FIG. 41 and FIG. 42 by normalizing the observed maximum values in the spectra to 1 (one) in order to compare the shapes of alpha-ray irradiation fluorescent spectra. For both types of fluxes, it was able to be confirmed that the quantities of fluorescence in alpha-ray sensitive fluorescence spectrum included in alpha-ray irradiation fluorescence spectrum increased by extending the calcination time from two hours to three hours. From this experimental result, it was able to be confirmed that the alpha-ray detection factor of ZnS:Ag fluorescent material for detecting particle beams was able to be controlled by changing the calcination time.

In conclusion, it was able to be confirmed that intended ZnS:Ag fluorescent materials for detecting particle beams as the first or second fluorescent material was able to be manufactured in the calcination process under such conditions that, Zinc Sulfide were used as a main raw material, and Silver Nitrate was added as Silver used as an activating material by the weight fraction 0.008% through 0.025% to the quantity of Zinc Sulfide, and a flux was added by the weight fraction from 2% through 8% to Zinc Sulfide (ZnS) as a main raw material, and Sulfur or Strontium Sulfide was added as an add-in material selectively to the intended ZnS:Ag fluorescent materials for detecting particle beams as the first or second fluorescent material, and Carbon Dioxide gas or Nitrogen gas were used as cover gas, and the calcination temperature was set to 1000° C. by considering the melting point of flux, and the calcination time was set to be from 2 hours to 3 hours.

Embodiment 6

In this embodiment, what will be described is a manufacturing method for manufacturing ZnS:Ag fluorescent materials for detecting particle beams as the first fluorescent material having a different decay time by applying the manufacturing methods described in Embodiment 3, Embodiment 4 and Embodiment 5, by changing the quantity of Sulfur and Strontium Sulfide as Sulfide added as add-in materials together with Zinc Sulfide used as a main raw material, Silver as an activating material and flux used for reducing the calcination temperature.

What will be described at first is a case of using Sulfide as an add-in material. 50 g of Zinc Sulfide are used as a main raw material. Silver as an activating material is used in the form of Silver Nitrate and added by the weight fraction of 0.015% to the quantity of Zinc Sulfide. Lithium Chloride is used as a flux and added by the weight fraction of 6% to the quantity of Zinc Sulfide. Sulfur is used as an add-in material, and added by the weight fraction of 2%, 2.5%, 3%, 4%, 5% and 8% to the quantity of Zinc Sulfide. 20 cc of distilled water is added to and mixed with the above materials, and then is dried.

As for the crucible composed of graphite with its whole periphery being closed, a graphite crucible having an outer diameter of 60 mm$\varphi$ and a length of 50 mm, an inner diameter of 30 mm$\varphi$, a bottom thickness of 10 mm and a lid thickness of 10 mm is used. The net volume for accommodating the materials is designed to have a diameter of 30 mm$\varphi$ and a length of 30 mm. A hole having a diameter of 1 mm$\varphi$ is provided at the center of the lid in order to release a part of sublimate substances generated from the calcination materials inside the crucible. Dried calcination materials are introduced inside the graphite crucible, and the lid is closed.

Next, the graphite crucible is held into the electric furnace and the calcination process is applied. As for the electric furnace, Electric Furnace KDF-S70 type manufactured by DENKEN Co., Ltd was used. The calcination process was performed in the following conditions.

Calcination Temperature: 820$\varphi$
Cover Gas: $CO_2$ flowing at a flow rate of 2 liters per minute
Calcination Period of Time: 2 hours After sintered materials obtained after the calcination process were ground to powder, and further after rinsing the powder by water, ZnS:Ag based fluorescent material for detecting particle beams is finally obtained. The color of the obtained ZnS:Ag based fluorescent materials for detecting particle beams exhibits light yellowish-brown rather than white.

The samples were prepared for five types of ZnS:Ag based fluorescent materials for detecting particle beams manufactured in the calcination process by changing the quantity of Sulfur used as an add-in material. Measurements of fluorescence spectra in response to alpha-ray irradiation and gamma-ray irradiation were performed in the configuration in which those measurement samples were located at the position where the individual sample was to be set up in the excitation light irradiation system of the fluorescence photometer.

Figure 43:
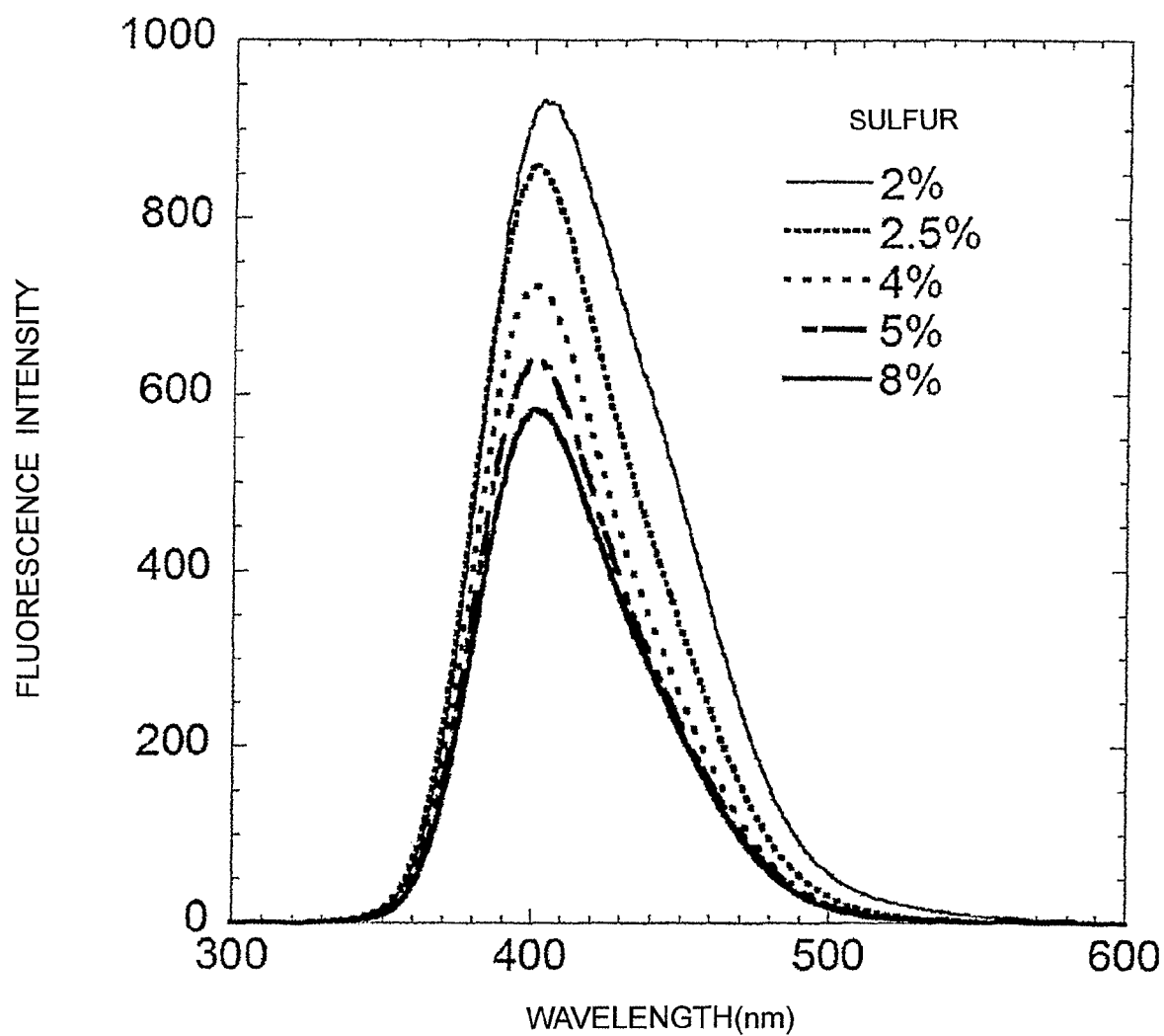

FIG. 43 shows alpha-ray irradiation spectra for five types of ZnS:Ag fluorescent materials for detecting particle beams. It is proved that the quantity of fluorescence decreases as the quantity of Sulfur as an add-in material increases.

Figure 44:
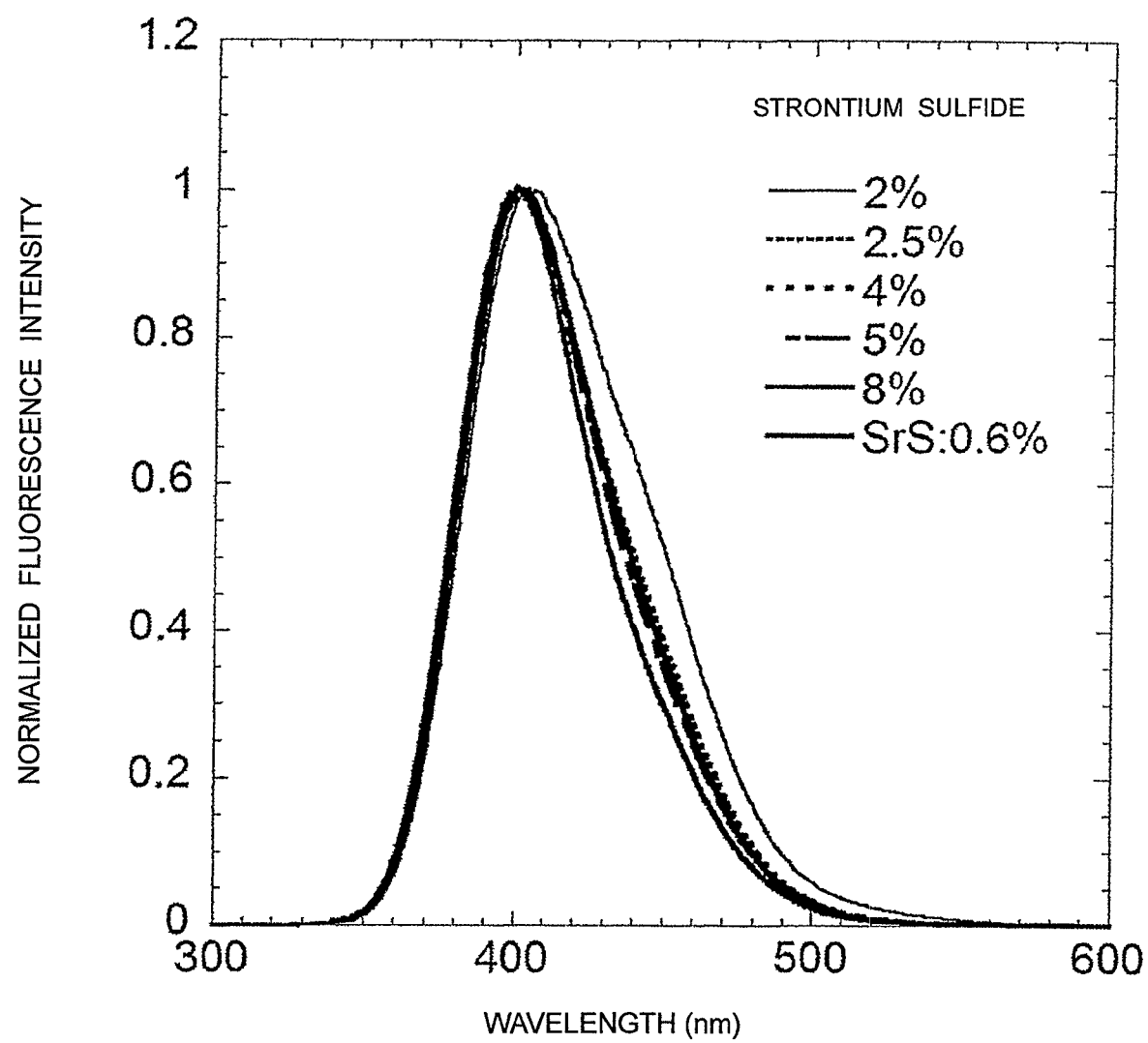

Alpha-ray irradiation fluorescence spectra are shown in FIG. 44 by normalizing the observed maximum values in the spectra to 1 (one) in order to facilitate the comparison of changes in the shapes of alpha-ray irradiation fluorescent spectra. Alpha-ray sensitive fluorescence spectrum with respect to the case of adding Strontium Sulfide as Sulfide by the weight fraction of 0.6% as add-in material is added in FIG. 43 for comparison.

As for changes in fluorescence spectra due to the added quantity of Sulfur as an add-in material, it was proved that the intensity of the fluorescence spectrum increased slightly at the longer wavelength range globally for the weight fraction of Sulfur being added by 2% and that the spectral intensity of the fluorescence spectrum did not change for the weight fraction of Sulfur being added by 2.5% or larger. Thus, note that the quantity of Sulfur corresponding to the final measurement for the fluorescence spectrum in case of adding Sulfur was the weight fraction of 8%. It was able to be confirmed that, in the shape of fluorescence spectra, the intensity of the fluorescence spectrum increased slightly at the longer wavelength range globally in contrast to the fluorescence spectrum, added in the line graph shown in FIG. 44, for comparison in case of adding Strontium Sulfide by the weight fraction of 0.6%.

Figure 45:
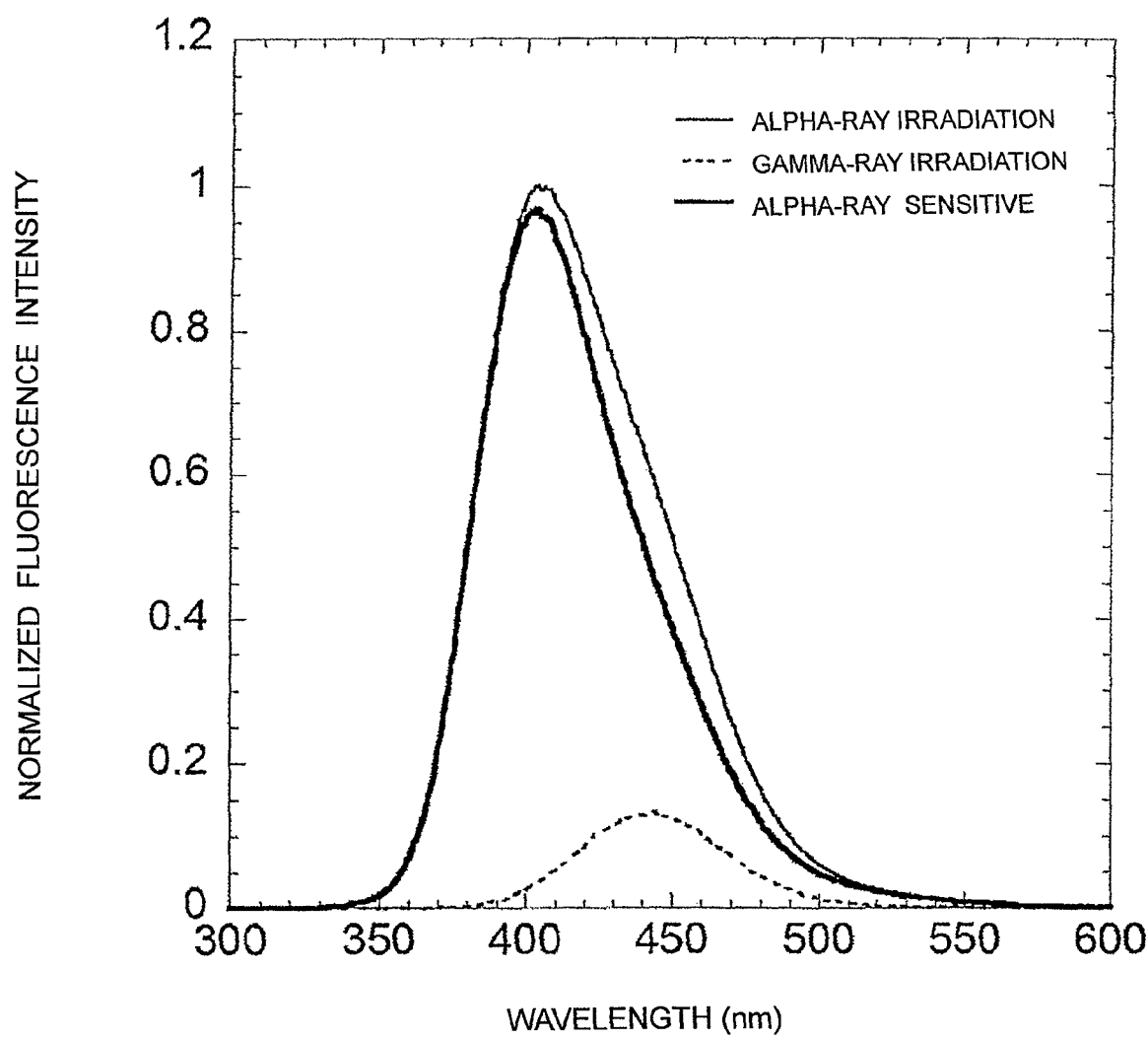

As for the fluorescence spectrum of the fluorescent material with Sulfur being added by the weight fraction of 2.5%, as a global increase in its spectral intensity was relatively larger in comparison with other weight fractions, this might be considered to be contributed by the spectral component of the second fluorescent material, and thus, an analytical study was performed for separating alpha-ray irradiation fluorescence spectrum into the components of gamma-ray irradiation fluorescence spectrum and the component of alpha-ray sensitive spectrum. The analytical result is shown in FIG. 45. It was proved that the alpha-ray detection factor representing the fraction of alpha-ray sensitive spectrum to alpha-ray irradiation fluorescence spectrum, was 0.84, and that the fluorescent material with Sulfur being added by the weight fraction of 2.5% was substantially formed as ZnS:Ag based fluorescent material for detecting particle beams having a fluorescence spectrum provided by the second fluorescent material.

As for the confirmation whether ZnS:Ag based fluorescent material for detecting particle as the first fluorescent material can be formed finally, it can be confirmed by judging whether the peak wavelength of the fluorescence spectrum obtained by gamma-ray irradiation is close to 450 nm which is the peak wavelength of the fluorescence spectrum obtained by gamma-ray irradiation to the conventional P11 fluorescent material, or is close to 400 nm which is originated from the gamma-ray sensitivity at a part of fluorescence spectrum corresponding to the alpha-ray sensitive fluorescence spectrum according to the present invention.

Figure 46:
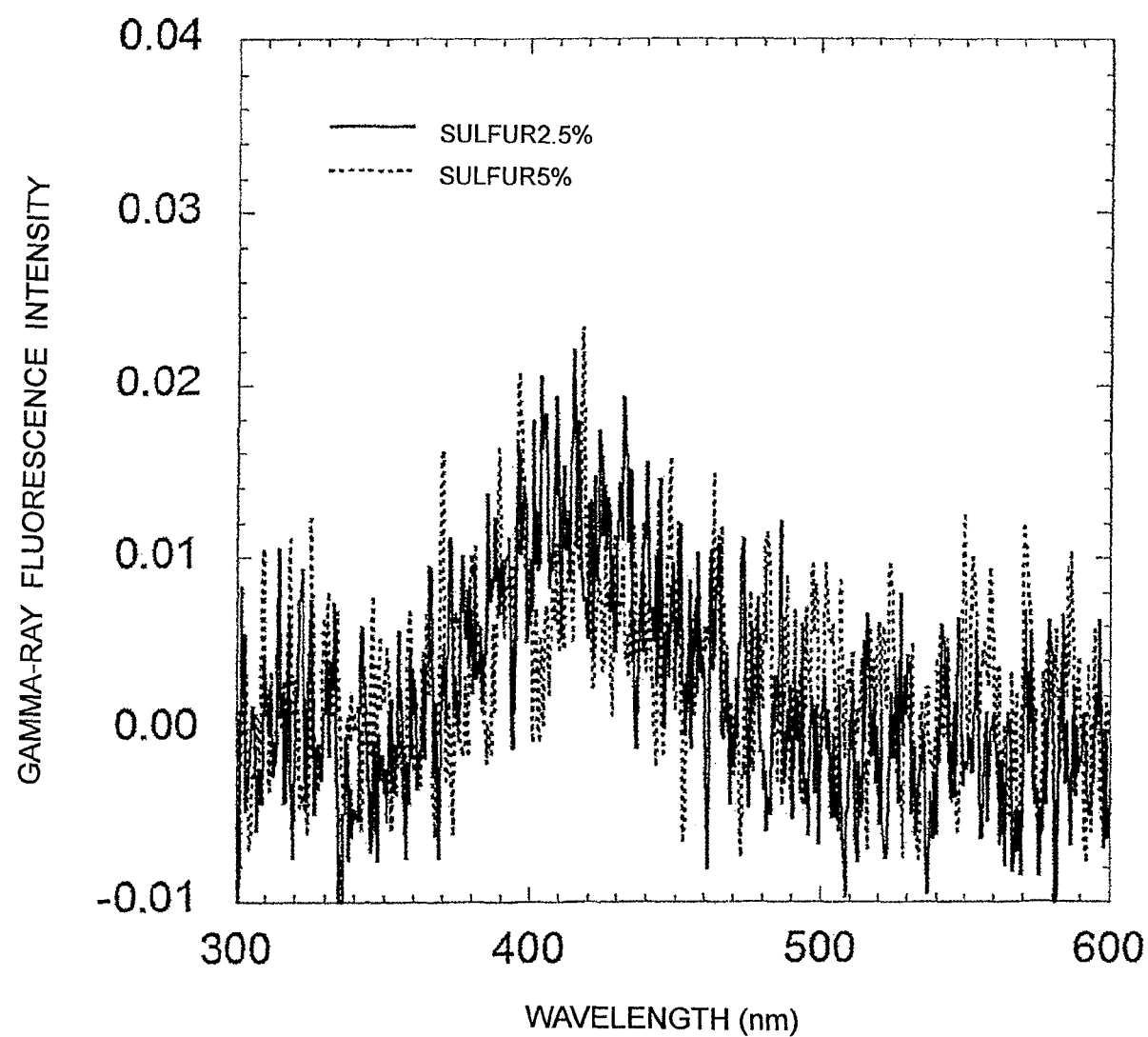

Gamma-ray irradiation experiments are performed for the quantity of Sulfur added by the weight fractions of 2.5% and 5%. FIG. 46 shows gamma-ray irradiation fluorescence spectra so obtained.

From the experimental result, it is proved that the quantity of fluorescence for the quantity of Sulfur added by the weight fraction of 2.5% and 5% is significantly as low as 5% and 2.5%, respectively in comparison with the result of gamma-ray irradiation to P11, and that the peak wavelength of the fluorescence spectrum is about 410 nm. It was able to be consequently confirmed that ZnS:Ag fluorescent material for detecting particle as the first fluorescent material was obtained in case of adding Sulfur by the weight fraction of 2.5% or larger.

What will be described next is a case of using Strontium Sulfide as an add-in material. 50 g of Zinc Sulfide are used as a main raw material. Silver as an activating material is used in the form of Silver Nitrate and added by the weight fraction of 0.015% to the quantity of Zinc Sulfide. Lithium Chloride is used as a flux and added by the weight fraction of 6% to the quantity of Zinc Sulfide. Sulfur is used as an add-in material, and added by the weight fraction of 2%, 2.5%, 3%, 4%, 5% and 8% to the quantity of Zinc Sulfide. 20 cc of distilled water is added to and mixed with the above materials, and then is dried.

As for the crucible composed of graphite with its whole periphery being closed, a graphite crucible having an outer diameter of 60 mmφ and a length of 50 mm, an inner diameter of 30 mmφ a bottom thickness of 10 mm and a lid thickness of 10 mm is used. The net volume for accommodating the materials is designed to have a diameter of 30 mmφ and a length of 30 mmφ. A hole having a diameter of 1 mmφ is provided at the center of the lid in order to release a part of sublimate substances generated from the calcination materials inside the crucible. Dried calcination materials are introduced inside the graphite crucible, and the lid is closed.

Next, the graphite crucible is held into the electric furnace and the calcination process is applied. As for the electric furnace, Electric Furnace KDF-S70 type manufactured by DENKEN Co., Ltd was used. The calcination process was performed in the following conditions.

Calcination Temperature: 820° C.
Cover Gas: $CO_2$ flowing at a flow rate of 2 liters per minute
Calcination Period of Time: 2 hours After sintered materials obtained after the calcination process were ground to powder, and further after rinsing the powder by water, ZnS:Ag based fluorescent material for detecting particle beams is finally obtained. The color of the obtained ZnS:Ag based fluorescent materials for detecting particle beams exhibits light yellowish-brown rather than white.

Figure 47:
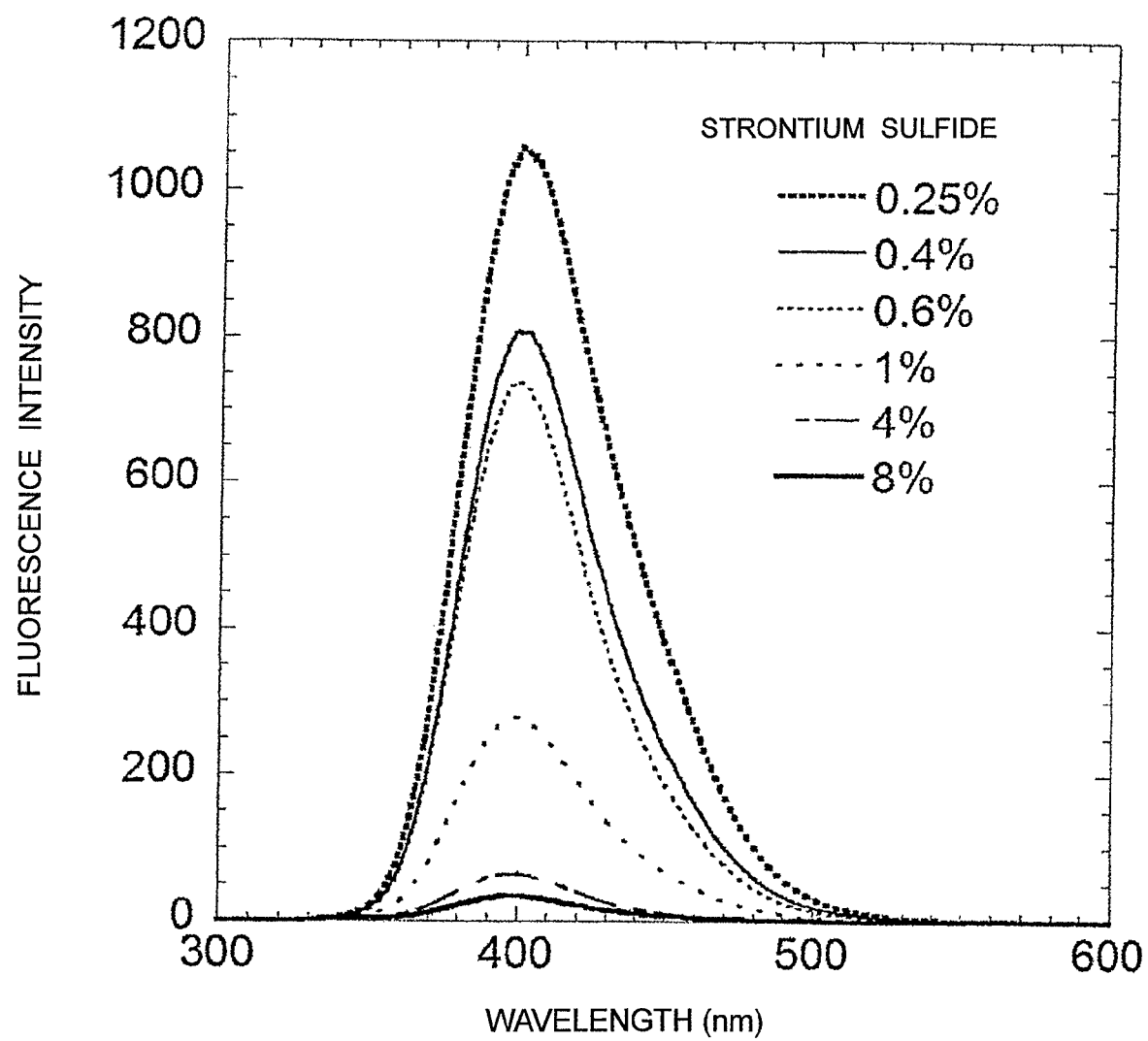

The samples were prepared for six types of ZnS:Ag based fluorescent materials for detecting particle beams manufactured in the calcination process by changing the quantity of Strontium Sulfide used as an add-in material. Measurements of fluorescence spectra in response to alpha-ray irradiation and gamma-ray irradiation were performed in the configuration in which those measurement samples are located at the position where the individual sample was to be set up in the excitation light irradiation system of the fluorescence photometer. FIG. 47 shows alpha-ray irradiation spectra for six types of ZnS:Ag fluorescent materials for detecting particle beams. It is proved that the quantity of fluorescence decreases as the quantity of Strontium Sulfide as an add-in material increases.

Figure 48:
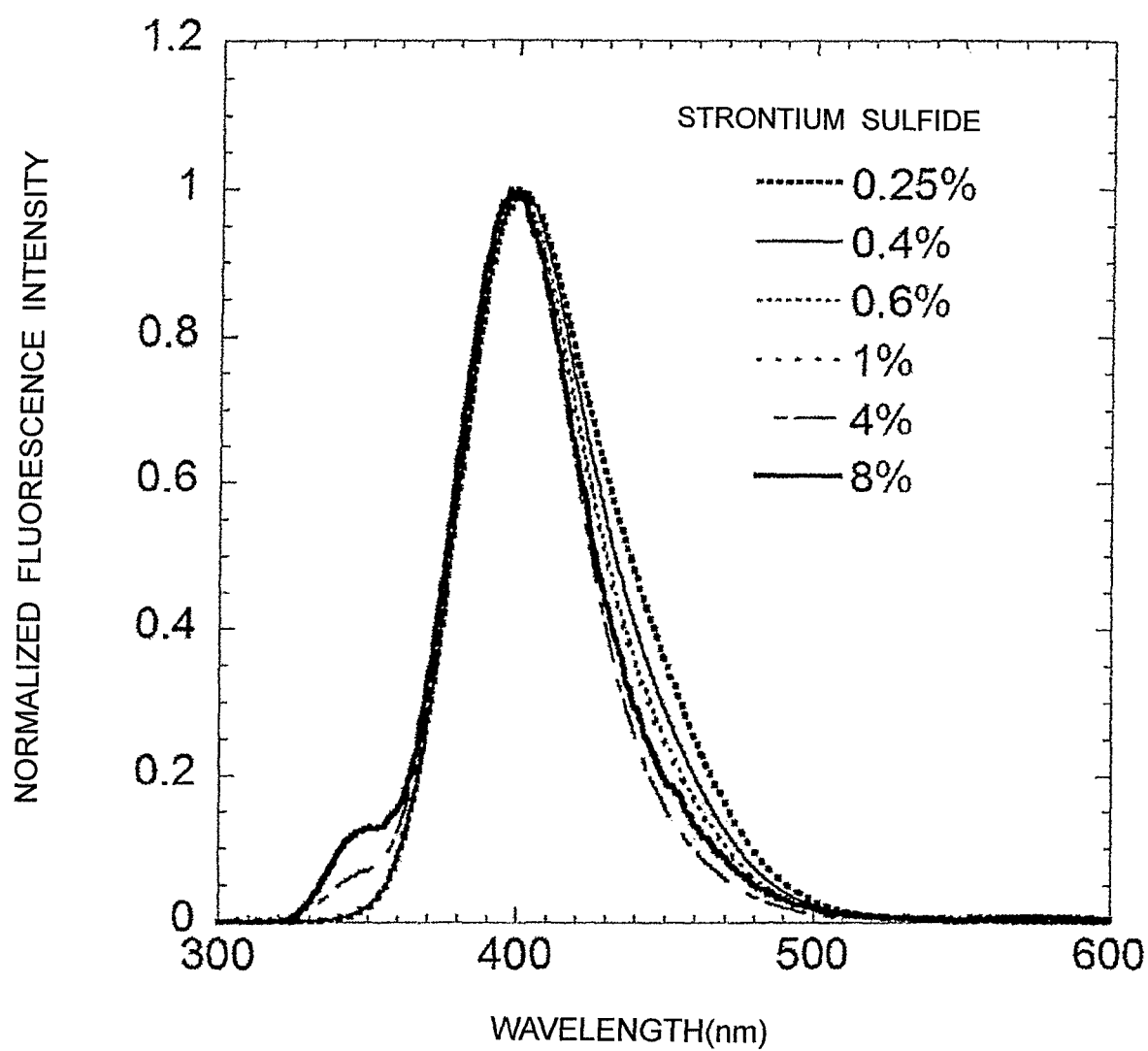

Alpha-ray irradiation fluorescence spectra are shown in FIG. 48 by normalizing the observed maximum values in the spectra to 1 (one) in order to facilitate the comparison of changes in the shapes of alpha-ray irradiation fluorescent spectra.

As for changes in fluorescence spectra due to the added quantity of Strontium Sulfide as an add-in material, it was proved that the spectral intensity of the fluorescence spectrum increased slightly at the longer wavelength range globally for the weight fraction of Strontium Sulfide being added by 0.25%, but that as the spectral intensity of the fluorescence spectrum did not change for the weight fraction of Strontium Sulfide by 0.4% or larger. For the quantity of Strontium Sulfide by the weight fraction of 4% or larger, another component of the fluorescence spectrum having a peak wavelength of 360 nm is observed through more detail study of the fluorescence spectrum, and thus it was confirmed that a new mechanism for generating fluorescence was formed by adding the quantity of Strontium Sulfide being added in the same way as the case of adding Sulfur as described above. As found practically in FIG. 47, it is substantially difficult to detect particle beams by using the fluorescent material with Strontium Sulfide being added by 4% or more in which the quantity of fluorescence becomes significantly small. Thus, an effective fluorescence spectrum to be usable for detecting particle beams in case of adding Strontium Sulfide is practically limited to one obtained in case of adding Strontium Sulfide up to 1%.

The fact that ZnS:Ag based fluorescent material for detecting particle beams as the first fluorescent material is obtained substantially was confirmed by the same method as the method described above in case of using Sulfur as an add-in material. Gamma-ray irradiation experiments are performed for the quantity of Strontium Sulfide added by the weight fraction of 0.25%. FIG. 49 shows a gamma-ray irradiation fluorescence spectrum so obtained.

From the experimental result, it was proved that the quantity of fluorescence for the quantity of Strontium Sulfide added by the weight fraction of 0.25% was significantly as low as 10% in comparison with the result of gamma-ray irradiation to P11 fluorescent material, and that the peak wavelength of the fluorescence spectrum was about 410 nm. It was able to be consequently confirmed that ZnS:Ag fluorescent material for detecting particle beams was obtained as the first fluorescent material in case of adding Strontium Sulfide by the weight fraction of 0.25% or larger.

Figure 50:
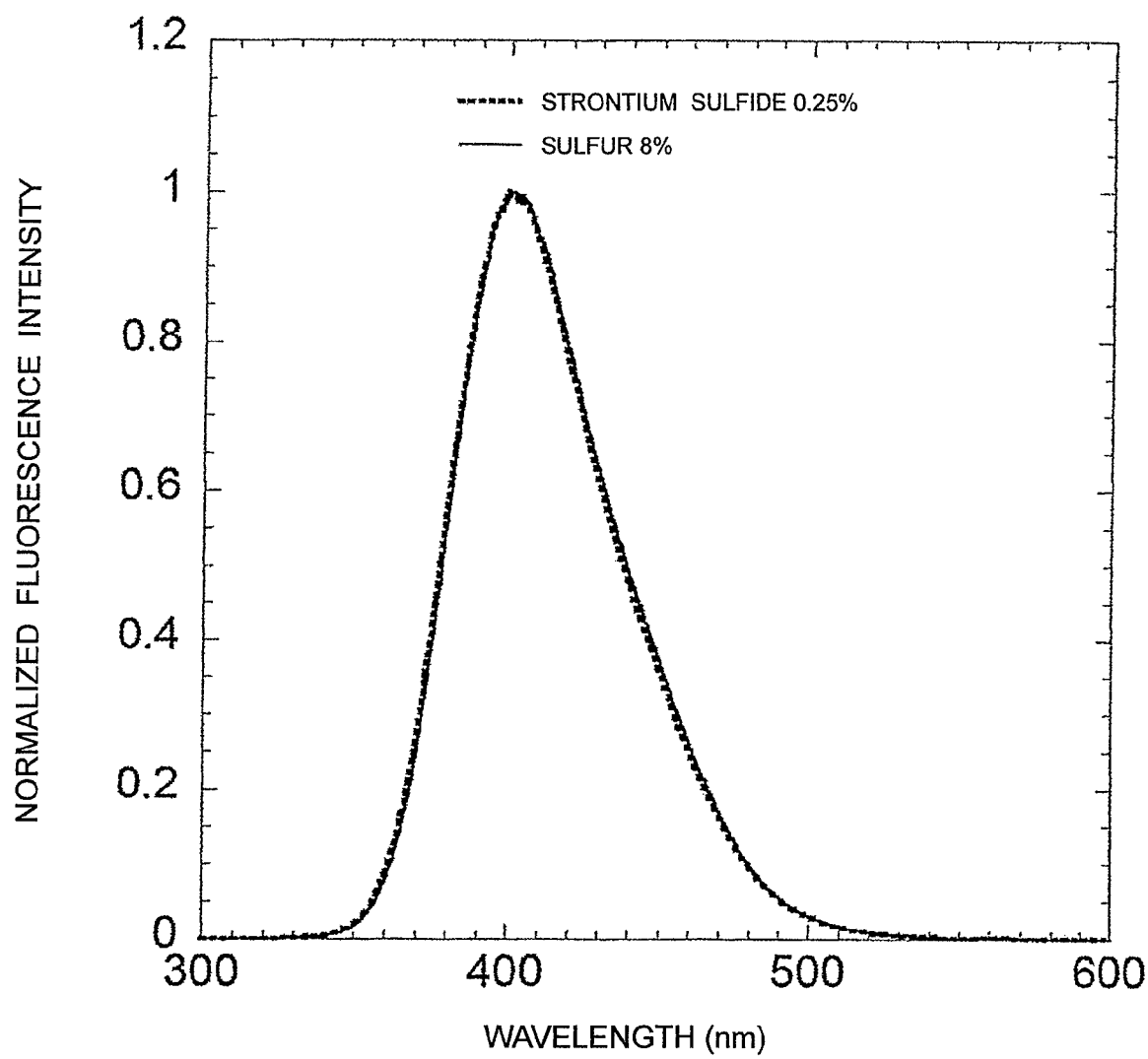

As it was proved that ZnS:Ag fluorescent material for detecting particle beams with Strontium Sulfide being added by the weight fraction of 0.25% belongs to the first fluorescent material, its fluorescence spectrum is now compared with the fluorescence spectrum of the fluorescent material with Sulfur being added by the weight fraction of 8% which has the similar spectral shape. Comparison result is shown in FIG. 50. Those spectral shapes are identical to each other.

As an important conclusion of the present invention derived from the above described results, it was able to be confirmed that the fluorescence spectrum ultimately obtained by adding Sulfur as an add-in material is not a fully effective fluorescence spectrum, but in case of adding Strontium Sulfide, ZnS:Ag fluorescent material for detecting particle beams providing the similar fluorescence spectrum was able to be manufactured by adding Strontium by the weight fraction of 0.25%. Though the shape of fluorescence spectrum of ZnS:Ag fluorescent material for detecting particle beams as the first fluorescent material was categorized as Sulfur-type or Sulfide-type defined on a hypothetical basis in Embodiment 1, it was able to be confirmed that Sulfur-type merely corresponds to the fluorescent material of Sulfide-type with a less quantity of add-in material, and thus Sulfur-type is an intermediate state to an ultimate state for providing an effective fluorescence spectrum.

Then, fluorescence lifetime characteristic with respect to alpha rays was measured by measuring pulse signals obtained by irradiating alpha rays to ZnS:Ag based fluorescent material for detecting particle beams in this embodiment by using an oscilloscope. The evaluation method described in Embodiment 1 was used.

Figure 51:
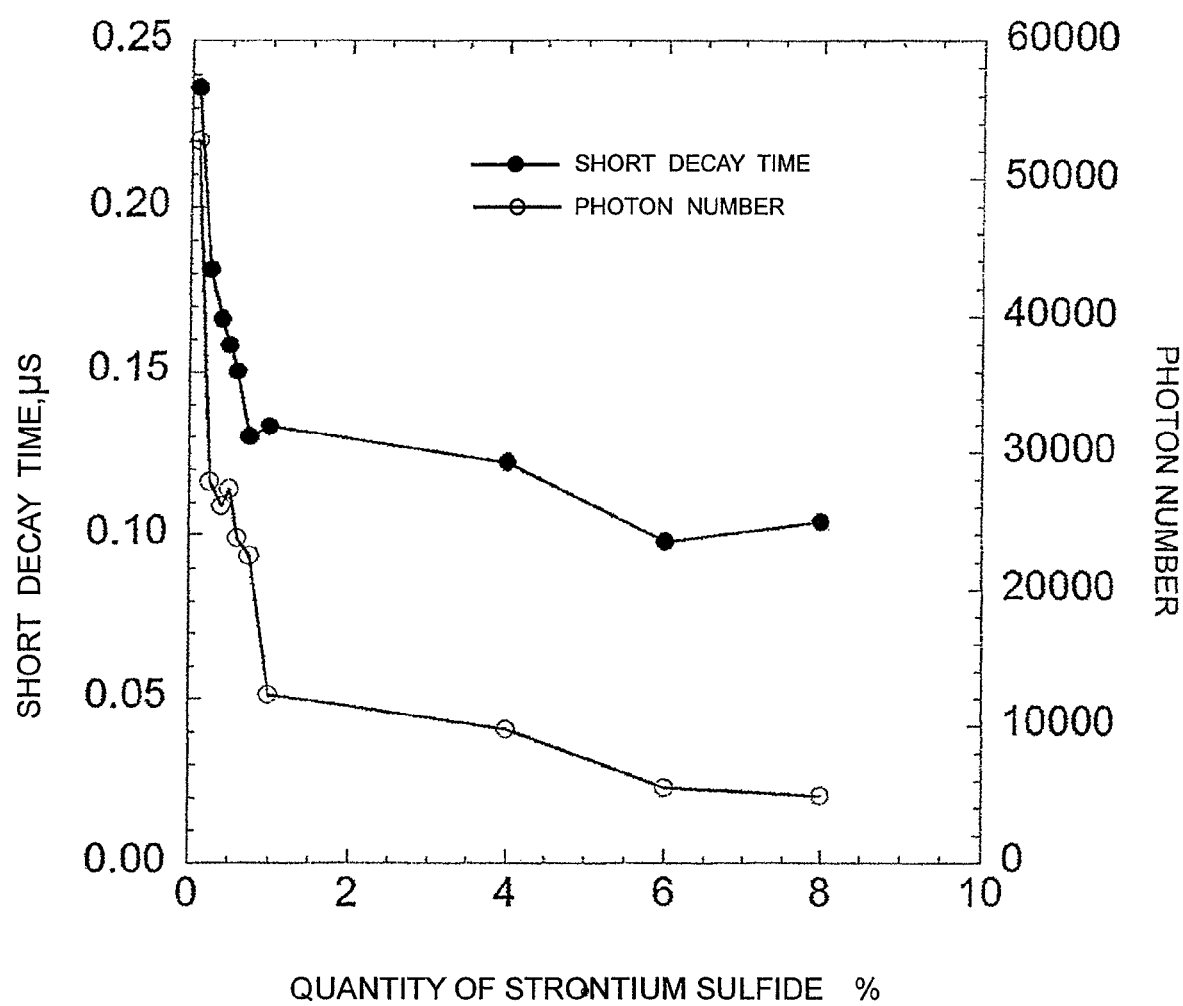
Figure 52:
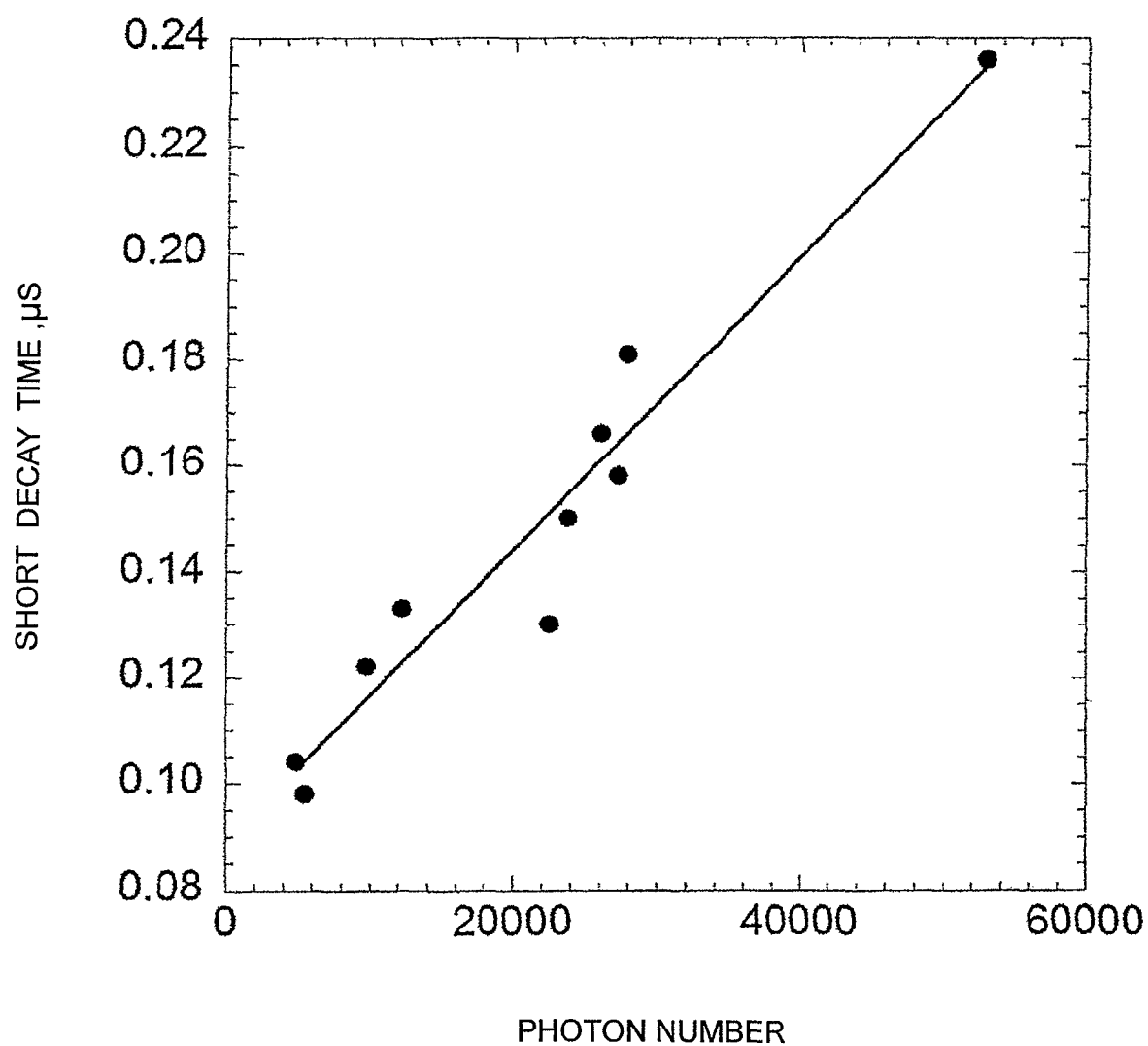

FIG. 51 shows a line diagram obtained by plotting the photon number (the number of photons emitted in 1 μs) and the short decay time (time corresponding to the quantity of fluorescence emitted in 1 μs) obtained by averaging a set of 2000 measured signals in relative to the quantity of Strontium Sulfide being added as parameter. It is proved that the decay time and the short decay time decrease as the quantity of quantity of Strontium Sulfide being added increases. FIG. 51 shows the correlation between the photon number and the short decay time. It is proved that there is a proportional relationship the photon number and the short decay time. Note that, as for plotting the line diagrams in FIG. 51 and FIG. 52, measurement results for fluorescent materials with Strontium Sulfide being added by the weight fractions 0.1%, 0.5%, 0.75% and 6% to Zinc Sulfide were additionally plotted.

From this experimental result, it was able to be confirmed that ZnS:Ag fluorescent material for detecting particle beams as the first fluorescent material having a shorter decay time while having a smaller photon number was able to be manufactured by increasing the quantity of Strontium Sulfide being added in case that such fluorescent material as having a shorter decay time was required for the measurement with high detection efficiency.

As for the case of using Sulfur as an add-in material, comparing alpha-ray irradiation fluorescence spectra shown in FIG. 43 and FIG. 47, it is proved that the quantity of fluorescence decreases as the quantity of Sulfur being added increases in the same way as using Strontium Sulfide, and thus it can be confirmed that ZnS:Ag fluorescent materials for detecting particle beams as the first fluorescent material having a shorter decay time while having a smaller photon number can be manufactured similarly by increasing the quantity of Sulfur being added.

Embodiment 7

In this embodiment, what will be described is a manufacturing method for manufacturing ZnS:Ag fluorescent materials for detecting particle beams as the second fluorescent material in Embodiment 3, Embodiment 4 and Embodiment 5, characterized by that the alpha-ray detection factor, representing the fraction of alpha-ray sensitive fluorescence spectrum to gamma-ray sensitive fluorescence spectrum, is set as the target value in manufacturing to be equal to or more than 0.35, and less than 1 by changing the quantity of Sulfur and Strontium Sulfide as Sulfide added as add-in materials together with Zinc Sulfide used as a main raw material, Silver as an activating material, and a flux.

What will be described at first is a case of using Sulfur as an add-in material. 50 g of Zinc Sulfide are used as a main raw material. Silver as an activating material is used in the form of Silver Nitrate and added by the weight fraction of 0.015% to the quantity of Zinc Sulfide. Lithium Chloride is used as a flux and added by the weight fraction of 6% to the quantity of Zinc Sulfide. Sulfur is used as an add-in material, and added by the weight fraction of 0.05%, 0.1%, 0.15%, 0.175% and 0.2% to the quantity of Zinc Sulfide. 20 cc of distilled water is added to and mixed with the above materials, and then is dried.

As for the crucible composed of graphite with its whole periphery being closed, a graphite crucible having an outer diameter of 60 mmφ and a length of 50 mm, an inner diameter of 30 mmφ, a bottom thickness of 10 mm and a lid thickness of 10 mm is used. The net volume for accommodating the materials is designed to have a diameter of 30 mmφ and a length of 30 mm. A hole having a diameter of 1 mmφ is provided at the center of the lid in order to release a part of sublimate substances generated from the calcination materials inside the crucible. Dried calcination materials are introduced inside the graphite crucible, and the lid is closed.

Next, the graphite crucible is held into the electric furnace and the calcination process is applied. As for the electric furnace, Electric Furnace KDF-S70 type manufactured by DENKEN Co., Ltd was used. The calcination process was performed in the following conditions.

Calcination Temperature: 820° C.
Cover Gas: $CO_2$ flowing at a flow rate of 2 liters per minute
Calcination Period of Time: 2 hours After sintered materials obtained after the calcination process were ground to powder, and further after rinsing the powder by water, ZnS:Ag based fluorescent material for detecting particle beams is finally obtained. The color of the obtained ZnS:Ag based fluorescent materials for detecting particle beams exhibits light yellowish-brown rather than white.

Figure 53:
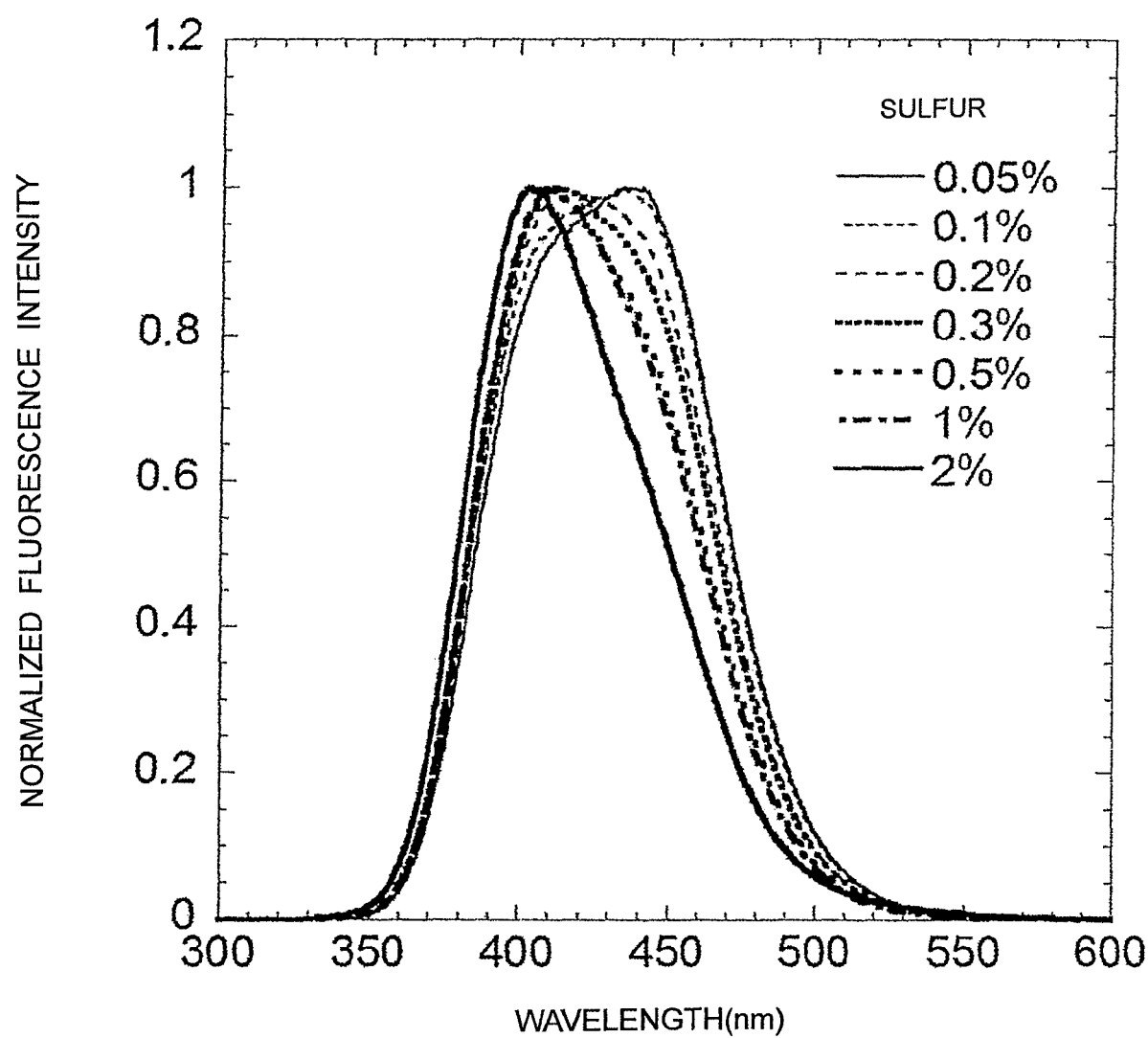

The samples are prepared for seven types of ZnS:Ag based fluorescent materials for detecting particle beams manufactured in the calcination process by changing the quantity of Sulfur used as an add-in material together with Lithium Chloride as a flux, and then measurements of fluorescence spectra in response to alpha-ray irradiation and gamma-ray irradiation are performed in the configuration in which those measurement samples are located at the position where the individual sample is to be set up in the excitation light irradiation system of the fluorescence photometer. Alpha-ray irradiation fluorescence spectra for six types of ZnS:Ag based fluorescent materials for detecting particle beams are shown in FIG. 53 by normalizing the observed maximum values in the spectra to 1 (one) in order to facilitate the comparison of changes in the shapes of alpha-ray irradiation fluorescent spectra.

Figure 54:
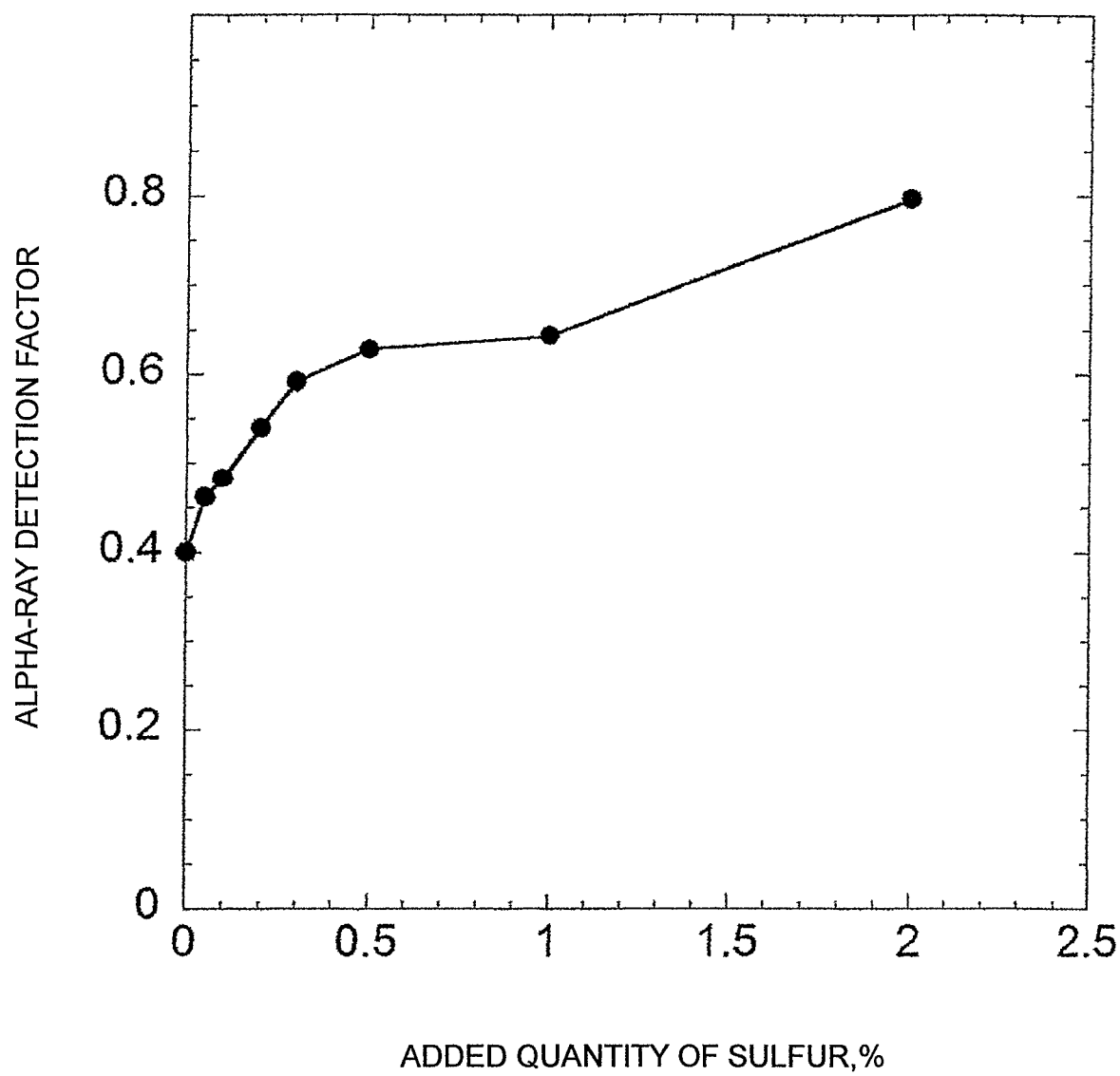

FIG. 54 shows the alpha-ray detection factor obtained by analyzing alpha-ray irradiation spectra so obtained in relative to the quantity of Sulfur added as parameter. As all values for the alpha-ray detection factor become equal to or larger than its target value, 0.35, it was able to be confirmed that ZnS:Ag fluorescent materials for detecting particle beams as the second fluorescent material can be manufactured by changing the quantity of Sulfur being added.

What will be described next is a case of using Strontium Sulfide as an add-in material. 50 g of Zinc Sulfide are used as a main raw material. Silver as an activating material is used in the form of Silver Nitrate and added by the weight fraction of 0.015% to the quantity of Zinc Sulfide. Lithium Chloride is used as a flux and added by the weight fraction of 6% to the quantity of Zinc Sulfide. Strontium Sulfide is used as an add-in material, and added by the weight fraction of 0.05%, 0.1%, 0.15%, 0.175% and 0.2% to the quantity of Zinc Sulfide. 20 cc of distilled water is added to and mixed with the above materials, and then is dried.

As for the crucible composed of graphite with its whole periphery being closed, a graphite crucible having an outer diameter of 60 mmφ and a length of 50 mm, an inner diameter of 30 mmφ, a bottom thickness of 10 mm and a lid thickness of 10 mm is used. The net volume for accommodating the materials is designed to have a diameter of 30 mmφ and a length of 30 mm. A hole having a diameter of 1 mmφ is provided at the center of the lid in order to release a part of sublimate substances generated from the calcination materials inside the crucible. Dried calcination materials are introduced inside the graphite crucible, and the lid is closed.

Next, the graphite crucible is held into the electric furnace and the calcination process is applied. As for the electric furnace, Electric Furnace KDF-S70 type manufactured by DENKEN Co., Ltd was used. The calcination process was performed in the following conditions.

Calcination Temperature: 820° C.
Cover Gas: $CO_2$ flowing at a flow rate of 2 liters per minute
Calcination Period of Time: 2 hours After sintered materials obtained after the calcination process were ground to powder, and further after rinsing the powder by water, ZnS:Ag based fluorescent material for detecting particle beams is finally obtained. The color of the obtained ZnS:Ag based fluorescent materials for detecting particle beams exhibits light yellowish-brown rather than white.

Figure 55:
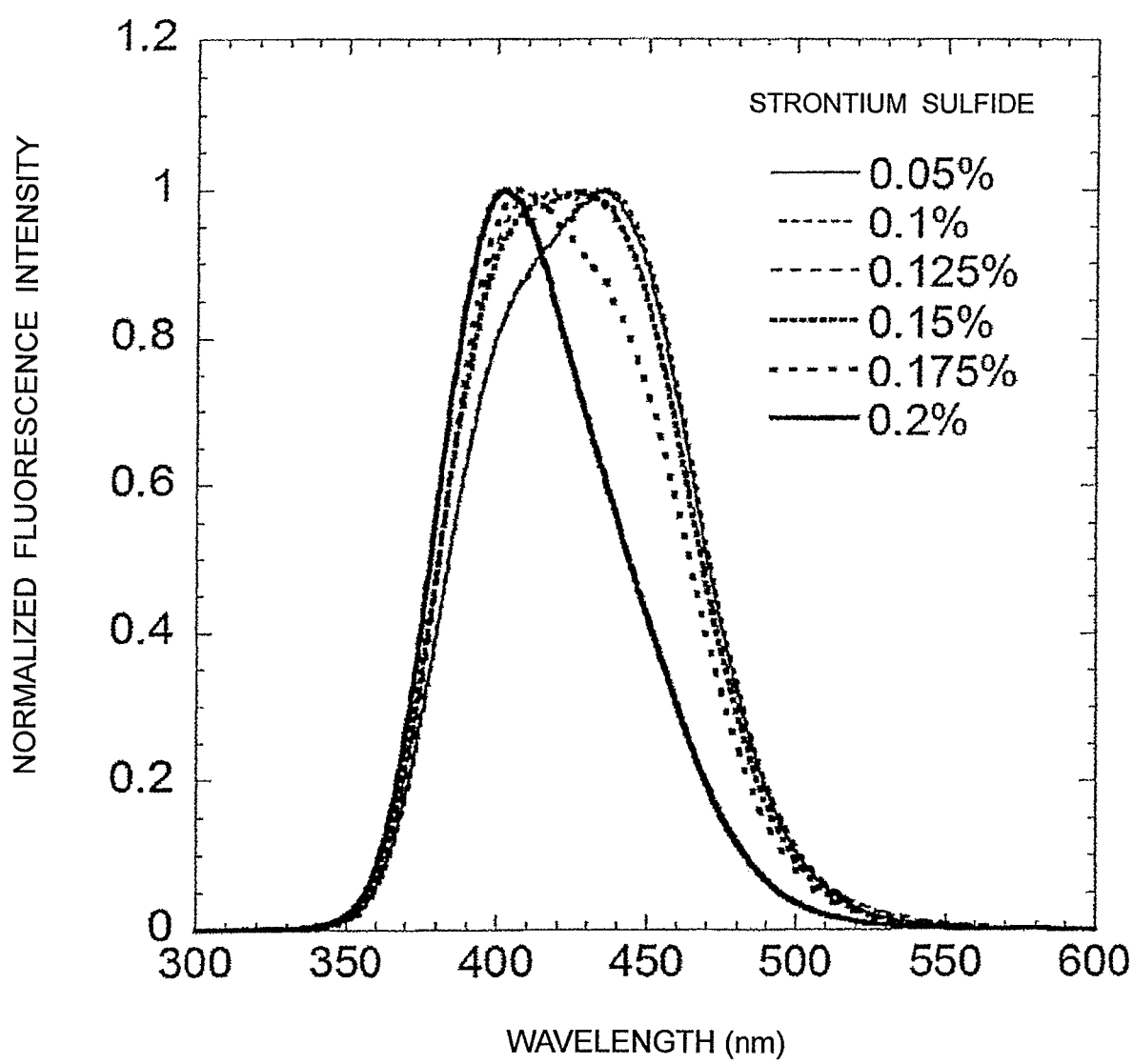

The samples were prepared for six types of ZnS:Ag based fluorescent materials for detecting particle beams manufactured in the calcination process by changing the quantity of Strontium Sulfide used as an add-in material together with Lithium Chloride as a flux, and then measurements of fluorescence spectra in response to alpha-ray irradiation and gamma-ray irradiation were performed in the configuration in which those measurement samples are located at the position where the individual sample was to be set up in the excitation light irradiation system of the fluorescence photometer. Alpha-ray irradiation fluorescence spectra for six types of ZnS:Ag based fluorescent materials for detecting particle beams are shown in FIG. 55 by normalizing the observed maximum values in the spectra to 1 (one) in order to facilitate the comparison of changes in the shapes of alpha-ray irradiation fluorescent spectra.

Figure 56:
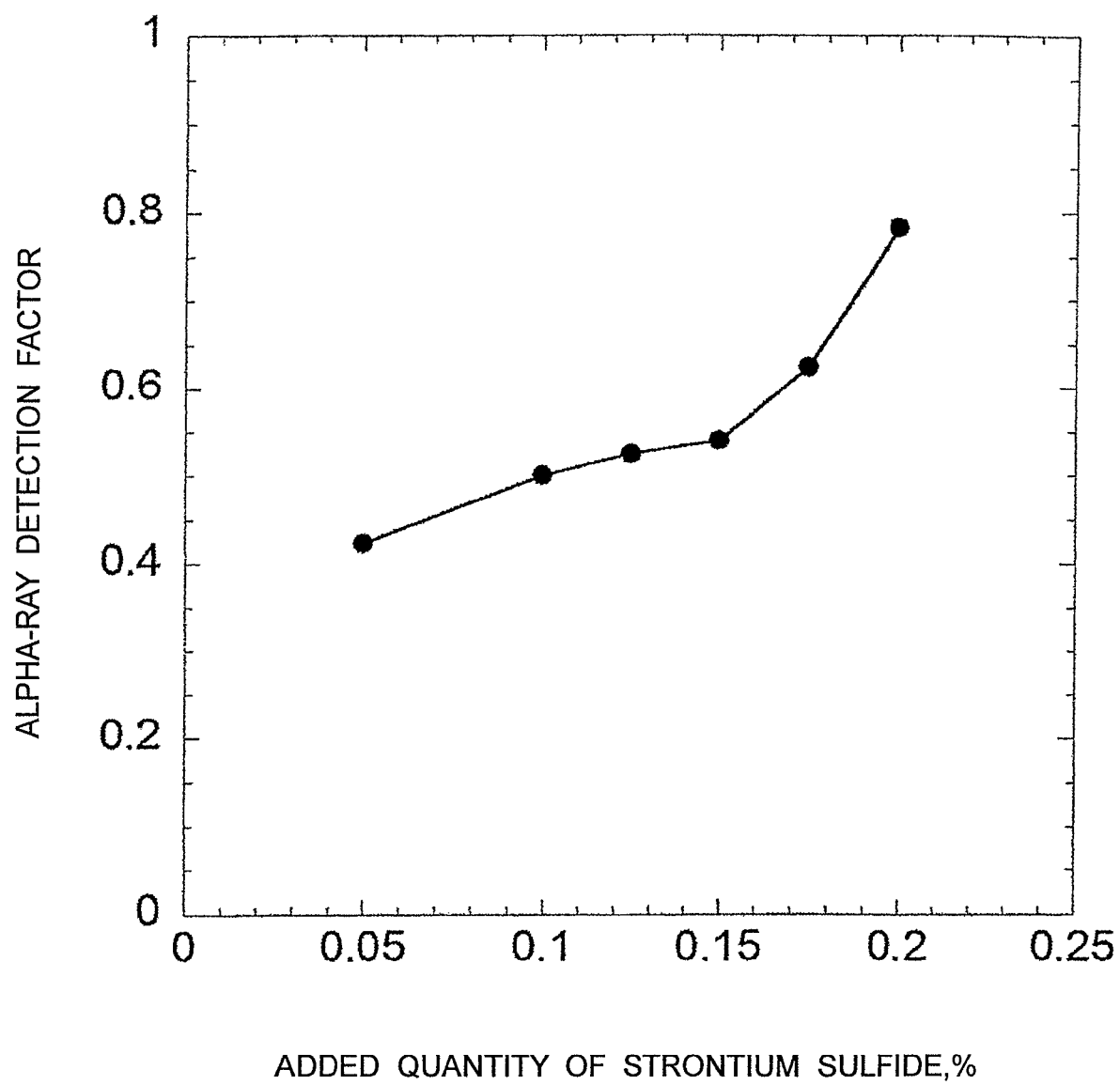

FIG. 56 shows the alpha-ray detection factor obtained by analyzing alpha-ray irradiation spectra so obtained in relative to the quantity of Strontium Sulfide being added as parameter. As the values for the alpha-ray detection factor become equal to or larger than its target value, 0.35, it was able to be confirmed that ZnS:Ag fluorescent materials for detecting particle beams as the second fluorescent material can be manufactured by changing the quantity of Strontium Sulfide being added.

Then, fluorescence lifetime characteristic with respect to alpha rays was measured by measuring pulse signals obtained by irradiating alpha rays to ZnS:Ag based fluorescent material for detecting particle beams in this embodiment by using an oscilloscope. The evaluation method described in Embodiment 1 was used.

Figure 57:
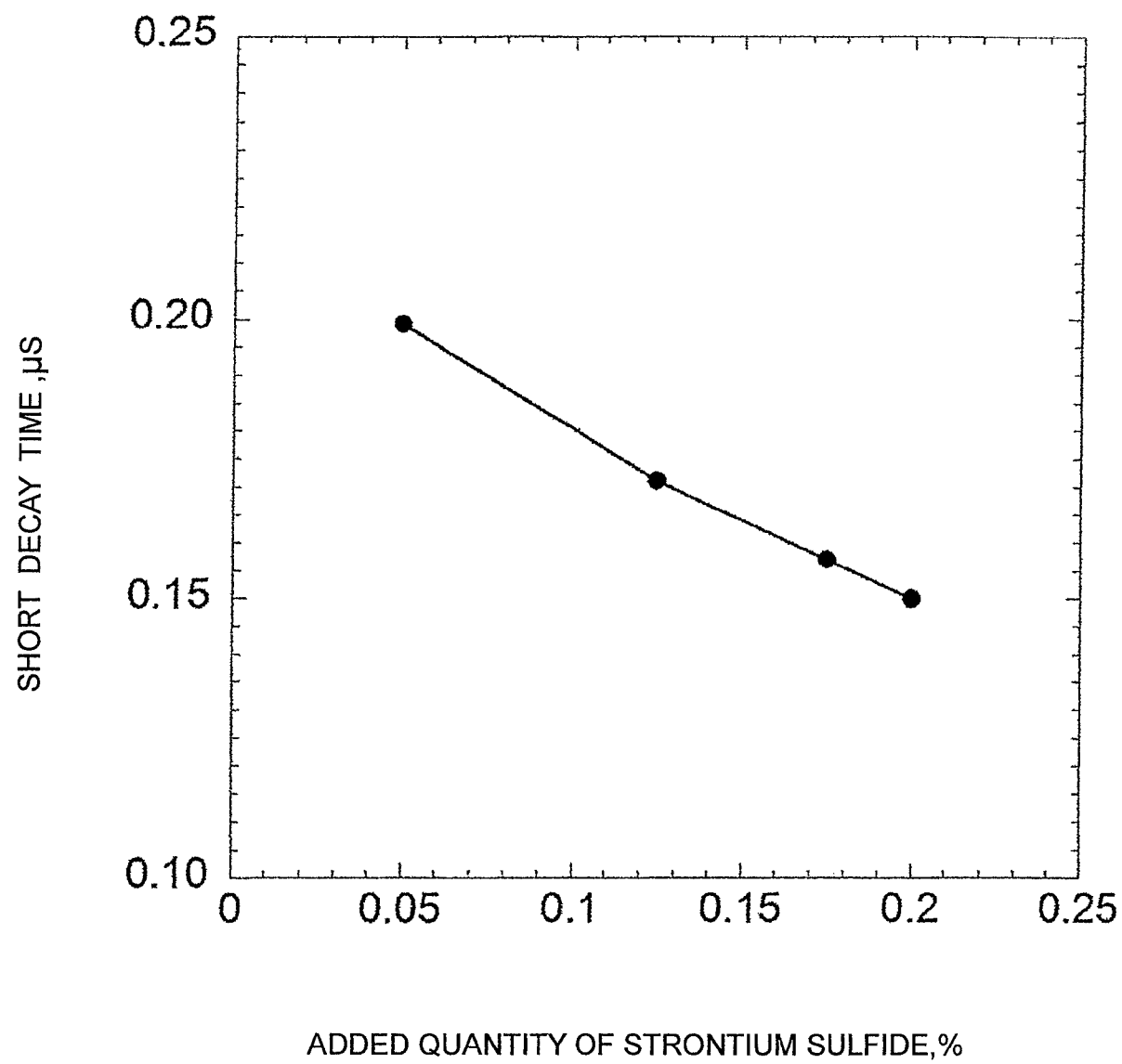

FIG. 57 shows the decay time (time corresponding to the quantity of fluorescence emitted in 1 μm) obtained by averaging a set of 2000 measured signals in relative to the quantity of Strontium Sulfide being added as parameter. It is proved that the decay time decreases as the quantity of quantity of Strontium Sulfide being added increases.

From the above described measurement results, it was confirmed that ZnS:Ag fluorescent materials for detecting particle beams as the second fluorescent material can be manufactured by changing the quantity of quantity of Sulfur and Strontium Sulfide as Sulfide, those being added.

Embodiment 8

In this embodiment, what will be described is a manufacturing method for manufacturing ZnS:Ag fluorescent materials for detecting particle beams as the second fluorescent material in Embodiment 3, Embodiment 4 and Embodiment 5, characterized by that the alpha-ray detection factor, representing the fraction of alpha-ray sensitive fluorescence spectrum to alpha-ray irradiation fluorescence spectrum, as the target value in manufacturing is set to be equal to or more than 0.35 and less than 1 (one) by changing the calcination temperature to be set before the calcination process in which Zinc Sulfide used as a main raw material, Silver as an activating material, and flux are mixed together with Sulfur added as an add-in material.

50 g of Zinc Sulfide are used as a main raw material. Silver as an activating material is used in the form of Silver Nitrate and added by the weight fraction of 0.015% to the quantity of Zinc Sulfide. Lithium Chloride having the melting point at 800° C. is used as a flux and added by the weight fraction of 6% to the quantity of Zinc Sulfide. Sulfur is used as an add-in material, and added by the weight fraction of 2% to the quantity of Zinc Sulfide. 20 cc of distilled water is added to and mixed with the above materials, and then is dried.

As for the crucible composed of graphite with its whole periphery being closed, a graphite crucible having an outer diameter of 60 mmφ and a length of 50 mm, an inner diameter of 30 mmφ, a bottom thickness of 10 mm and a lid thickness of 10 mm is used. The net volume for accommodating the materials is designed to have a diameter of 30 mmφ and a length of 30 mm. A hole having a diameter of 1 mmφ is provided at the center of the lid in order to release a part of sublimate substances generated from the calcination materials inside the crucible. Dried calcination materials are introduced inside the graphite crucible, and the lid is closed.

Next, the graphite crucible is held into the electric furnace and the calcination process is applied. As for the electric furnace, Electric Furnace KDF-S70 type manufactured by DENKEN Co., Ltd was used. The calcination process was performed in the following conditions.

Calcination Temperature: four types of calcination temperatures 780° C., 800° C., 850° C. and 920° C. used for the calcination process Cover Gas: $CO_2$ and $N_2$ gasses flowing at a flow rate of 2 liters per minute Calcination Period of Time: 2 hours After sintered materials obtained after the calcination process were ground to powder, and further after rinsing the powder by water, ZnS:Ag based fluorescent material for detecting particle beams is finally obtained.

Figure 58:
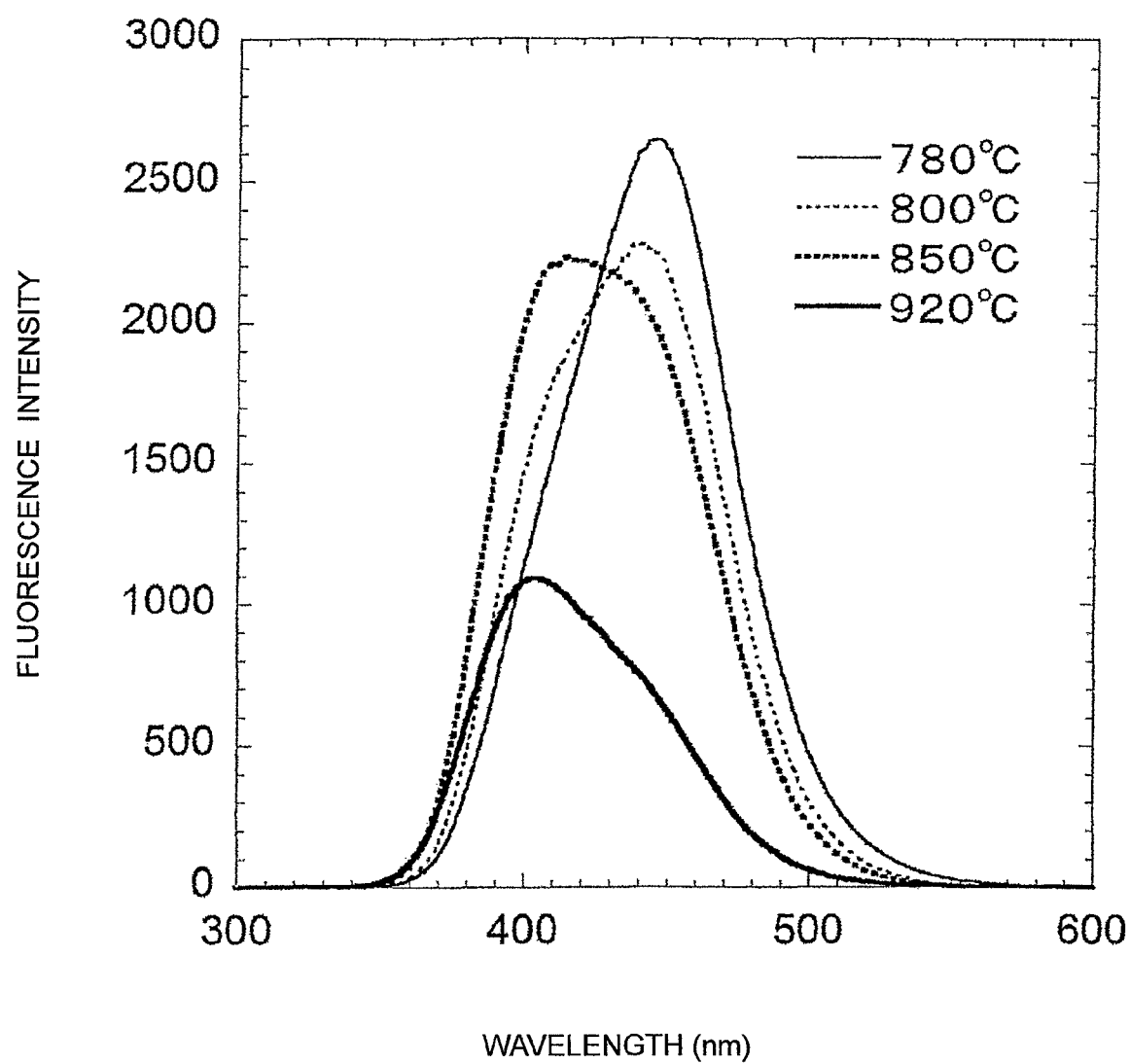

Samples were prepared for four types of ZnS:Ag based fluorescent materials for detecting particle beams manufactured in the calcination process by using Sulfur as an add-in material with the weight fraction of 2% and by changing the calcination temperatures 780° C., 800° C., 850° C. and 920° C., and then, measurements of fluorescence spectra in response to alpha-ray irradiation were performed in the configuration in which those measurement samples were located at the position where the individual sample was to be set up in the excitation light irradiation system of the fluorescence photometer. FIG. 58 shows changes in the shapes of alpha-ray irradiation fluorescent spectra for four types of ZnS:Ag based fluorescent materials so obtained.

The alpha-ray detection factors obtained by analyzing four types of alpha-ray irradiation spectra so obtained were 0.39, 0.45, 0.65 and 0.78. As the result, it was confirmed that ZnS:Ag fluorescent materials for detecting particle beams as the second fluorescent material and having an intended alpha-ray detection factor can be manufactured by changing the calcination temperature if the calcination process is applied with the calcination temperature increased by 750° C. or higher.

Embodiment 9

ZnS:Ag fluorescent materials for detecting particle beams as the first and second fluorescent materials described in Embodiment 1 thorough Embodiment 8 were manufactured in the calcination processes under various manufacturing conditions with different calcination temperatures and different calcination times in which Sulfur or Sulfide was used as an add-in material to Zinc Sulfide, and Halide of Alkaline metals or Halide of Alkaline earth materials were used as fluxes.

Based on the analytical results of ZnS:Ag fluorescent materials for detecting particle beams as the first and second fluorescent materials described in Embodiment 1 thorough Embodiment 8 manufactured in the calcination processes under various manufacturing conditions, the correlation between the decay time as an important parameter representing physical states of ZnS:Ag fluorescent materials for detecting particle beams and the quantity of fluorescence, decreasing as the quantity of Sulfur or Strontium Sulfide as add-in material increases, was studied by changing the quantity of Sulfur or Strontium Sulfide added as an add-in material in terms of add-in materials (Sulfur, Sulfide), flux (Alkaline metal, Alkaline earth metal) and flux (Chloride, Bromine) as parameters. Table 3 shows combinations of the types of add-in materials and the types of fluxes used in ZnS:Ag fluorescent materials for detecting particle beams, and the short decay times and the quantities of fluorescence, those actually used in the study.

TABLE 3

| Sample Number | Add-in Material | Weight Fraction of Add-in Material (%) | Flux | Short Decay Time (μs) | Photon Number |
|---|---|---|---|---|---|
| 1 | S | 1.2 | NaBr | 0.187 | 25050 |
| 2 | S | 2 | $CeCl_3$ | 0.175 | 26887 |
| 3 | S | 2 | $BaBr_2$ | 0.222 | 37903 |
| 4 | S | 2 | $RbBr_2$ | 0.215 | 22947 |
| 5 | S | 2 | $CaCl_2$ | 0.209 | 40120 |
| 6 | S | 3 | LiCl | 0.227 | 33218 |
| 7 | S | 4 | LiCl | 0.175 | 25703 |
| 8 | S | 5 | LiCl | 0.181 | 23911 |
| 9 | S | 8 | LiCl | 0.146 | 8783 |
| 10 | SrS | 0.6 | LiCl | 0.124 | 8216 |
| 11 | SrS | 0.8 | $BaBr_2$ | 0.131 | 9648 |
| 12 | SrS | 1 | $SrBr_2$ | 0.212 | 26469 |
| 13 | SrS | 2 | NaCl | 0.200 | 33147 |
| 14 | SrS | 2 | $MgBr_2$ | 0.216 | 39628 |
| 15 | CaS | 5 | LiCl | 0.209 | 42179 |
| 16 | $Li_2S$ | 0.25 | LiCl | 0.183 | 13082 |
| 17 | SrS + S | 0.5(SrS), 2(S) | LiCl | 0.168 | 29022 |
| 18 | SrS + S | 1(SrS), 2(S) | LiCl | 0.213 | 45675 |

Figure 59:
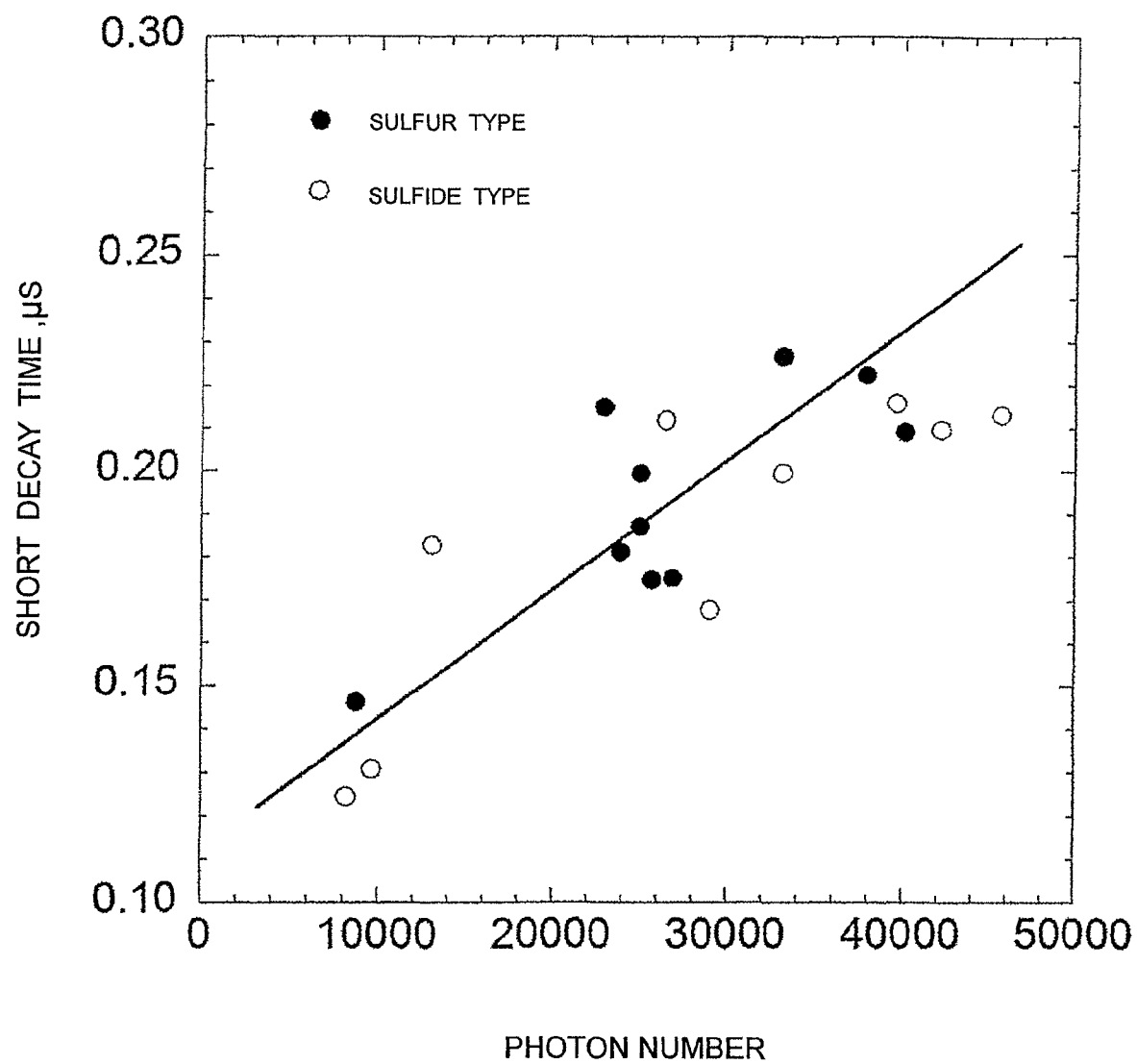
Figure 60:
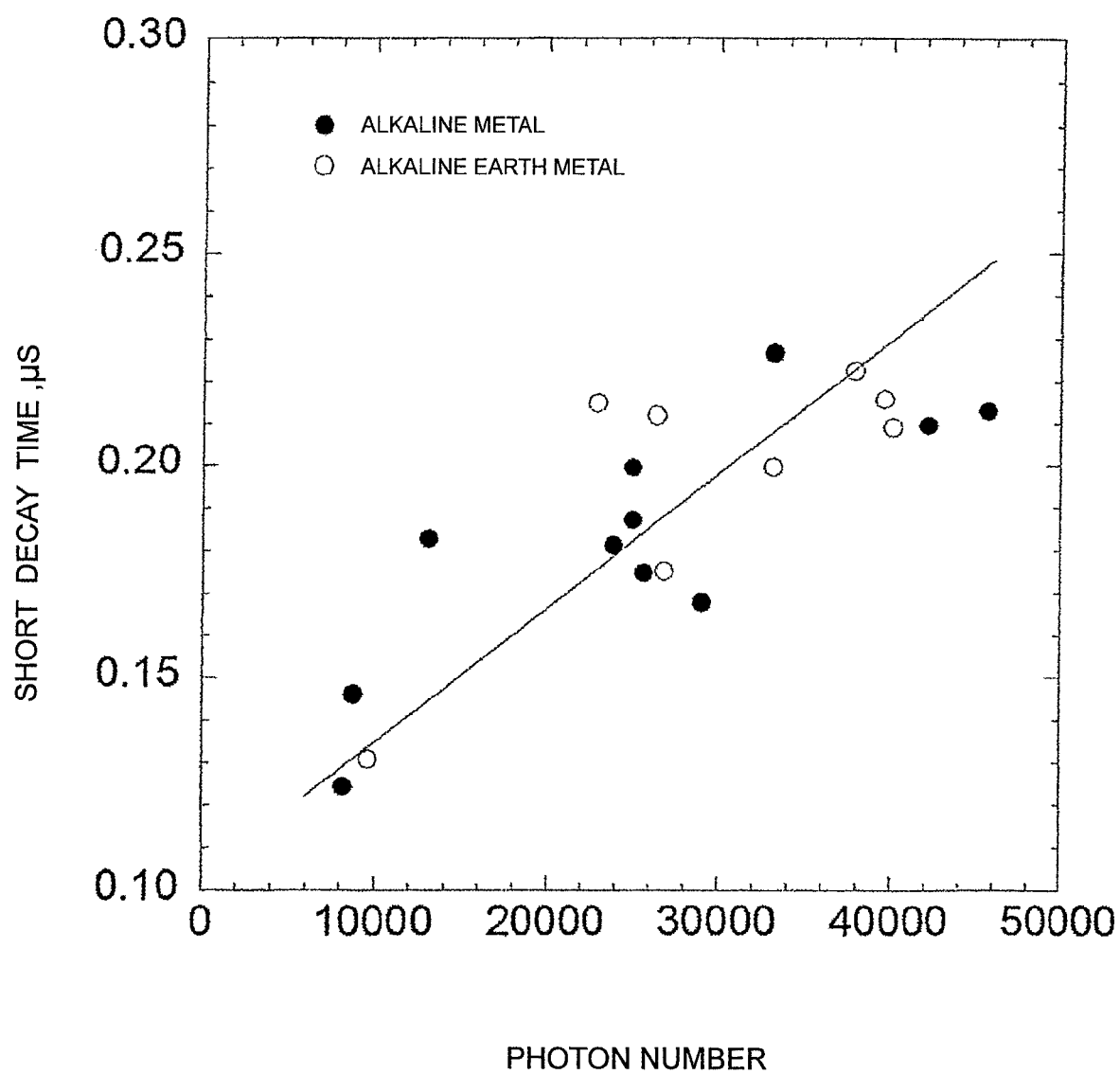
Figure 61:
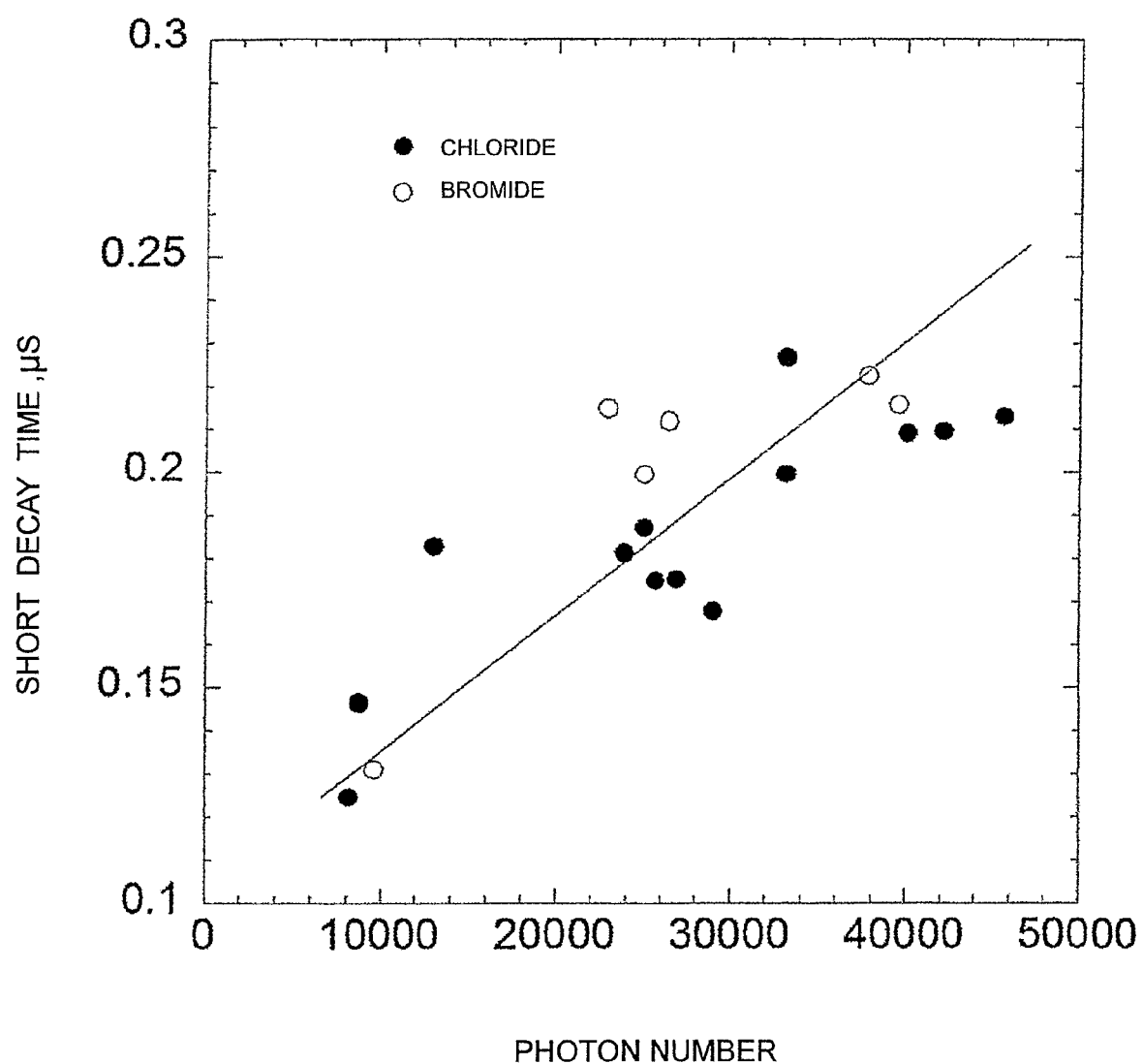

FIG. 59 shows the correlation between the photon number corresponding to the quantity of Sulfur or Sulfide being added and the decay time, obtained separately for Sulfur-type and Sulfide-type as add-in materials. FIG. 60 shows the correlation between the photon number corresponding to the quantity of Sulfur or Sulfide being added as an add-in material and the decay time, obtained separately for Alkaline metal and Alkaline earth metal used as fluxes. FIG. 61 shows the correlation between the photon number corresponding to the quantity of Sulfur or Sulfide being added as an add-in material and the decay time, obtained separately for Chloride and Bromide used as fluxes.

According to three correlation diagrams so obtained, it was confirmed that there is no significant difference in the correlation even if using different types of add-in materials or different types of fluxes, and that a correlation can be obtained so that the decay time may increase in proportion to an increase in the photon number.

From the above described results, it is concluded that the decay time as an important parameter representing the physical states of ZnS:Ag fluorescent materials for detecting particle beams depends only on the quantity of Sulfur directly added into Zinc Sulfide as an add-in material or the quantity of Sulfur added as Sulfide as an add-in material, and that there is no dependency or a little dependency, if any, on the difference in the types of add-in material, Sulfur or Sulfide, the difference in the types of flux, Alkaline metal or Alkaline earth metal, and the difference in the types of flux, Chloride or Bromide.

Thus, it can be concluded that the characteristics of ZnS:Ag fluorescent materials for detecting particle beams as the first and second fluorescent materials may be determined by the quantity of Sulfur introduced finally into Zinc Sulfide after completing the calcination process, and may have little dependency on the types of add-in materials and the types of fluxes, or calcination conditions.

What is claimed is:

1. A Zinc Sulfide activated with Silver based fluorescent material for detecting particle beams, said fluorescent material emitting fluorescence with wavelengths from 320 nm to 580 nm in response to alpha-ray irradiation, and with a peak wavelength from 395 nm to 410 nm.

2. A method of manufacturing the Zinc Sulfide activated with Silver based fluorescent material for detecting particle beams of claim 1, comprising:
   (a) preparing a calcination material by mixing Zinc Sulfide (ZnS) as a main raw material; Silver (Ag) as an activating material; 2-8% based on the amount of zinc sulfide of a flux used for reducing a calcination temperature selected from the group consisting of a chloride, bromide, or fluoride of an alkali metal, alkaline earth metal, or cerium; and
   0.25-8 wt % based on the amount of zinc sulfide of add-in materials selected from the group consisting of sulfur, strontium sulfide, calcium sulfide, lithium sulfide or a mixture of sulfur and at least one of strontium sulfide and calcium sulfide;
   (b) placing the calcination material in a graphite crucible, wherein the graphite crucible's whole periphery is closed with a lid comprising a hole having a diameter of 0.7-1.4 mm;
   (c) calcining the calcination material by heating the calcination material under carbon dioxide or nitrogen at a temperature above the melting point of the flux up to 1000° C.

3. The manufacturing method according to claim 2, wherein
   LiX, NaX, KX, RbX, CsX (X representing Cl, Br and F) as Halide of Alkaline metal used as a flux for reducing a calcination temperature; or
   MgX; or
   CaX, SrX, BaX and CeX (X representing Cl, Br and F) as Halide of Alkaline earth metal are added by a weight fraction of 2% to 8% to a quantity of Zinc Sulfide (ZnS), and Zinc Sulfide activated with Silver based fluorescent material for detecting particle beams is manufactured in a calcination process.

4. The manufacturing method according to claim 2, wherein
   the graphite crucible is used to release a part of a sublimate substance generated from the calcination material inside the graphite crucible during step (c); and
   the temperature in step (c) is sufficiently lower than a sublimation temperature of ZnS.

5. The manufacturing method according to claim 2, wherein
   the decay time of the Zinc Sulfide activated with Silver based fluorescent material for detecting particle beams is affected by changing the add-in material quantity.

6. A Zinc Sulfide activated with Silver (ZnS:Ag) based fluorescent material for detecting particle beams showing a synthesized fluorescence spectrum including
   a first spectral component for a fluorescence spectrum with wavelengths from 320 nm to 600 nm emitted in response to alpha-ray irradiation, and with a peak wavelength from 395 nm to 410 nm; and
   a second spectral component for a fluorescence spectrum with wavelengths from 380 nm to 560 nm emitted in response to gamma-ray or electron beam irradiation, and with a peak wavelength from 435 nm to 450 nm,
   wherein an intensity of the fluorescence spectrum for the first component is 0.35 times larger than and less than 1 (one) time of an quantity of the synthesized fluorescence spectrum.

7. A method of manufacturing the Zinc Sulfide activated with Silver based fluorescent material for detecting particle beams of claim 6, comprising:
   (a) preparing a calcination material by mixing Zinc Sulfide (ZnS) as a main raw material; Silver (Ag) as an activating material; 2-8% based on the amount of zinc sulfide of a flux used for reducing a calcination temperature selected from the group consisting of a chloride, bromide, or fluoride of an alkali metal, alkaline earth metal, or cerium; and
   0.25-8 wt % based on the amount of zinc sulfide of add-in materials selected from the group consisting of sulfur, strontium sulfide, calcium sulfide, lithium sulfide or a mixture of sulfur and at least one of strontium sulfide and calcium sulfide;
   (b) placing the calcination material in a graphite crucible, wherein the graphite crucible's whole periphery is closed with a lid comprising a hole having a diameter of 0.7-1.4 mm;
   (c) calcining the calcination material by heating the calcination material under carbon dioxide or nitrogen at a temperature above the melting point of the flux up to 1000° C.

8. The manufacturing method according to claim 7, wherein
   LiX, NaX, KX, RbX, CsX (X representing Cl, Br and F) as Halide of Alkaline metal used as a flux for reducing a calcination temperature; or
   MgX; or
   CaX, SrX, BaX and CeX (X representing Cl, Br and F) as Halide of Alkaline earth metal are added by a weight fraction of 2% to 8% to a quantity of Zinc Sulfide (ZnS), and Zinc Sulfide activated with Silver based fluorescent material for detecting particle beams is manufactured in a calcination process.

9. The manufacturing method according to claim 7, wherein
   the graphite crucible is used to release a part of a sublimate substance generated from the calcination material inside the graphite crucible during step (c); and
   the temperature in step (c) is sufficiently lower than a sublimation temperature of ZnS.

10. The manufacturing method according to claim 7, wherein
   a fraction of alpha-ray sensitive fluorescence spectrum to alpha-ray irradiation fluorescence spectrum of the Zinc Sulfide (ZnS) activated with Silver (Ag) based fluorescent material for detecting particle beams is affected by changing the add-in material quantity, and
   wherein the fraction of alpha-ray sensitive fluorescence spectrum to alpha-ray irradiation fluorescence spectrum is equal to or more than 0.35 and less than 1.

* * * * *